(12) United States Patent
Wallweber

(10) Patent No.: US 11,933,784 B2
(45) Date of Patent: Mar. 19, 2024

(54) COMPOSITIONS AND METHODS TO DETECT HEAD AND NECK CANCER

(71) Applicant: Laboratory Corporation of America Holdings, Burlington, NC (US)

(72) Inventor: Gerald J. Wallweber, Foster City, CA (US)

(73) Assignee: Laboratory Corporation of America Holdings, Burlington, NC (US)

( * ) Notice: Subject to any disclaimer, the term of this patent is extended or adjusted under 35 U.S.C. 154(b) by 1238 days.

(21) Appl. No.: 16/224,974

(22) Filed: Dec. 19, 2018

(65) Prior Publication Data

US 2019/0187143 A1 Jun. 20, 2019

Related U.S. Application Data

(60) Provisional application No. 62/608,296, filed on Dec. 20, 2017.

(51) Int. Cl.
| | |
|---|---|
| G01N 31/00 | (2006.01) |
| C12Q 1/6886 | (2018.01) |
| G01N 33/52 | (2006.01) |
| G01N 33/53 | (2006.01) |
| G01N 33/574 | (2006.01) |

(52) U.S. Cl.
CPC ..... *G01N 33/57407* (2013.01); *C12Q 1/6886* (2013.01); *G01N 33/52* (2013.01); *G01N 33/5748* (2013.01); *C12Q 2600/158* (2013.01)

(58) Field of Classification Search
None
See application file for complete search history.

(56) References Cited

U.S. PATENT DOCUMENTS

| | | | |
|---|---|---|---|
| 4,956,778 A | 9/1990 | Naito | |
| 4,998,617 A | 3/1991 | Ladd et al. | |
| 5,091,513 A | 2/1992 | Huston et al. | |
| 5,132,405 A | 7/1992 | Huston et al. | |
| 5,846,710 A | 12/1998 | Bajaj | |
| 5,888,577 A | 3/1999 | Haff et al. | |
| 5,888,819 A | 3/1999 | Goelet et al. | |
| 5,945,526 A | 8/1999 | Lee et al. | |
| 6,280,947 B1 | 8/2001 | Shuber et al. | |
| 6,482,595 B2 | 11/2002 | Shuber et al. | |
| 6,503,718 B2 | 1/2003 | Shuber et al. | |
| 6,919,174 B1 | 7/2005 | Shuber | |
| 7,169,560 B2 | 1/2007 | Lapidus et al. | |
| 7,282,337 B1 | 10/2007 | Harris | |
| 7,501,251 B2 | 3/2009 | Koster et al. | |
| 2009/0156412 A1 | 6/2009 | Boyce et al. | |
| 2014/0045915 A1* | 2/2014 | Skog ..................... | C12Q 1/6806 435/15 |

FOREIGN PATENT DOCUMENTS

| | | |
|---|---|---|
| AU | 2015201151 A1 | 3/2015 |
| CN | 108866200 A | 11/2018 |
| JP | 2012515334 A | 7/2012 |
| JP | 2015521480 A | 7/2015 |
| KR | 20170062655 | 6/2017 |
| WO | 2007073984 | 7/2007 |
| WO | 2010060103 A1 | 5/2010 |
| WO | 2010083252 | 7/2010 |
| WO | 2013192089 | 12/2013 |
| WO | 2014182598 A1 | 11/2014 |
| WO | 2016199107 A1 | 12/2016 |
| WO | 2017/070709 A1 | 4/2017 |
| WO | 2017079677 A1 | 5/2017 |

OTHER PUBLICATIONS

"Gene Set—Head and Neck Squamous Cell Carcinoma_HNSC_TCGA-CV-7104-01A", XP055592759, Retrieved from the Internet: URL:http://amp.pharm.mssm.edu/Harmonizome/ gene_set/Head+and+Neck+squamous+cell+carcinoma_HNSC_TCGA-CV-71O4-OIA-IIR-2O16-07/TCGA+Signatures+of+Differentially+Expressed+Genes+for+Tumors, Jul. 3, 2016, 2 pages.
Alvarado et al., "Erbb Activation Signatures as Potential Biomarkers for Anti-Erbb3 Treatment in Hnscc", Plos One, vol. 12, No. 7, Jul. 19, 2017, 23 pages.
Dunn et al., "Co-expression of Neuregulins 1, 2, 3 and 4 in Human Breast Cancer", Journal of Pathology, vol. 203, Jan. 1, 2004, pp. 672-680.
Ferguson et al., "Glutamate Dependent NMDA Receptor 2D is a Novel Angiogenic Tumour Endothelial Marker in Colorectal Cancer", Oncotarget, vol. 7, No. 15, Apr. 12, 2016, 15 pages.
Mazzocco et al., "The Identification of a Novel Human Homologue of the SH3 Binding Glutamic Acid-Rich (SH3BGR) Gene Establishes a New Family of Highly Conserved Small Proteins Related to Thioredoxin Superfamily", Gene, vol. 291, No. 1, Jun. 8, 2002, pp. 233-239.
PCT/US2018/066354, "International Search Report and Written Opinion", dated Jun. 5, 2019, 30 pages.
Pulito et al., "Metformin-Induced Ablation of MicroRNA 21-5p releases Sestrin-1 and CAB39L Antitumoral Activities", Cell Discovery, vol. 3, No. 1, Jul. 4, 2017, 19 pages.
Weinstein et al., "The Cancer Genome Atlas Pan-Cancer Analysis Project", Nature Genetics, vol. 45, No. 10, Oct. 1, 2013, pp. 1113-1120.
International Patent Application No. PCT/US2018/066354, International Preliminary Report on Patentability, dated Jul. 2, 2020, 22 pages.
Ausubel et al., Current Protocols in Molecular Biology, 1994, vol. 1, United States of America.
Ausubel et al., "Preparation and Analysis of DNA", Short Protocols in Molecular Biology, 1999, Fourth Edition, New York.

(Continued)

*Primary Examiner* — Lisa V Cook
(74) *Attorney, Agent, or Firm* — Kilpatrick Townsend & Stockton LLP

(57) ABSTRACT

Disclosed are compositions and methods to detect proteins associated with Head and Neck Cancer, generally, or more particularly, biomarkers of Head and Neck Squamous Cell Carcinoma (HNSCC). Such markers may be useful to allow individuals susceptible to HNSCC to manage their lifestyle and/or medical treatment to avoid further progression of disease.

24 Claims, 23 Drawing Sheets

(56) References Cited

OTHER PUBLICATIONS

Braslavsky et al., "Sequence Information can be Obtained from Single DNA Molecules", PNAS, vol. 100, No. 7, Apr. 1, 2003, pp. 3960-3964.
Breiman, Leo, "Random Forests", Machine Learning, vol. 45, 2001, pp. 5-32.
Bustin et al., "The MIQE Guidelines: Minimum Information for Publication of Quantitative Real-Time PCR Experiments", Clinical Chemistry, vol. 55, No. 4, 2009, pp. 611-622.
Haff et al., "Mutiplex Genotyping of PCR Products with MassTag-labeled Primers", Nucleic Acids Research, vol. 25, No. 18, 1999, pp. 3749-3750.
Haugland, Richard P., "The Handbook of Fluorescent Probes and Research Products", $9^{th}$ Ed., 2002.
Heid et al., "Real Time Quantitative PCR", Genome Research, vol. 6, 1996, pp. 986-994.
Hoogendoorn et al., "Genotyping Single Nucleotide Polymorphisms by Primer Extension and High Performance Liquid Chromatography", Hum Genet, vol. 104, 1999, pp. 89-93.
Huston et al., "Protein Engineering of Antibody Binding Sites: Recovery of Specific Activity in an Anti-digoxin Single-chain Fv Analogue Produced in *Escherichia coli*", Proc. Natl. Acad. Sci. USA, vol. 85, Aug. 1988, pp. 5879-5883.
Ju et al., "Fluorescence Energy Transfer Dye-labeled Primers for DNA Sequencing and Analysis", Proc. Natl. Acad. Sci. USA, vol. 92, May 1995, pp. 4347-4351.
Landegren et al., "A Ligase-Mediated Gene Detection Technique", Science, vol. 241, Aug. 26, 1988, pp. 1077-1080.
Maxam et al., "A New Method for Sequencing DNA", Proc. Natl. Acad. Sci. USA, vol. 74, No. 2, Feb. 1977, pp. 560-564.
Needleman et al., "A General Method Applicable to the Search for Similarities in the Amino Acid Sequence of Two Proteins", J. Mol. Biol., vol. 48, 1970, pp. 443-453.
Newton et al., "Analysis of Any Point Mutation in DNA. The Amplification Refractory Mutation System (ARMS)". Nucleic Acids Research, vol. 17, No. 7, 1989, pp. 2503-2516.
Nickerson et al., "Automated DNA Diagnostics Using an ELISA-based Oligonucleotide Litigation Assay", Proc. Natl. Acad. Sci. USA, vol. 87, Nov. 1990, pp. 8923-8927.
Okayama et al., "Rapid, Nonradioactive Detection of Mutations in the Human Genome by Allele-specific Amplification", J. Lab Clin. Med., vol. 114, No. 2, Aug. 1989, pp. 105-113.
Paul, William E., Fundamental Immunology, Third Edition, 1993, New York.
PCT/US2018/066354, "Invitation to Pay Additional Fees and, Where Applicable, Protest Fee", dated Mar. 14, 2019, 15 pages.
Pearson et al., "Improved Tools for Biological Sequence Comparison", Proc. Natl. Acad. Sci. USA, vol. 85, Apr. 1988, pp. 2444-2448.
Piggee et al., "Capillary Electrophoresis for the Detection of Known Point Mutations by Single-nucleotide Primer Extension and Laser-induced Fluorescence Detection", Journal of Chromatography A, vol. 781, 1997, pp. 367-375.
Poddar, S.K., "Symmetric v. Asymmetric PCR and Molecular Beacon Probe in the Detection of a Target Gene of Adenovirus", Molecular and Cellular Probes, vol. 14, 2000, pp. 25-32.
Rao et al., "A Positive Feedback Loop Between Her2 and Adam12 In Human Head and Neck Cancer Cells Increases Migration and Invasion", Oncogene, vol. 31, No. 23, Oct. 10, 2011, pp. 2888-2898.
Sambrook et al., Molecular Cloning a Laboratory Manual, Second Edition, 1989, New York.
Sanger et al., "DNA Sequencing with Chain-Terminating Inhibitors", Proc. Natl. Acad Sci. USA, vol. 74, No. 12, Dec. 1977, pp. 5463-5467.
Sarkar et al., "Characterization of Polymerase Chain Reaction Amplification of Specific Alleles", Analytical Biochemistry, vol. 186, 1990, pp. 64-68.
Smith et al., "Comparison of Biosequences", Advances in Applied Mathematics, vol. 2, 1981, pp. 482-489.
Stears et al., "A Novel, Sensitive Detection System for High-Density Microarrays Using Dendrimer Technology", Physiol Genomics, vol. 3, 2000, pp. 93-99.
Wilbur et al., "Rapid Similarity Searches of Nucleic Acid and Protein Data Banks", Proc. Natl. Acad. Sci. USA, vol. 80, Feb. 1983, pp. 726-730.
Wu et al., "Allele-specific Enzymatic Amplification of B-Globin Genomic DNA for Diagnosis of Sickle Cell Anemia", Proc. Natl. Acad. Sci. USA, vol. 86, Apr. 1989, pp. 2757-2760.
Yan et al., "Expression Profile Analysis of Head and Neck Squamous Cell Carcinomas Using Data from the Cancer Genome Atlas", Molecular Medicine Reports, vol. 13, No. 5, Mar. 28, 2016, pp. 4259-4265.
CA 3,084,826, Office Action, dated Jun. 23, 2021, 3 pages.
EP 18836754.4, Office Action, dated Aug. 10, 2021, 7 pages.
CA 3,084,826, Office Action, dated Mar. 30, 2022, 3 pages.
JP 2020-533716, Office Action, dated Aug. 8, 2022, 8 pages.
EP18836754.4, "Office Action," dated Jan. 11, 2023, 5 pages.
Communication in EP Patent Application No. 18 836 754.4-1111, dated Sep. 14, 2023, 4 pages.
Chen et al., The Expression and Clinical Significance of Lysyl Oxidase-like 2 in Head and Neck Squamous Cell Carcinoma, Modern Oncology, vol. 28, No. 8, Apr. 30, 2016, pp. 1204-1206.
Chinese Application No. 201880082894.X, Office Action dated Dec. 28, 2023, 15 pages (5 pages for English Translation and 10 pages for original documents).
Fukumoto et al., Tumor-suppressive microRNAs (miR-26a/b, miR-29a/b/c and miR-218) Concertedly Suppressed Metastasis-promoting LOXL2 in Head and Neck Squamous Cell Carcinoma, Journal of Human Genetics, vol. 61, No. 2, Feb. 2016, pp. 109-118.
Li et al., The Effect of EMP1 on the Proliferation, Apoptosis and Migration of Laryngeal Cancer hep2 cells, Progress of Anatomical Sciences, vol. 23, No. 3, May 23, 2017, pp. 249-252.
Uehara et al., Upregulated Expression of Adam12 is Associated with Progression of Oral Squamous Cell Carcinoma, International Journal of Oncology, vol. 40, No. 5, May 2012, pp. 1414-1422.
Wang et al., Dual-faced SH3BGRL: Oncogenic in Mice, Tumor Supressive in Humans, Oncogene, vol. 35, No. 25, Jun. 2016, pp. 3303-3313.

\* cited by examiner

| Gene | Accuracy | kappa | Sensitivity | Specificity |
|---|---|---|---|---|
| 1 CAB39L | 0.9600 | 0.7745 | 0.9831 | 0.7818 |
| 2 ADAM12 | 0.9688 | 0.7506 | 0.9938 | 0.6727 |
| 3 SH3BGRL2 | 0.9596 | 0.6972 | 0.9846 | 0.6636 |
| 4 NRG2 | 0.9553 | 0.6710 | 0.9808 | 0.6545 |
| 5 COL13A1 | 0.9546 | 0.6376 | 0.9854 | 0.5909 |
| 6 GRIN2D | 0.9539 | 0.6326 | 0.9862 | 0.5727 |
| 7 LOXL2 | 0.9525 | 0.5906 | 0.9915 | 0.4909 |
| 8 HSD17B6 | 0.9411 | 0.4890 | 0.9846 | 0.4273 |

| 4-gene Panel | Accuracy | kappa | Sensitivity | Specificity |
|---|---|---|---|---|
| CAB39L, ADAM12, NRG2, GRIN2D | 0.9929 | 0.9485 | 0.9992 | 0.9182 |
| CAB39L, ADAM12, NRG2, LOXL2 | 0.9901 | 0.9313 | 0.9946 | 0.9364 |
| CAB39L, ADAM12, NRG2, SH3BGRL2 | 0.9908 | 0.9338 | 0.9969 | 0.9182 |
| CAB39L, ADAM12, NRG2, COL13A1 | 0.9901 | 0.9286 | 0.9969 | 0.9091 |
| CAB39L, ADAM12, NRG2, HSD17B6 | 0.9887 | 0.9144 | 0.9992 | 0.8636 |

| 5-gene Panel | Accuracy | kappa | Sensitivity | Specificity |
|---|---|---|---|---|
| CAB39L, ADAM12, NRG2, GRIN2D, COL13A1 | 0.9924 | 0.9493 | 0.9985 | 0.9273 |
| CAB39L, ADAM12, NRG2, GRIN2D, SH3BGRL2 | 0.9929 | 0.9485 | 0.9985 | 0.9273 |
| CAB39L, ADAM12, NRG2, GRIN2D, LOXL2 | 0.9922 | 0.9445 | 0.9977 | 0.9273 |
| CAB39L, ADAM12, NRG2, GRIN2D, HSD17B6 | 0.9894 | 0.9199 | 0.9992 | 0.8727 |

| | All Data | | OC and OP only | |
|---|---|---|---|---|
| | HNSCC | Normal | HNSCC | Normal |
| 1. CA8P3L | | | | |
| N | 519 | 44 | 393 | 33 |
| Median (RNASeqV2) | 6.91 | 9.14 | 6.94 | 9.12 |
| Mann-Whitney p value | <0.0001 | | <0.0001 | |
| 2. ADAM12 | | | | |
| N | 519 | 44 | 393 | 33 |
| Median (RNASeqV2) | 9.52 | 5.33 | 9.59 | 5.52 |
| Mann-Whitney p value | <0.0001 | | <0.0001 | |
| 3. SH3BGRL2 | | | | |
| N | 518 | 44 | 393 | 33 |
| Median (RNASeqV2) | 7.44 | 11.44 | 7.30 | 11.34 |
| Mann-Whitney p value | <0.0001 | | <0.0001 | |
| 4. NRG2 | | | | |
| N | 479 | 44 | 361 | 33 |
| Median (RNASeqV2) | 1.53 | 5.75 | 1.41 | 5.86 |
| Mann-Whitney p value | <0.0001 | | <0.0001 | |
| 5. COL13A1 | | | | |
| N | 519 | 44 | 393 | 33 |
| Median (RNASeqV2) | 6.27 | 3.48 | 6.23 | 3.50 |
| Mann-Whitney p value | <0.0001 | | <0.0001 | |
| 6. GRIN2D | | | | |
| N | 519 | 44 | 393 | 33 |
| Median (RNASeqV2) | 7.19 | 3.70 | 6.95 | 3.71 |
| Mann-Whitney p value | <0.0001 | | <0.0001 | |
| 7. LOXL2 | | | | |
| N | 519 | 44 | 393 | 33 |
| Median (RNASeqV2) | 10.42 | 7.15 | 10.41 | 7.34 |
| Mann-Whitney p value | <0.0001 | | <0.0001 | |
| 8. HSD17B6 | | | | |
| N | 519 | 44 | 393 | 33 |
| Median (RNASeqV2) | 5.33 | 2.99 | 5.31 | 3.10 |
| Mann-Whitney p value | <0.0001 | | <0.0001 | |

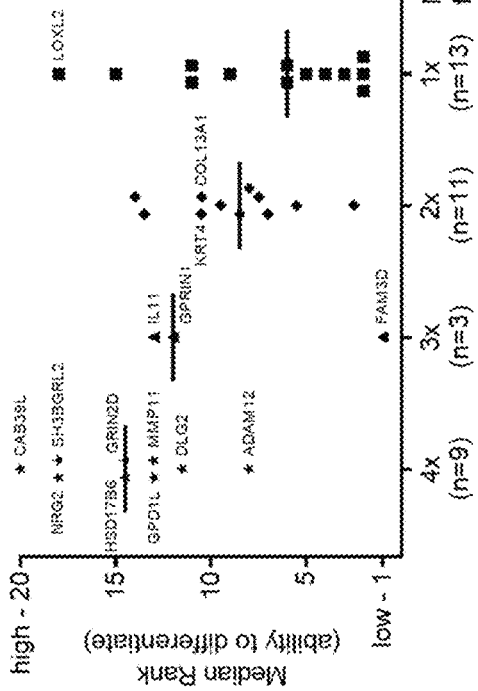

| 4x Repeated | | |
|---|---|---|
| No. | Gene Symbol\|Gene ID | Median Rank |
| 1 | CAB39L\|81617 | 20 |
| 2 | NRG2\|9542 | 18 |
| 3 | SH3BGRL2\|83699 | 18 |
| 4 | GRIN2D\|2906 | 14.5 |
| 5 | HSD17B6\|8630 | 14.5 |
| 6 | GPD1L\|23171 | 13 |
| 7 | MMP11\|4320 | 13 |
| 8 | DLG2\|1740 | 11.5 |
| 9 | ADAM12\|8038 | 8 |

| 3x Repeated | | |
|---|---|---|
| No. | Gene Symbol\|Gene ID | Median Rank |
| 1 | IL11\|3589 | 13 |
| 2 | GPR1N1\|114787 | 12 |
| 3 | FAM3D\|131177 | 1 |

| 2x Repeated | | |
|---|---|---|
| No. | Gene Symbol\|Gene ID | Median Rank |
| 1 | TMEM132C\|92293 | 14 |
| 2 | MGC12982\|84793 | 13.5 |
| 3 | COL13A1\|1305 | 10.5 |
| 4 | KRT4\|3851 | 10.5 |
| 5 | RRAGD\|58528 | 9.5 |
| 6 | ESM1\|11082 | 8.5 |
| 7 | FAM107A\|11170 | 8 |
| 8 | SHROOM3\|57619 | 7.5 |
| 9 | MUC21\|394263 | 7 |
| 10 | MAL\|4118 | 5.5 |
| 11 | MMP9\|4318 | 2.5 |

| 1x - not repeated | | |
|---|---|---|
| No. | Gene Symbol\|Gene ID | Median Rank |
| 1 | LOXL2\|4017 | 16 |
| 2 | GCOM1\|145781 | 15 |
| 3 | COBL\|23242 | 11 |
| 4 | EMP1\|2012 | 11 |
| 5 | ATP6V0A4\|50617 | 9 |
| 6 | AQP7\|364 | 6 |
| 7 | BARX2\|8538 | 6 |
| 8 | MYBL2\|4605 | 5 |
| 9 | CRISP3\|10321 | 4 |
| 10 | CAMK2N2\|94032 | 3 |
| 11 | ADH1B\|125 | 2 |
| 12 | GPD1\|2819 | 2 |
| 13 | NDRG2\|57447 | 2 |

FIG. 10

| Sample | Primer/Probe | Copies/μL | | %CV |
|---|---|---|---|---|
| | | cDNA A | cDNA B | |
| Tongue SCC | ADAM12 | 5.1 | 5.5 | 5% |
| | SH3BGRL2 | 1 | 1.2 | 13% |
| Buccal Mucosa | ADAM12 | 0.7 | No Call | nd |
| | SH3BGRL2 | 14.7 | 13.1 | 8% |

| RNASeq (log2) from TCGA | | | |
|---|---|---|---|
| Gene | Normal | Cancer | Fold-Change |
| ADAM12 | 5.33 | 9.52 | 18.3 |
| SH3BGRL2 | 11.44 | 7.44 | -16.0 |

| ddPCR (Neat averaged, copies/μL) | | | |
|---|---|---|---|
| Gene | Normal | Cancer | Fold-Change |
| ADAM12 | 0.7 | 5.3 | 8 |
| SH3BGRL2 | 13.9 | 1.1 | -13 |

COMPOSITIONS AND METHODS TO DETECT HEAD AND NECK CANCER

RELATED APPLICATIONS

This application claims priority to U.S. provisional patent application No. 62/608,296, filed Dec. 20, 2017. The disclosure of U.S. provisional patent application No. 62/608,296 is incorporated by reference in its' entirety herein.

BACKGROUND

Head and neck cancer is a common disease. The majority of head and neck cancers histologically belong to the squamous cell type and hence are categorized as Head and Neck Squamous Cell Carcinoma (HNSCC). HNSCC is the sixth most common cancer world-wide and the third most common in the developing world.

The biological mechanisms behind HNSCC are unknown and there are few, if any, biomarkers that provide a reliable indication of this condition. Still, it would be helpful for individuals having susceptibility to HNSCC to adjust their lifestyle so as to avoid triggering an onset of symptoms and/or promoting further progression of the disease. Thus, there is a need to develop and evaluate biomarkers for HNSCC.

SUMMARY

The present disclosure may be embodied in a variety of ways.

In one embodiment, disclosed is a method to detect biomarkers associated with Head and Neck Squamous Cell Carcinoma (HNSCC) in an individual comprising the steps of: obtaining a sample from the individual; and measuring the amount of expression of at least one of the genes in Table 4 and/or Table 6 in the sample. In one embodiment, disclosed is a method to detect biomarkers associated with HNSCC in an individual comprising the steps of: obtaining a sample from the individual; and measuring the amount of expression of at least one of the following genes: CAB39L, ADAM12, SH3BGRL2, NRG2, COL13A1, GRIN2D, LOXL2, KRT4, EMP1 and HSD17B6 in the sample. In another embodiment, disclosed is a method to detect biomarkers associated with HNSCC in an individual comprising the steps of: obtaining a sample from the individual; and measuring the amount of at least one of expression of at least one the Human Papilloma Virus (HPV) E6 or E7 genes. Additionally and/or alternatively, the method may include measurement of at least one normalization (e.g., housekeeping) gene. In an embodiment, the normalization gene may be KHDRBS1. In an embodiment, the normalization gene may be RPL30 or another normalization gene. Or, measurement of expression of various combinations of these genes can be performed.

In an embodiment, a panel of a plurality of the disclosed biomarkers are used. In an embodiment, the disclosure comprises a composition to detect biomarkers associated with Head and Neck Squamous Cell Carcinoma (HNSCC) in an individual comprising a reagent that quantifies the levels of expression of at least one of the genes in Table 4 and/or Table 6, and/or at least one of CAB39L, ADAM12, SH3BGRL2, NRG2, COL13A1, GRIN2D, LOXL2, KRT4, EMP1 or HSD17B6, and/or at least one of the HPV E6 and E7 genes. Additionally and/or alternatively, the composition may include at least one normalization (e.g., housekeeping) gene. In an embodiment, the normalization gene may be KHDRBS1. In an embodiment, the normalization gene may be RPL30 or another normalization gene. The composition may, in certain embodiments, comprise primers and/or probes for any one of these genes, where the primers and/or probes are labeled with a detectable moiety as described herein.

Other embodiments comprise systems for performing the methods and/or using the compositions disclosed herein.

Other features, objects, and advantages of the disclosure herein are apparent in the detailed description, drawings and claims that follow. It should be understood, however, that the detailed description, the drawings, and the claims, while indicating embodiments of the disclosed methods, compositions and systems, are given by way of illustration only, not limitation. Various changes and modifications within the scope of the invention will become apparent to those skilled in the art.

FIGURES

The invention may be better understood by reference to the following non-limiting figures.

In FIG. 3, for each plot, the 3 datasets on the left end of the x-axis (Larynx, Oral Cavity and Oropharyx) are from normal tissue and the 4 datasets on the right end of the x axis (Hypopharynx, Larynx, Oral Cavity and Orthopharynx) are from HNSCC tissue.

Figure 4:
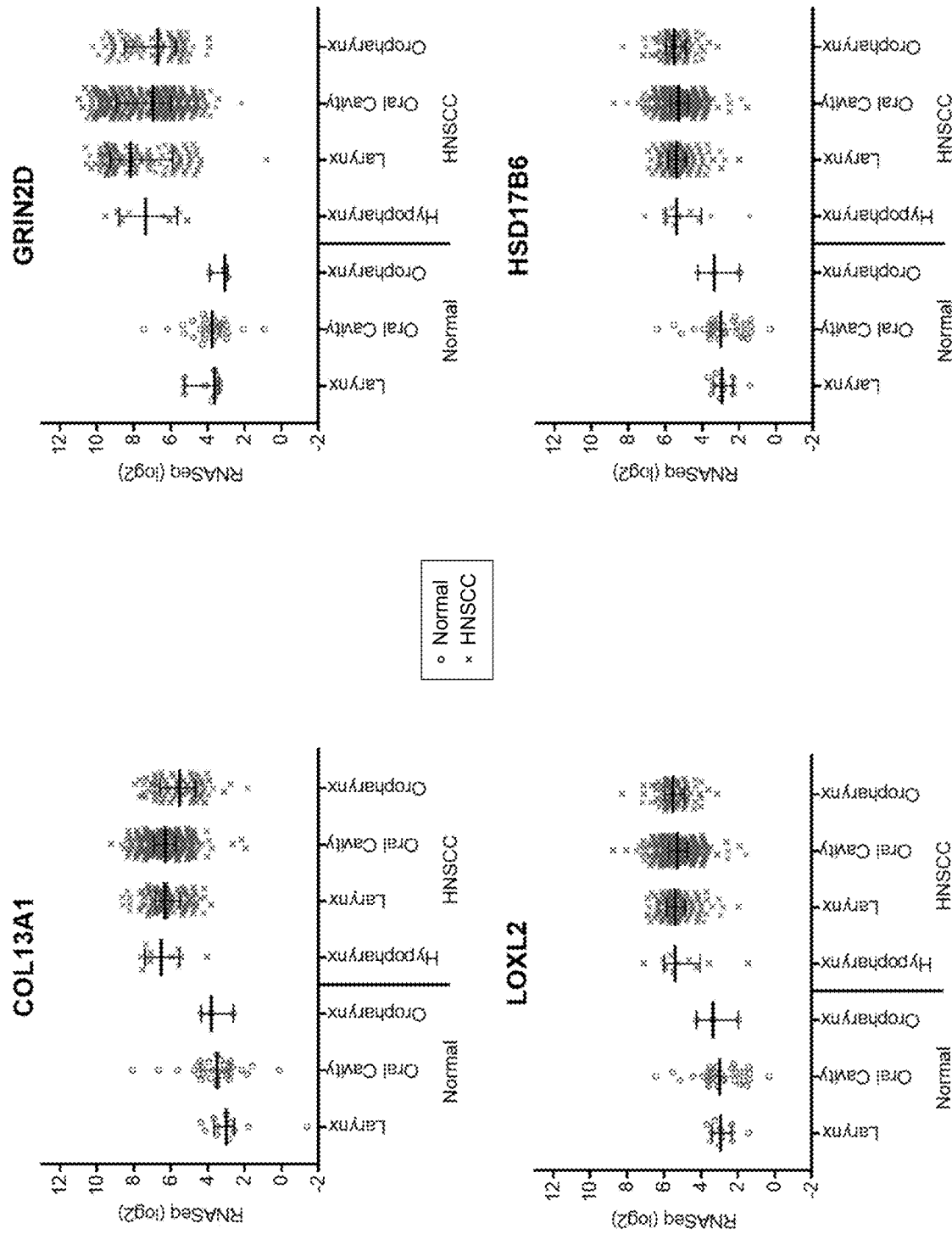

FIG. 4 shows gene expression by site for four additional markers of the disclosure (LOXL2, COL13A1, HSD17B6 and GRIN2D) in both normal and HNSCC tissue in accordance with various embodiments of the disclosure. In FIG. 4, for each plot, the 3 datasets on the left end of the x-axis (Larynx, Oral Cavity and Oropharyx) are from normal tissue and the 3 datasets on the right end of the x axis (Hypopharynx, Larynx, Oral Cavity and Orthopharynx) are from HNSCC tissue.

FIG. 5 shows a comparison of all HNSCC markers in HNSCC samples vs. normal for all the data, as well as in the oral cavity (OC) or oropharynx (OP) in HNSCC vs. normal in accordance with an embodiment of the disclosure.

Figure 6B:
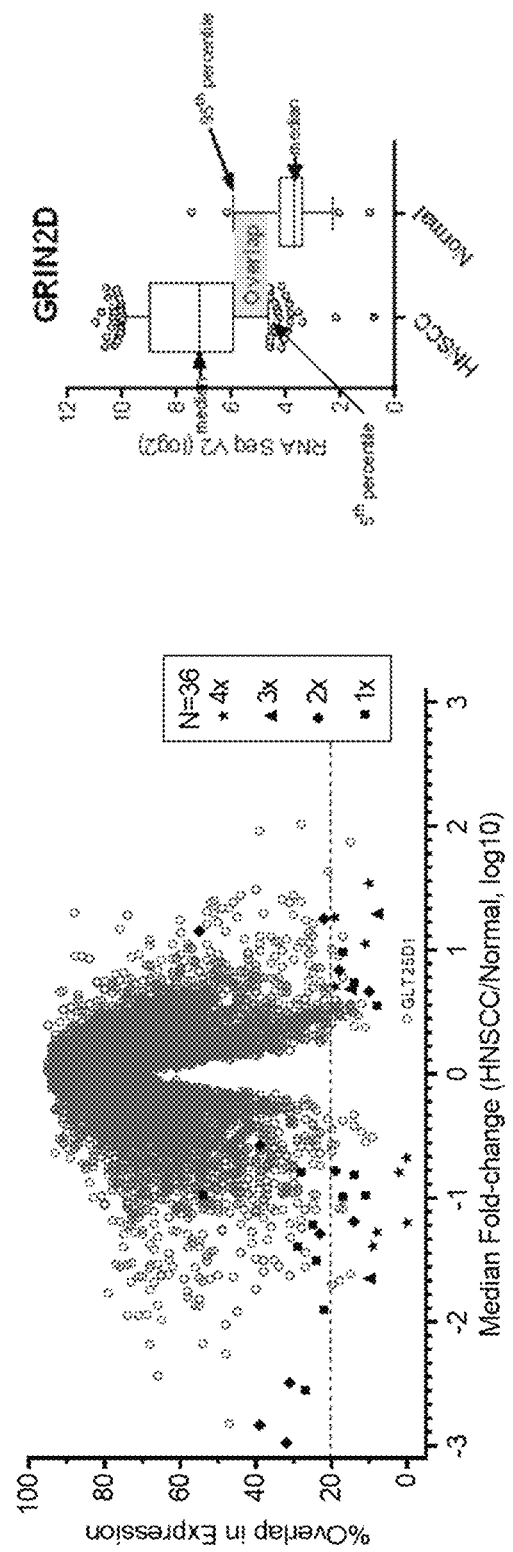

FIG. 6, Panel A, (i.e., FIG. 6A) shows the differential expression of a TCGA gene set in accordance with an embodiment of the disclosure. Panel B (i.e., FIG. 6B) shows the median rank of 36 genes (the darker symbols in the Figure) from Random Forest analysis with various embodiments of the disclosure. For gene expression increases in HNSCC, the cut-offs are the $5^{th}$ percentile of HNSCC and the $95^{th}$ percentile of normal (e.g., FIG. 6B, inset for GRIN2D).

Figure 7:
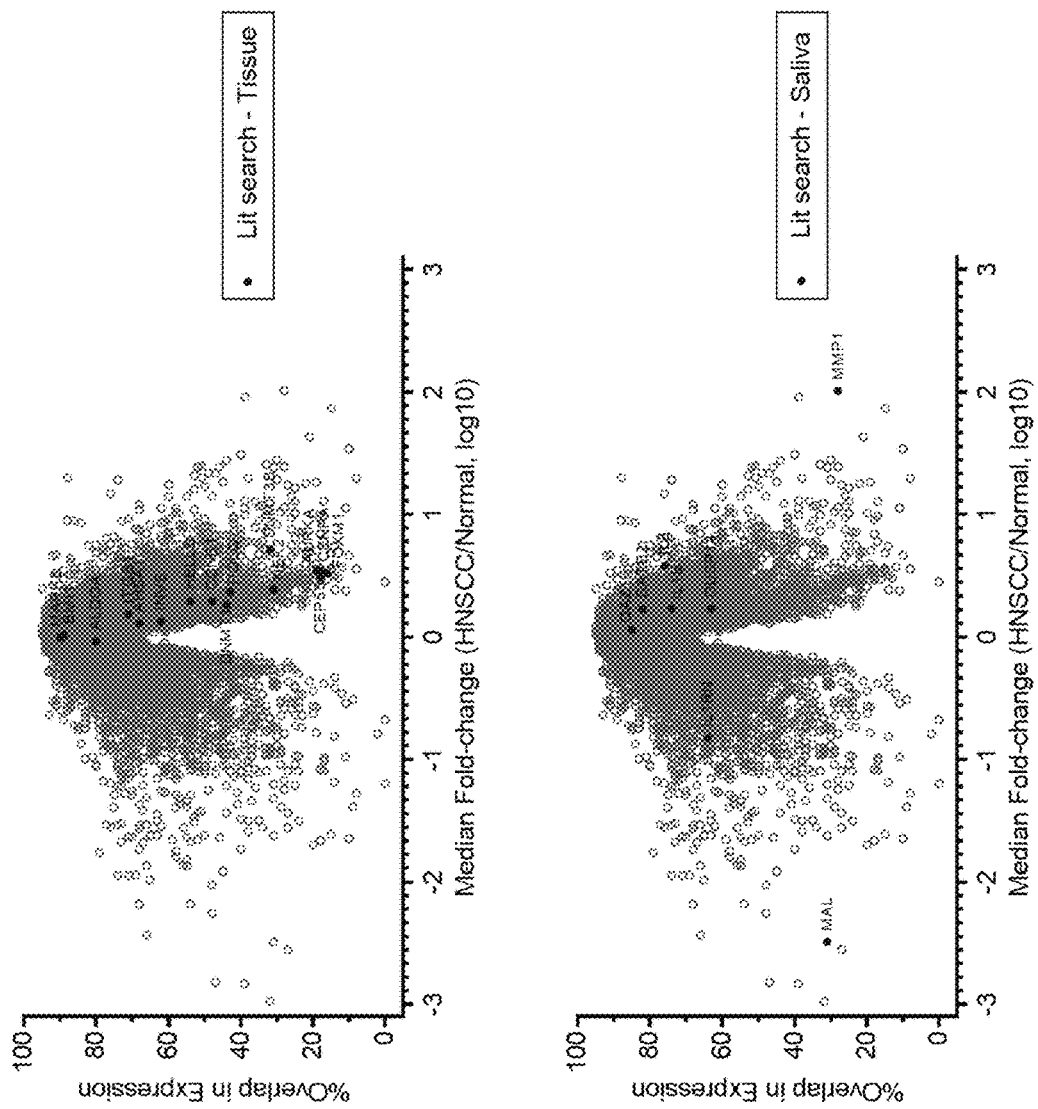

FIG. 7 shows differentially expressed markers (the darker symbols in the Figure) identified from a literature search in accordance with various embodiments of the disclosure.

Figure 8:
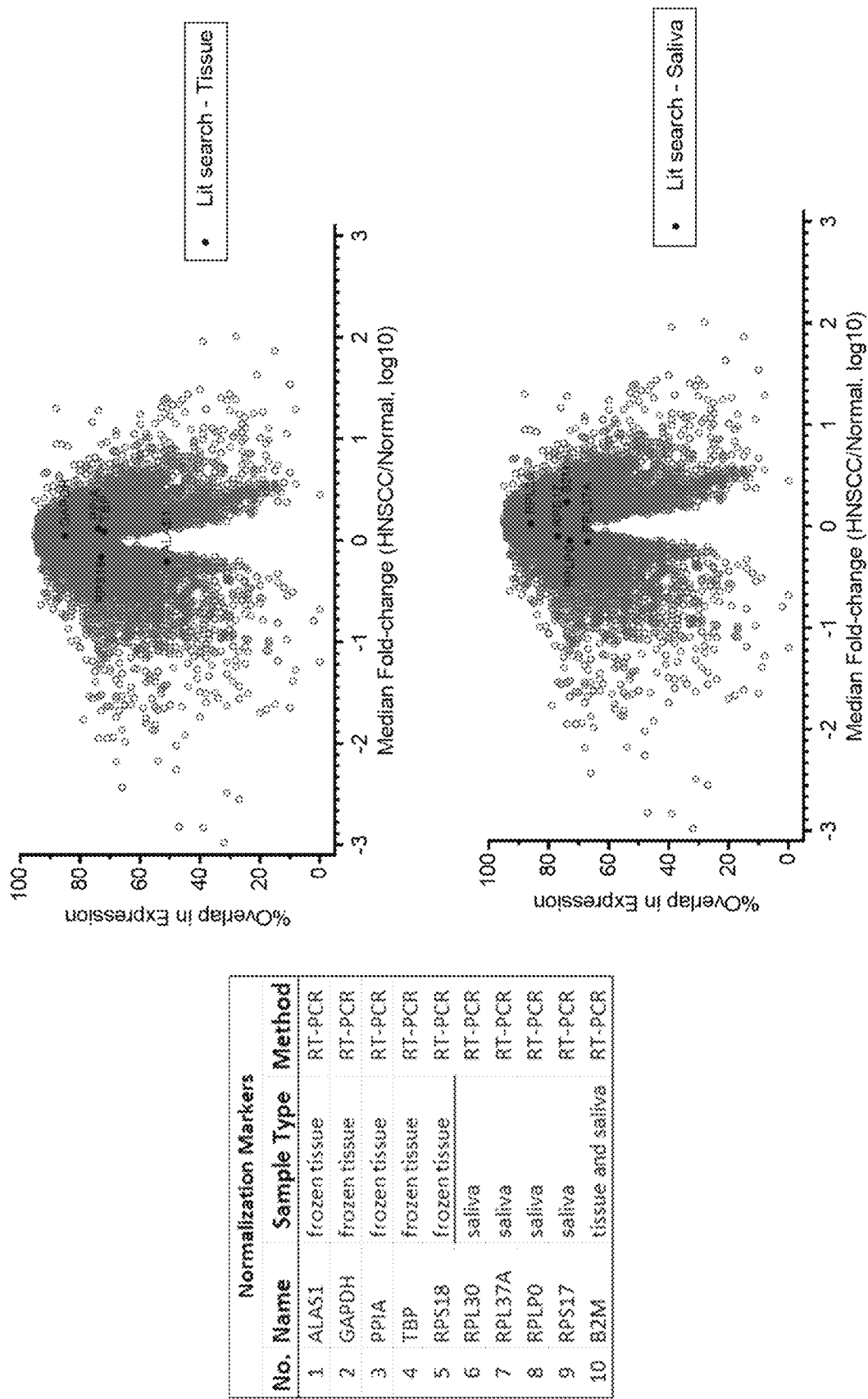

FIG. 8 shows normalization markers from a literature search in accordance with various embodiments of the disclosure.

Figure 9A:
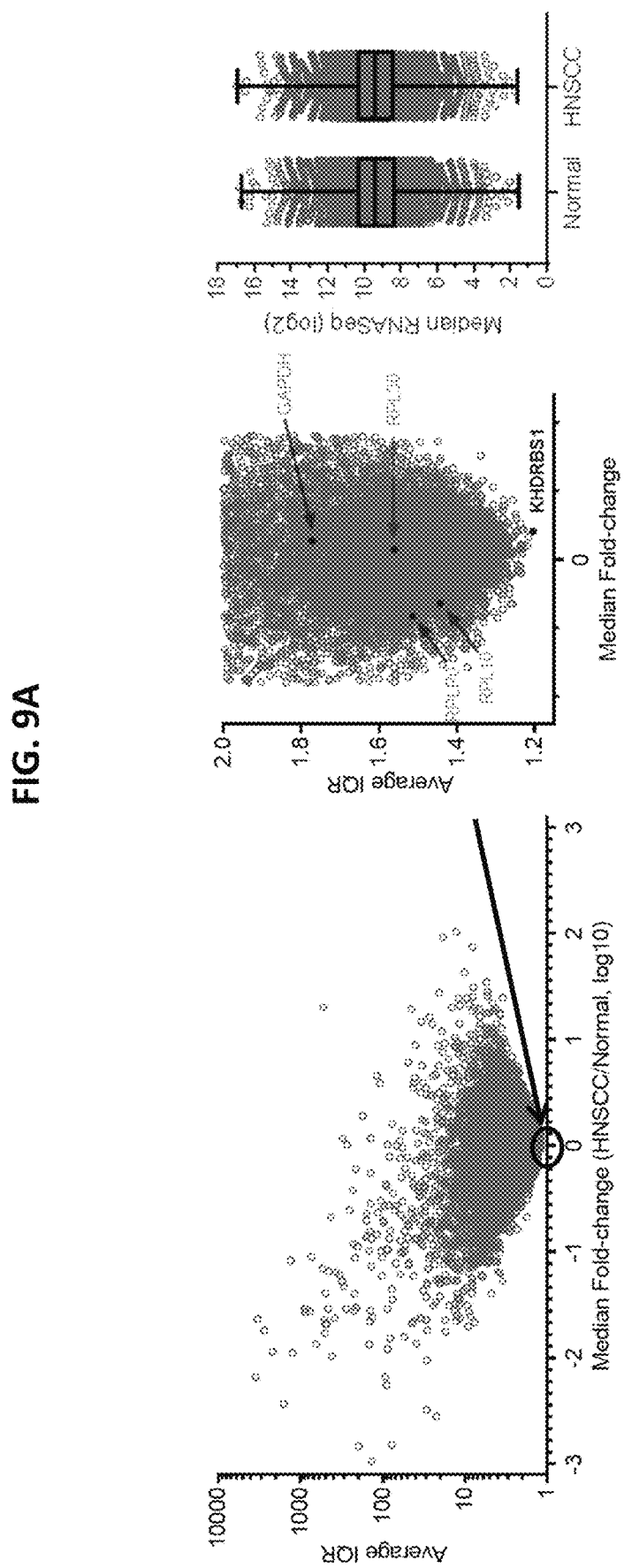
Figure 9B:
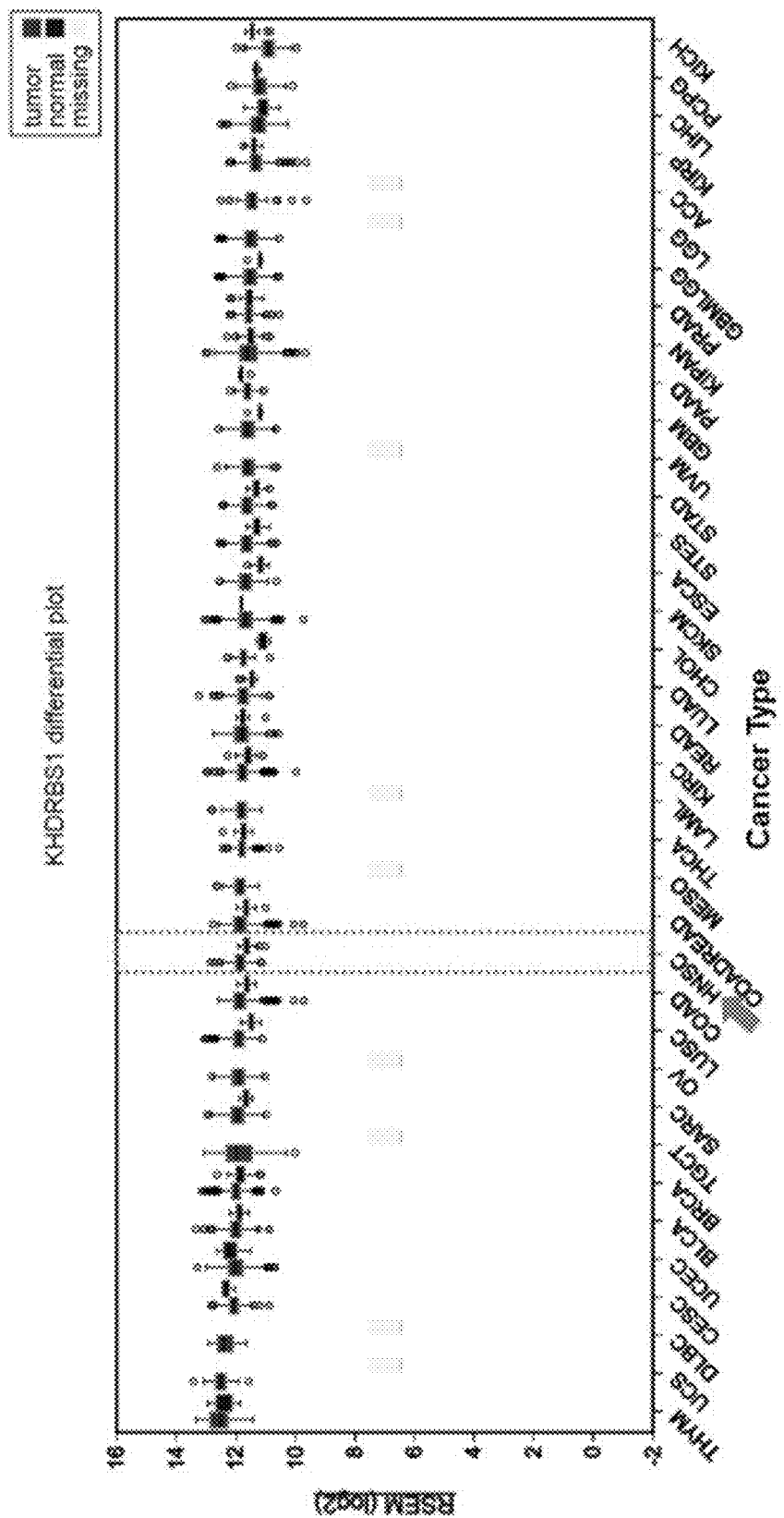

FIG. 9 Panel A (i.e., FIG. 9A) shows the identification of normalization genes using the TCGA dataset. The left panel shows the entire dataset; the middle panel shows those genes having a median fold change of gene expression between normal and cancer of <2 [positive or negative] and an Interquartile Range (IQR) of <2, where IQR=expression of 75th percentile/expression of $25^{th}$ percentile; and the right panel shows the level of expression in normal vs. HNSCC for the genes of the TCGA database to identify genes having median expression levels similar to the panel of interest in accordance with various embodiments of the disclosure. Panel B (i.e., FIG. 9B) shows a KHDRBS1 differential plot in accordance with various embodiments of the disclosure.

FIG. 10 shows a comparison of droplet digital PCR (ddPCR) data vs. TCGA RNASeq data for the level of gene expression for potential marker genes, ADAM12 and SH3BGRL2 in cancer tissue (i.e., tongue squamous cell carcinoma) as compared to normal tissue (i.e., buccal mucosa) in accordance with various embodiments of the disclosure.

Figure 11:
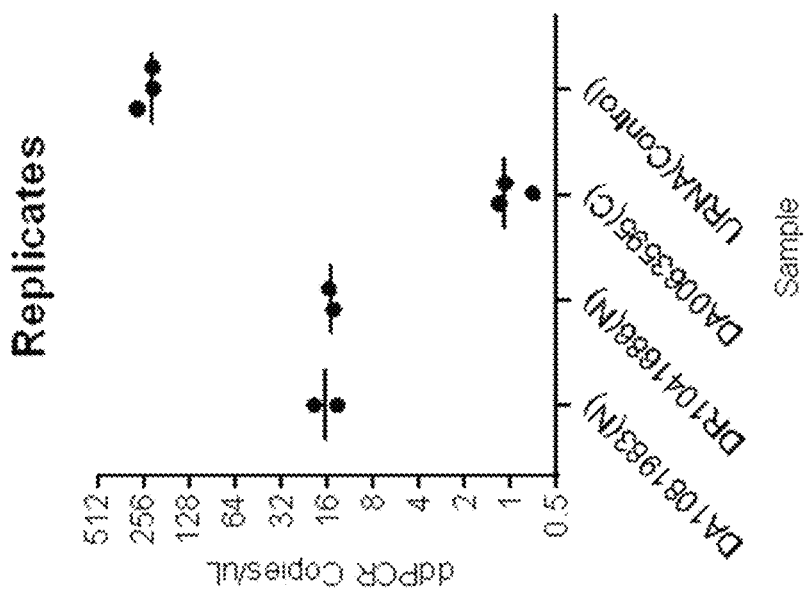

FIG. 11 shows additional ddPCR data for three formalin fixed paraffin embedded patient samples (DA1081983; DR1041686; DA0063595) and one URNA control sample (derived from cell cultured cancer tissue) using ddPCR; either duplicate or triplicate samplings were performed in accordance with various embodiments of the disclosure.

Figure 12:
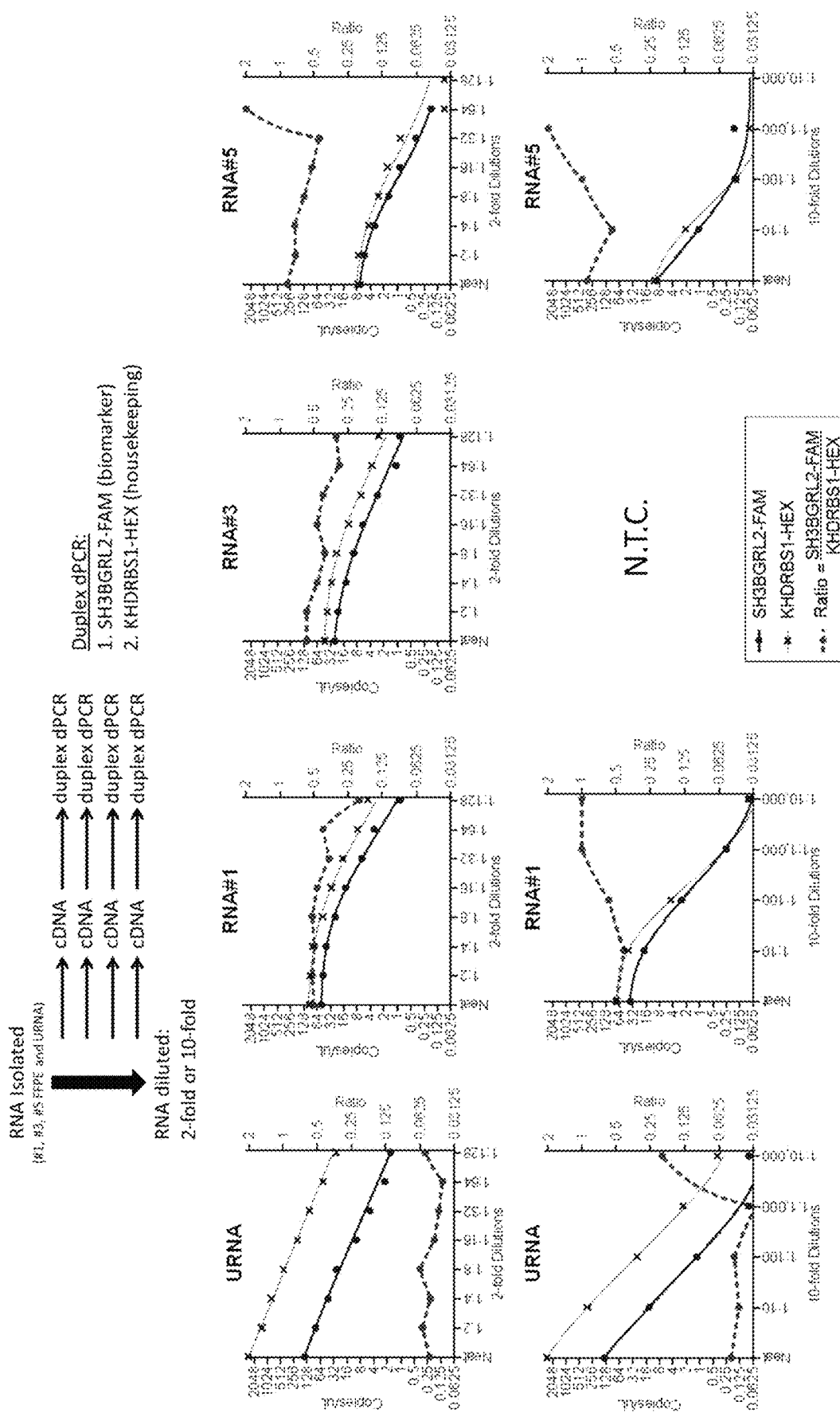

FIG. 12 shows the concentration dependence of SH3BGRL2 (a potential cancer marker (•) expression as compared to KHDRBS1 (x) (a potential normalization gene) expression in three different patient samples (RNAs 1, 3 and 5) and the URNA control showing a relatively constant ratio (dotted line) until the assay limit of one copy per L in accordance with various embodiments of the disclosure.

Figure 13:
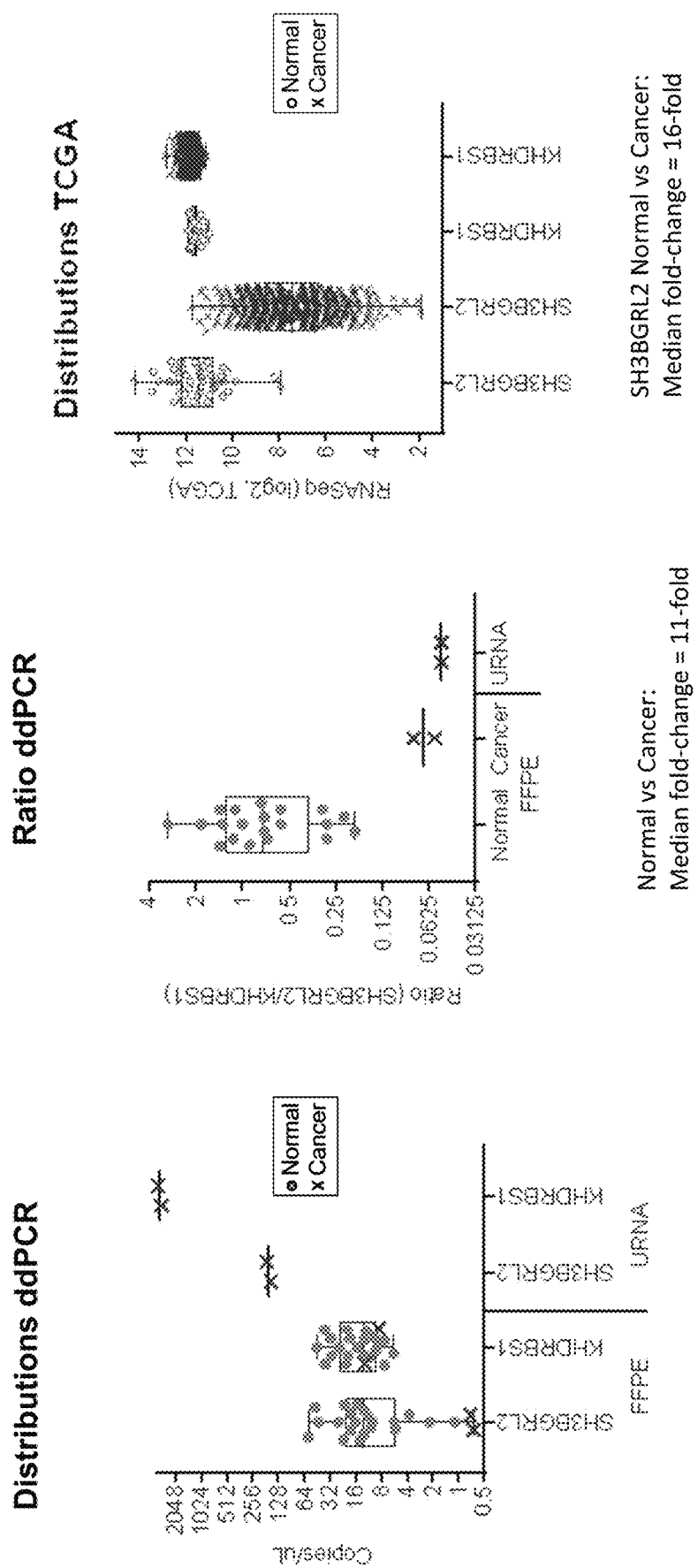

FIG. 13 shows the expression of potential cancer marker SH3BGRL2 in Formalin Fixed Paraffin Embedded (FFPE) samples as compared to the URNA control (left panel); the ratio of ddPCR product for SH3BGRL2/KHDRBS1 in cancer vs. normal tissue (middle panel); and the distribution of reported gene expression for these two markers in the TCGA database (right panel) in accordance with various embodiments of the disclosure; in this figure x are samples from cancer patients and circles (open or filled) are normal tissue samples.

Figure 14:
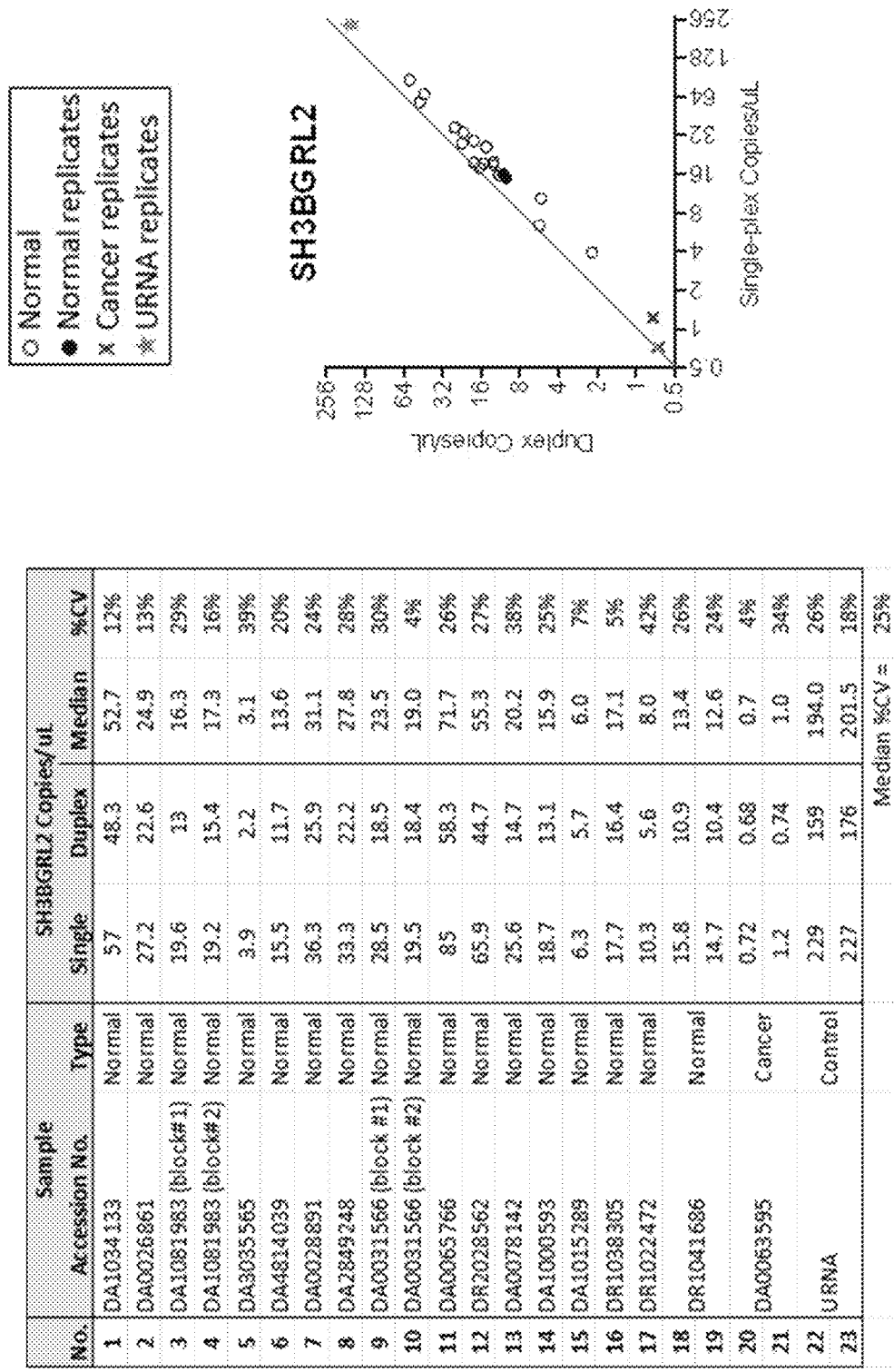

FIG. 14 shows an analysis of various patient samples for SH3BGRL2 using either a singleplex assay format (Single) (i.e., containing just SH3BGRL2 primers) or a duplex assay format (Duplex) (containing SH3BGRL2 and KHDRBS1 primers) in accordance with various embodiments of the disclosure.

Figure 15:
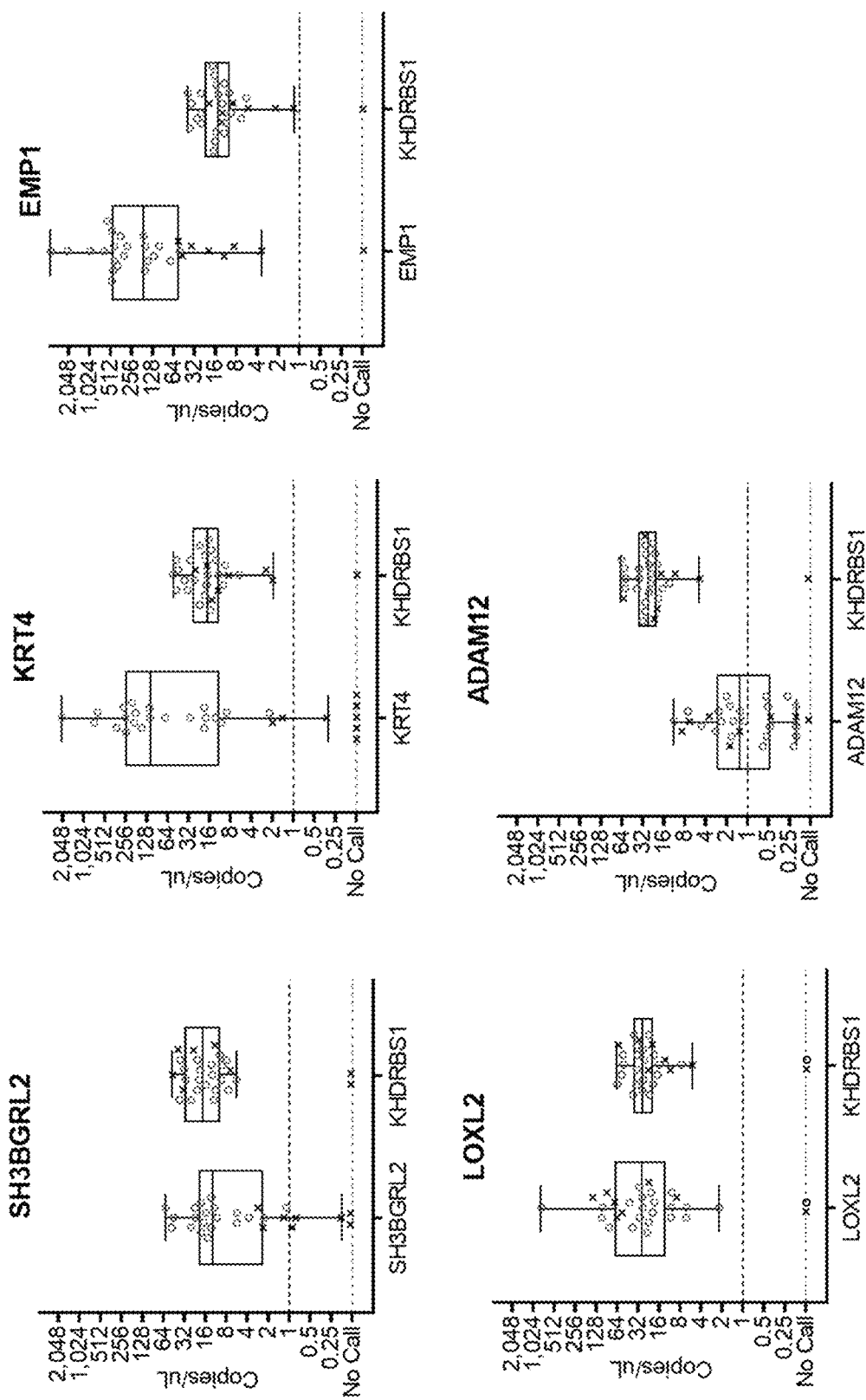

FIG. 15 shows the expression of 5 biomarkers (SH3BGRL2, KRT4, EMP1, LOXL2 and ADAM12) and the housekeeping gene KHDRBS1 with duplex ddPCR from 22 benign (circles) and 8 carcinoma (x) FFPE samples in accordance with various embodiments of the disclosure.

Figure 16:
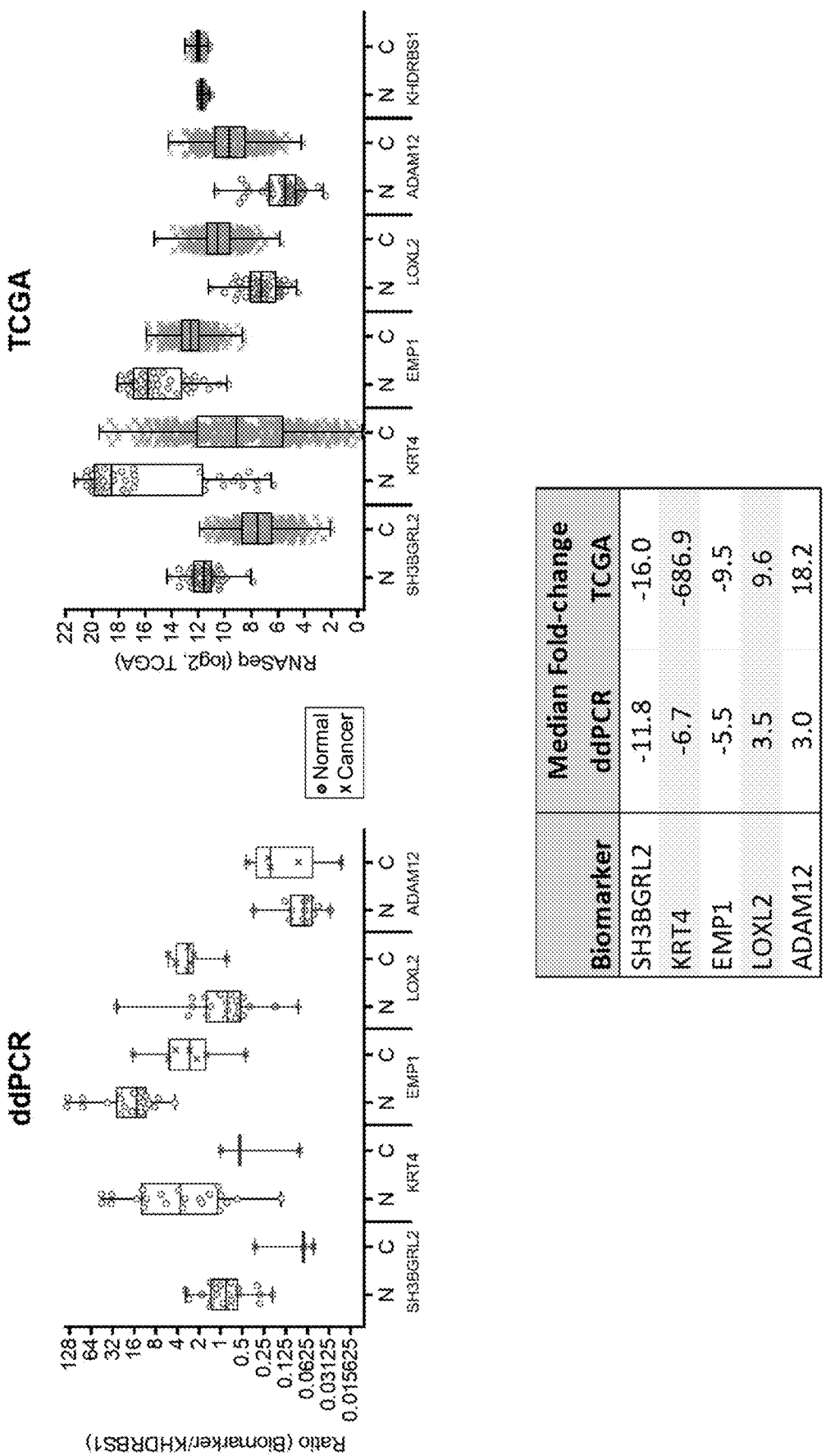

FIG. 16 shows the expression via ddPCR of 5 biomarkers following normalization to the housekeeping gene KHDRBS1 from 22 benign and 8 carcinoma FFPE samples (left panel) compared to RNASeq data from HNSCC TCGA for the same biomarkers and housekeeping gene (right panel), with the median fold-change in expression for each biomarker summarized (table) in accordance with various embodiments of the disclosure. In this Figure N=normal tissue and C=cancer tissue.

Figure 17:
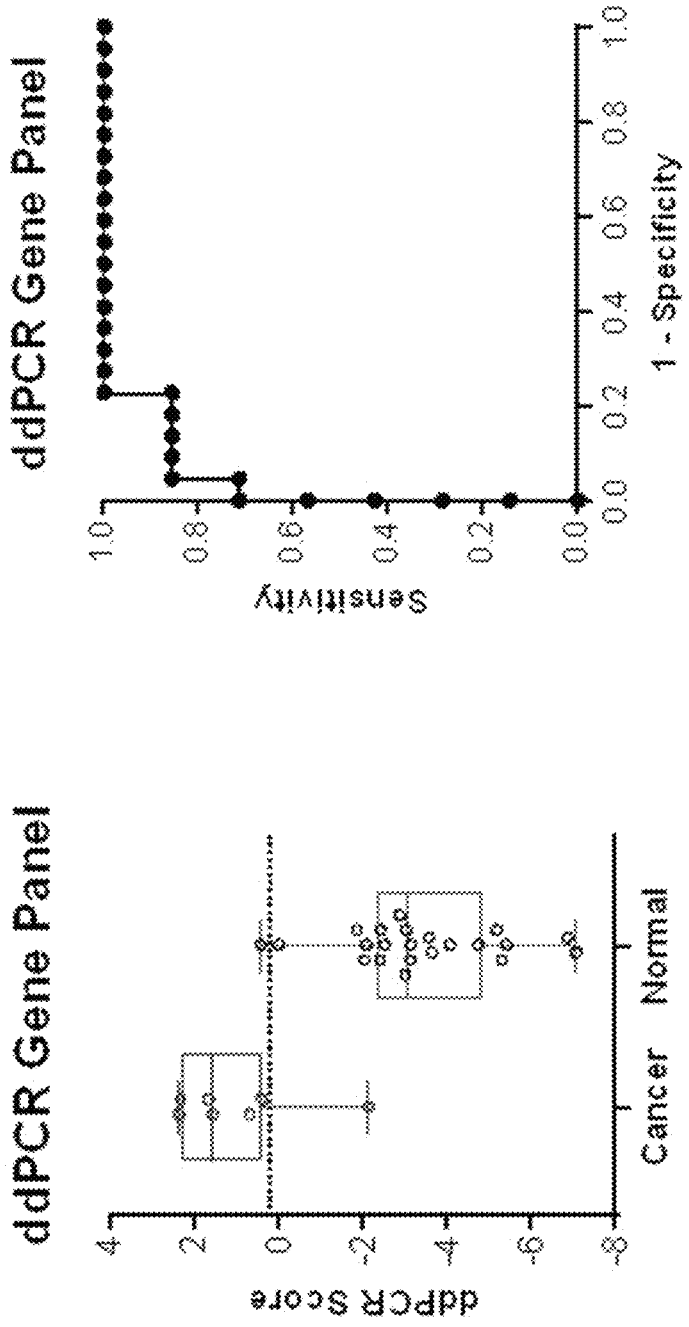

FIG. 17 shows a ddPCR score algorithm results for normalized ddPCR expression used to differentiate cancer from normal FFPE samples (left panel) with Receiver Operator Characteristic (ROC) analysis (right panel) in accordance with various embodiments of the disclosure.

Figure 18:
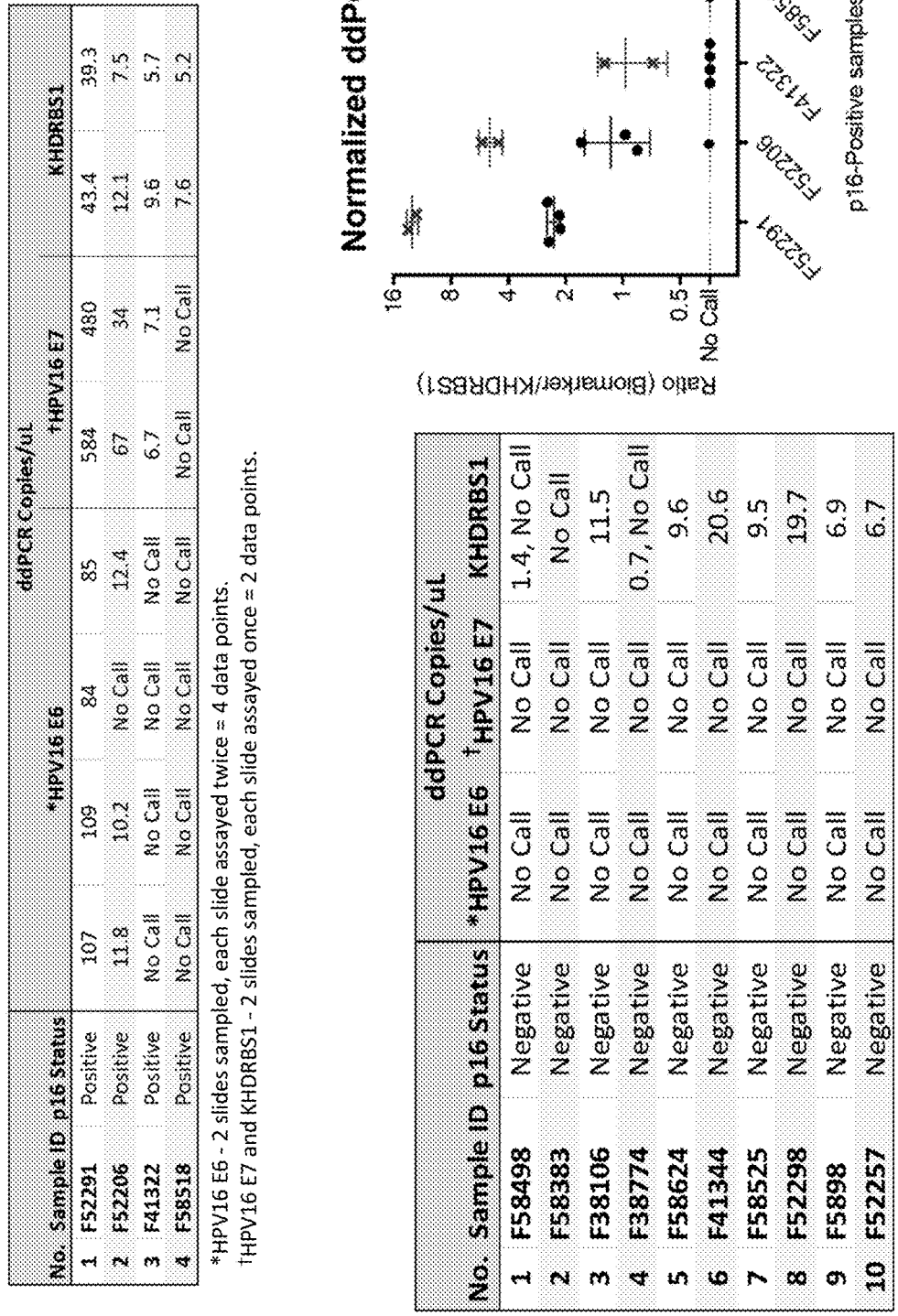

FIG. 18 shows the correlation between E6 and E7 HPV16 expression by ddPCR in p16-positive FFPE HNSCC samples (top panel) and p16-negative FFPE HNSCC samples (bottom panel); and the normalized ddPCR expression levels for E6 and E7 from the p16-positive samples (right plot) in accordance with various embodiments of the disclosure.

Figure 19:
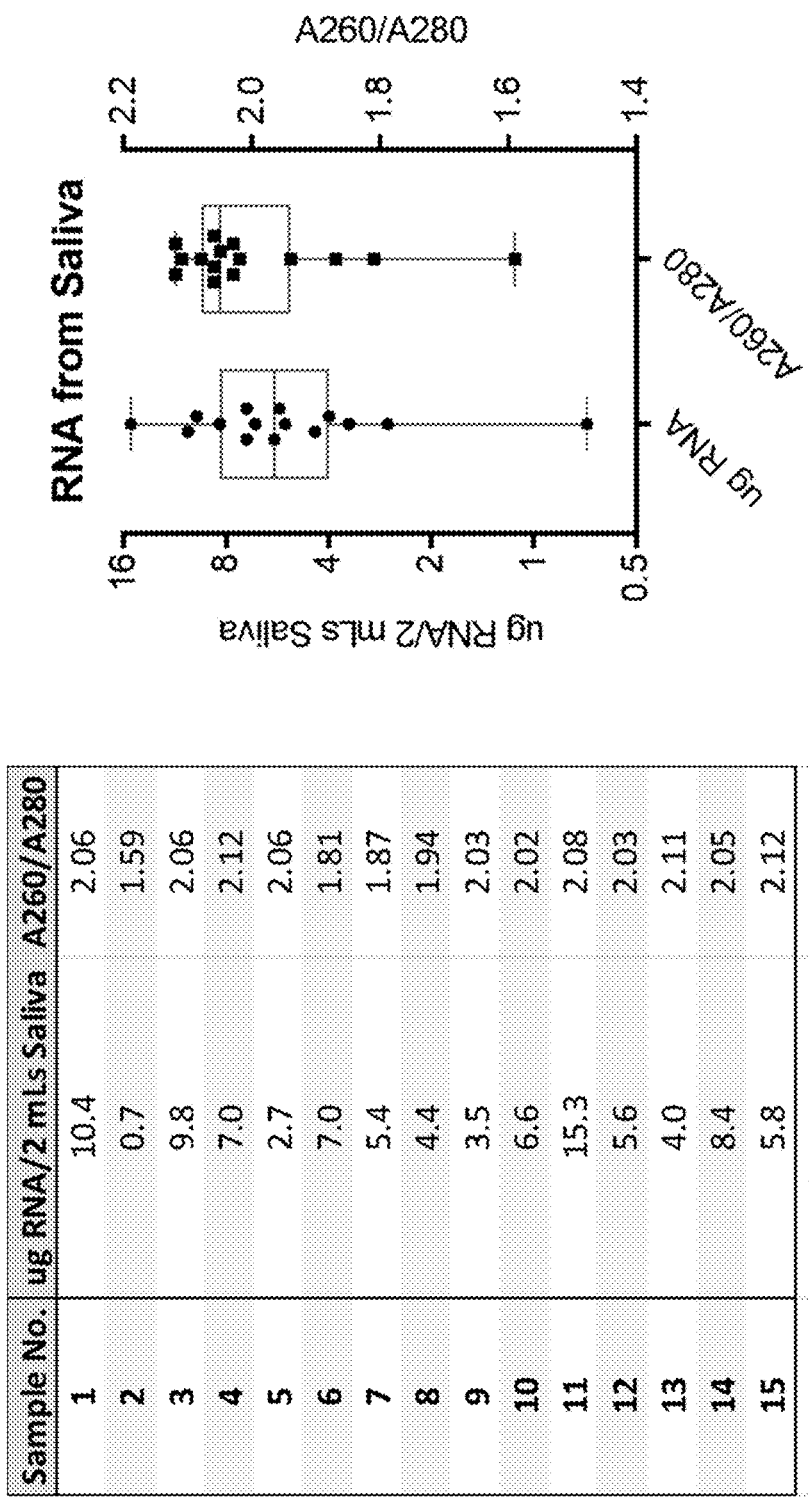

FIG. 19 shows the RNA yield (g RNA/2 mL saliva) and A260/A280 ratio from 15 saliva samples in tabular form (left table) and in a box-and-whiskers plot (right plot) in accordance with various embodiments of the disclosure.

Figure 20:
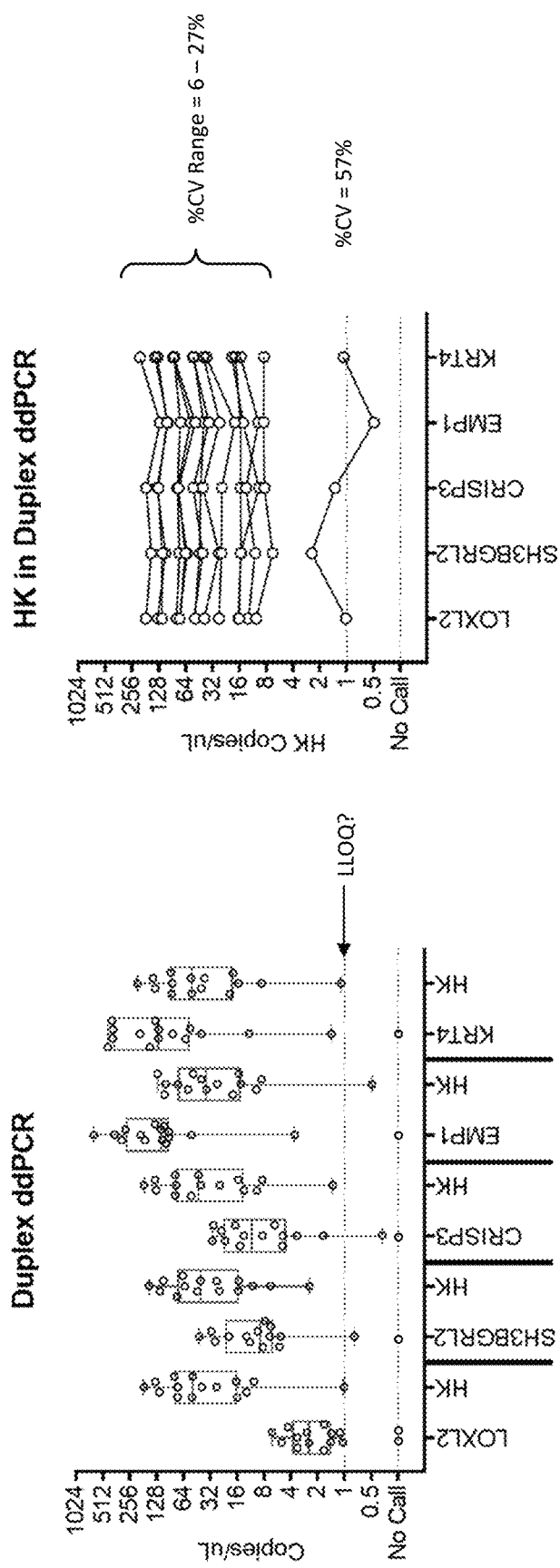

FIG. 20 shows the expression of 5 biomarkers (LOXL2, SH3BGRL2, CRISP3, EMP1, and KRT4) and the housekeeping gene RPL30 with duplex ddPCR from 15 saliva samples (left plot) and separately the expression of the housekeeping gene RPL30 from the 5 duplex ddPCR reactions (right plot) in accordance with various embodiments of the disclosure.

Figure 21:
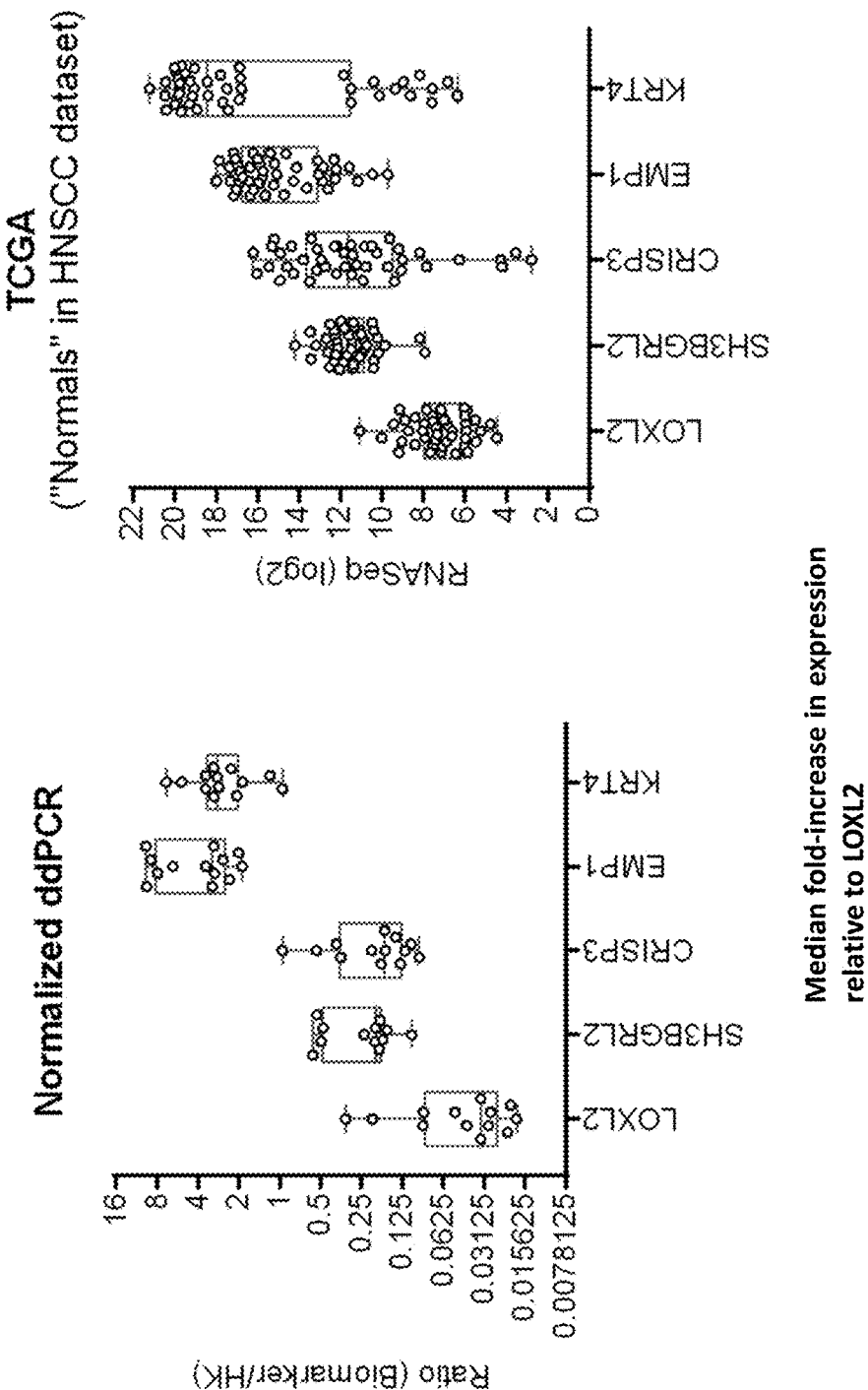

FIG. 21 shows the expression via ddPCR of 5 biomarkers following normalization to the housekeeping gene RPL30 from 15 saliva samples (left panel) compared to the RNASeq data from HNSCC TCGA for the same biomarkers (right panel), with the median fold-increase in expression relative to LOXL2 for each biomarker summarized (table) in accordance with various embodiments of the disclosure.

DETAILED DESCRIPTION

Terms and Definitions

In order for the disclosure to be more readily understood, certain terms are first defined. Additional definitions for the following terms and other terms are set forth throughout the specification.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent. The term "and/or" generally is used to refer to at least one or the other. In some cases the term "and/or" is used interchangeably with the term "or." The term "including" is used herein to mean, and is used interchangeably with, the phrase "including but not limited to." The term "such as" is used herein to mean, and is used interchangeably with, the phrase "such as but not limited to."

Unless defined otherwise, all technical and scientific terms used herein have the same meaning as commonly understood by one of ordinary skill in the art. Practitioners are particularly directed to Current Protocols in Molecular Biology (Ausubel) for definitions and terms of the art.

Antibody: As used herein, the term "antibody" refers to a polypeptide consisting of one or more polypeptides substantially encoded by immunoglobulin genes or fragments of immunoglobulin genes. The recognized immunoglobulin genes include the kappa, lambda, alpha, gamma, delta, epsilon and mu constant region genes, as well as myriad immunoglobulin variable region genes. Light chains are typically classified as either kappa or lambda. Heavy chains are typically classified as gamma, mu, alpha, delta, or epsilon, which in turn define the immunoglobulin classes, IgG, IgM, IgA, IgD and IgE, respectively. A typical immunoglobulin (antibody) structural unit is known to comprise a tetramer. Each tetramer is composed of two identical pairs of polypeptide chains, each pair having one "light" (about 25 kD) and one "heavy" chain (about 50-70 kD). The N-terminus of each chain defines a variable region of about 100 to 110 or more amino acids primarily responsible for antigen recognition. The terms "variable light chain" (VL) and "variable heavy chain" (VH) refer to these light and heavy chains respectively. An antibody can be specific for a particular antigen. The antibody or its antigen can be either an analyte or a binding partner. Antibodies exist as intact immunoglobulins or as a number of well-characterized fragments produced by digestion with various peptidases. Thus, for example, pepsin digests an antibody below the disulfide linkages in the hinge region to produce F(ab)'2, a dimer of Fab which itself is a light chain joined to VH-CH1 by a disulfide bond. The F(ab)'2 may be reduced under mild conditions to break the disulfide linkage in the hinge region thereby converting the (Fab')2 dimer into an Fab' monomer. The Fab' monomer is essentially an Fab with part of the hinge region (see, Fundamental Immunology, W. E. Paul, ed., Raven Press, N.Y. (1993), for a more detailed description of other antibody fragments). While various antibody fragments are defined in terms of the digestion of an intact antibody, one of ordinary skill in the art will appreciate that such Fab' fragments may be synthesized de novo either chemically or by utilizing recombinant DNA methodology. Thus, the term "antibody," as used herein also includes antibody fragments either produced by the modification of whole antibodies or synthesized de novo using recombinant DNA methodologies. In some embodiments, antibodies are single chain antibodies, such as single chain Fv (scFv) antibodies in which a variable heavy and a variable light chain are joined together (directly or through a peptide linker) to form a continuous polypeptide. A single chain Fv ("scFv") polypeptide is a covalently linked VH::VL heterodimer which may be expressed from a nucleic acid including VH- and VL-encoding sequences either joined directly or joined by a peptide-encoding linker. (See, e.g., Huston, et al. (1988) Proc. Nat. Acad. Sci. USA, 85:5879-5883, the entire contents of which are herein incorporated by reference.) A number of structures exist for converting the naturally aggregated, but chemically separated light and heavy polypeptide chains from an antibody V region into an scFv molecule which will fold into a three dimensional structure substantially similar to the structure of an antigen-binding site. See, e.g. U.S. Pat. Nos. 5,091,513 and 5,132,405 and 4,956,778.

The term "antibody" includes monoclonal antibodies, polyclonal antibodies, synthetic antibodies and chimeric antibodies, e.g., generated by combinatorial mutagenesis and phage display. The term "antibody" also includes mimetics or peptidomimetics of antibodies. Peptidomimetics are compounds based on, or derived from, peptides and proteins. The peptidomimetics of the present disclosure typically can be obtained by structural modification of a known peptide sequence using unnatural amino acids, conformational restraints, isosteric replacement, and the like.

Allele: As used herein, the term "allele" refers to different versions of a nucleotide sequence of a same genetic locus (e.g., a gene).

Allele specific primer extension (ASPE): As used herein, the term "allele specific primer extension (ASPE)" refers to a mutation detection method utilizing primers which hybridize to a corresponding DNA sequence and which are extended depending on the successful hybridization of the 3' terminal nucleotide of such primer. Typically, extension primers that possess a 3' terminal nucleotide which form a perfect match with the target sequence are extended to form extension products. Modified nucleotides can be incorporated into the extension product, such nucleotides effectively labeling the extension products for detection purposes. Alternatively, an extension primer may instead comprise a 3' terminal nucleotide which forms a mismatch with the target sequence. In this instance, primer extension does not occur unless the polymerase used for extension inadvertently possesses exonuclease activity.

Amplification: As used herein, the term "amplification" refers to any methods known in the art for copying a target nucleic acid, thereby increasing the number of copies of a selected nucleic acid sequence. Amplification may be exponential or linear. A target nucleic acid may be either DNA or RNA. Typically, the sequences amplified in this manner form an "amplicon." Amplification may be accomplished with various methods including, but not limited to, the polymerase chain reaction ("PCR"), transcription-based amplification, isothermal amplification, rolling circle amplification, etc. Amplification may be performed with relatively similar amount of each primer of a primer pair to generate a double stranded amplicon. However, asymmetric PCR may be used to amplify predominantly or exclusively a single stranded product as is well known in the art (e.g., Poddar, *Molec. And Cell. Probes* 14:25-32 (2000)). This can be achieved using each pair of primers by reducing the concentration of one primer significantly relative to the other primer of the pair (e.g., 100 fold difference). Amplification by asymmetric PCR is generally linear. A skilled artisan will understand that different amplification methods may be used together.

Animal: As used herein, the term "animal" refers to any member of the animal kingdom. In some embodiments, "animal" refers to humans, at any stage of development. In some embodiments, "animal" refers to non-human animals, at any stage of development. In certain embodiments, the non-human animal is a mammal (e.g., a rodent, a mouse, a rat, a rabbit, a monkey, a dog, a cat, a sheep, cattle, a primate, and/or a pig). In some embodiments, animals include, but are not limited to, mammals, birds, reptiles, amphibians, fish, insects, and/or worms. In some embodiments, an animal may be a transgenic animal, genetically-engineered animal, and/or a clone.

Approximately: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Thus, the term "about" is used to indicate that a value includes the inherent variation of error for the device, the method being employed to determine the value, or the variation that exists among samples.

Associated with a syndrome or disease of interest: As used herein, "associated with a syndrome or disease of interest" means that the variant is found with in patients with the syndrome or disease of interest more than in non-syndromic or non-disease controls. Generally, the statistical significance of such association can be determined by assaying a plurality of patients.

Biological sample. As used herein, the term "biological sample" or "sample" encompasses any sample obtained from a biological source. A biological sample can, by way of non-limiting example, include blood, amniotic fluid, sera, plasma, liquid or tissue biopsy, urine, feces, epidermal sample, skin sample, cheek swab, sperm, amniotic fluid, cultured cells, bone marrow sample and/or chorionic villi. Convenient biological samples may be obtained by, for example, scraping cells from the surface of the buccal cavity. The term biological sample encompasses samples which have been processed to release or otherwise make available a nucleic acid or protein for detection as described herein. The term biological sample also includes cell-free nucleic acid that may be present in a sample (e.g., plasma or amniotic fluid). For example, a biological sample may include a cDNA that has been obtained by reverse transcription of RNA from cells in a biological sample. The biological sample may be obtained from a stage of life such as a fetus, young adult, adult, and the like. Fixed or frozen tissues also may be used.

Biomarker: As used herein, the term "biomarker" or "marker" refers to one or more nucleic acids, polypeptides and/or other biomolecules (e.g., cholesterol, lipids) that can be used to diagnose, or to aid in the diagnosis or prognosis of a disease or syndrome of interest, either alone or in combination with other biomarkers; monitor the progression of a disease or syndrome of interest; and/or monitor the effectiveness of a treatment for a syndrome or a disease of interest.

Binding agent: As used herein, the term "binding agent" refers to a molecule that can specifically and selectively bind to a second (i.e., different) molecule of interest. The interaction may be non-covalent, for example, as a result of hydrogen-bonding, van der Waals interactions, or electrostatic or hydrophobic interactions, or it may be covalent. The term "soluble binding agent" refers to a binding agent that is not associated with (i.e., covalently or non-covalently bound) to a solid support.

Carrier: The term "carrier" refers to a person who is symptom-free but carries a mutation that can be passed to his/her children. Typically, for an autosomal recessive disorder, a carrier has one allele that contains a disease causing mutation and a second allele that is normal or not disease-related.

Coding sequence vs. non-coding sequence: As used herein, the term "coding sequence" refers to a sequence of a nucleic acid or its complement, or a part thereof, that can be transcribed and/or translated to produce the mRNA for and/or the polypeptide or a fragment thereof. Coding sequences include exons in a genomic DNA or immature primary RNA transcripts, which are joined together by the cell's biochemical machinery to provide a mature mRNA. The anti-sense strand is the complement of such a nucleic acid, and the encoding sequence can be deduced therefrom. As used herein, the term "non-coding sequence" refers to a sequence of a nucleic acid or its complement, or a part thereof, that is not transcribed into amino acid in vivo, or where tRNA does not interact to place or attempt to place an amino acid. Non-coding sequences include both intron sequences in genomic DNA or immature primary RNA transcripts, and gene-associated sequences such as promoters, enhancers, silencers, etc.

Complement: As used herein, the terms "complement," "complementary" and "complementarity," refer to the pairing of nucleotide sequences according to Watson/Crick pairing rules. For example, a sequence 5'-GCGGTCCCA-3' has the complementary sequence of 5'-TGGGACCGC-3'. A complement sequence can also be a sequence of RNA complementary to the DNA sequence. Certain bases not commonly found in natural nucleic acids may be included in the complementary nucleic acids including, but not limited to, inosine, 7-deazaguanine, Locked Nucleic Acids (LNA), and Peptide Nucleic Acids (PNA). Complementary need not be perfect; stable duplexes may contain mismatched base pairs, degenerative, or unmatched bases. Those skilled in the art of nucleic acid technology can determine duplex stability empirically considering a number of variables including, for example, the length of the oligonucleotide, base composition and sequence of the oligonucleotide, ionic strength and incidence of mismatched base pairs.

Conserved: As used herein, the term "conserved residues" refers to amino acids that are the same among a plurality of proteins having the same structure and/or function. A region of conserved residues may be important for protein structure or function. Thus, contiguous conserved residues as identified in a three-dimensional protein may be important for protein structure or function. To find conserved residues, or conserved regions of 3-D structure, a comparison of sequences for the same or similar proteins from different species, or of individuals of the same species, may be made.

Control: As used herein, the term "control" has its art-understood meaning of being a standard against which results are compared. Typically, controls are used to augment integrity in experiments by isolating variables in order to make a conclusion about such variables. In some embodiments, a control is a reaction or assay that is performed simultaneously with a test reaction or assay to provide a comparator. In one experiment, the "test" (i.e., the variable being tested) is applied. In the second experiment, the "control," the variable being tested is not applied. In some embodiments, a control is a historical control (i.e., of a test or assay performed previously, or an amount or result that is previously known). In some embodiments, a control is or comprises a printed or otherwise saved record. A control may be a positive control or a negative control.

A "control" or "predetermined standard" for a biomarker refers to the levels of expression of the biomarker in healthy subjects or the expression levels of said biomarker in non-diseased or non-syndromic tissue from the same subject. The control or predetermined standard expression levels or amounts of protein for a given biomarker can be established by prospective and/or retrospective statistical studies using only routine experimentation. Such predetermined standard expression levels and/or protein levels (amounts) can be determined by a person having ordinary skill in the art using well known methods. A positive control is a sample (or reagent) that provides a predetermined amount of the signal being measured.

Crude: As used herein, the term "crude," when used in connection with a biological sample, refers to a sample which is in a substantially unrefined state. For example, a crude sample can be cell lysates or biopsy tissue sample. A crude sample may exist in solution or as a dry preparation.

Deletion: As used herein, the term "deletion" encompasses a mutation that removes one or more nucleotides from a naturally-occurring nucleic acid.

Disease or syndrome of interest: As used herein, a disease or syndrome of interest is head and neck cancer, and in some embodiments, more specifically HNSCC.

Detect: As used herein, the term "detect", "detected" or "detecting" includes "measure," "measured" or"measuring" and vice versa.

Detectable moiety: As used herein, the term "detectable moiety" or "detectable biomolecule" or "reporter" refers to a molecule that can be measured in a quantitative assay. For example, a detectable moiety may comprise an enzyme that may be used to convert a substrate to a product that can be measured (e.g., a visible product). Or, a detectable moiety may be a radioisotope that can be quantified. Or, a detectable moiety may be a fluorophore. Or, a detectable moiety may be a luminescent molecule. Or, other detectable molecules may be used.

Epigenetic: As used herein, an epigenetic element can change gene expression by a mechanism other than a change in the underlying DNA sequences. Such elements may include elements that regulate paramutation, imprinting, gene silencing, X chromosome inactivation, position effect, reprogramming, transvection, maternal effects, histone modification, and heterochromatin.

Epitope: As used herein, the term "epitope" refers to a fragment or portion of a molecule or a molecule compound (e.g., a polypeptide or a protein complex) that makes contact with a particular antibody or antibody like proteins.

Exon: As used herein an exon is a nucleic acid sequence that is found in mature or processed RNA after other portions of the RNA (e.g., intervening regions known as introns) have been removed by RNA splicing. As such, exon sequences generally encode for proteins or portions of proteins. An intron is the portion of the RNA that is removed from surrounding exon sequences by RNA splicing.

Expression and expressed RNA: As used herein expressed RNA is an RNA that encodes for a protein or polypeptide ("coding RNA"), and any other RNA that is transcribed but not translated ("non-coding RNA"). The term "expression" is used herein to mean the process by which a polypeptide is produced from DNA. The process involves the transcription of the gene into mRNA and the translation of this mRNA into a polypeptide. Depending on the context in which used, "expression" may refer to the production of RNA, protein or both.

The measurement of an amount of a protein and/or the expression of a biomarker of the disclosure may be assessed by any of a wide variety of well-known methods for detecting expression of a transcribed molecule or its corresponding protein. Non-limiting examples of such methods include immunological methods for detection of secreted proteins, protein purification methods, protein function or activity assays, nucleic acid hybridization methods, nucleic acid reverse transcription methods, and nucleic acid amplification methods. In certain embodiments, expression of a marker gene is assessed using an antibody (e.g. a radiolabeled, chromophore-labeled, fluorophore-labeled, or enzyme-labeled antibody), an antibody derivative (e.g. an antibody conjugated with a substrate or with the protein or ligand of a protein-ligand pair {e.g. biotin-streptavidin}), or an antibody fragment (e.g. a single-chain antibody, an isolated antibody hypervariable domain, etc.) which binds specifically with a protein corresponding to the marker gene, such as the protein encoded by the open reading frame corresponding to the marker gene or such a protein which has undergone all or a portion of its normal post-translational modification. In certain embodiments, a reagent may be directly or indirectly labeled with a detectable substance. The detectable substance may be, for example, selected, e.g., from a group consisting of radioisotopes, fluorescent compounds, enzymes, and enzyme co-factor. Methods of labeling antibodies are well known in the art.

In another embodiment, expression of a marker gene is assessed by preparing mRNA/cDNA (i.e. a transcribed polynucleotide) from cells in a sample, and by hybridizing the mRNA/cDNA with a reference polynucleotide which is a complement of a polynucleotide comprising the marker gene, and fragments thereof. cDNA can, optionally, be amplified using any of a variety of polymerase chain reaction methods prior to hybridization with the reference polynucleotide; preferably, it is not amplified.

Familial history: As used herein, the term "familial history" typically refers to occurrence of events (e.g., disease related disorder or mutation carrier) relating to an individual's immediate family members including parents and siblings. Family history may also include grandparents and other relatives.

Flanking. As used herein, the term "flanking" is meant that a primer hybridizes to a target nucleic acid adjoining a region of interest sought to be amplified on the target. The skilled artisan will understand that preferred primers are pairs of primers that hybridize 5' (upstream) from a region of interest, one on each strand of a target double stranded DNA molecule, such that nucleotides may be add to the 3' end of the primer by a suitable DNA polymerase. For example, primers that flank mutant sequences do not actually anneal to the mutant sequence but rather anneal to a sequence that adjoins the mutant sequence. In some cases, primers that flank an exon are generally designed not to anneal to the exon sequence but rather to anneal to sequence that adjoins the exon (e.g. intron sequence). However, in some cases, amplification primer may be designed to anneal to the exon sequence.

Gene: As used herein a gene is a unit of heredity. Generally, a gene is a portion of DNA that encodes a protein or a functional RNA. A gene is a locatable region of genomic sequence corresponding to a unit of inheritance. A gene may be associated with regulatory regions, transcribed regions, and or other functional sequence regions.

Genotype: As used herein, the term "genotype" refers to the genetic constitution of an organism. More specifically, the term refers to the identity of alleles present in an individual. "Genotyping" of an individual or a DNA sample refers to identifying the nature, in terms of nucleotide base, of the two alleles possessed by an individual at a known polymorphic site.

Gene regulatory element: As used herein a gene regulatory element or regulatory sequence is a segment of DNA where regulatory proteins, such as transcription factors, bind to regulate gene expression. Such regulatory regions are often upstream of the gene being regulated.

Healthy individual: As used herein, the term "healthy individual" or "control" refers to a subject has not been diagnosed with the syndrome and/or disease of interest.

Heterozygous: As used herein, the term "heterozygous" or "HET" refers to an individual possessing two different alleles of the same gene. As used herein, the term "heterozygous" encompasses "compound heterozygous" or "compound heterozygous mutant." As used herein, the term "compound heterozygous" refers to an individual possessing two different alleles. As used herein, the term "compound heterozygous mutant" refers to an individual possessing two different copies of an allele, such alleles are characterized as mutant forms of a gene.

Homozygous: As used herein, the term "homozygous" refers to an individual possessing two copies of the same allele. As used herein, the term "homozygous mutant" refers to an individual possessing two copies of the same allele, such allele being characterized as the mutant form of a gene.

Housekeeping or normalization genes: As used herein, "housekeeping genes" are those genes that are generally constitutively expressed in all cells because they provide basic functions needed for sustenance of all cell types. Housekeeping genes or "normalization genes" are measured simultaneously with the genes of interest to account for variations due to sample-to-sample variation. Such sample to sample variation may reflect variances in experimental variables such as, but not limited to, RNA isolation, and reverse transcription and PCR efficiencies. Normalization involves reporting the ratios of the gene of interest to that of the housekeeping gene. See e.g., Bustin, S. A. et al 2009. The MIQE guidelines: minimum information for publication of quantitative real-time PCR experiments. Clin Chem, April; 55(4):611-622.

Hybridize: As used herein, the term "hybridize" or "hybridization" refers to a process where two complementary nucleic acid strands anneal to each other under appropriately stringent conditions. Oligonucleotides or probes suitable for hybridizations typically contain 10-100 nucleotides in length (e.g., 18-50, 12-70, 10-30, 10-24, 18-36 nucleotides in length). Nucleic acid hybridization techniques are well known in the art. Those skilled in the art understand how to estimate and adjust the stringency of hybridization conditions such that sequences having at least a desired level of complementary will stably hybridize, while those having lower complementary will not. For examples of hybridization conditions and parameters, see, e.g., Sambrook, et al., 1989, Molecular Cloning: A Laboratory Manual, Second Edition, Cold Spring Harbor Press, Plainview, N.Y.; Ausubel, F. M. et al. 1994, Current Protocols in Molecular Biology. John Wiley & Sons, Secaucus, N.J.

Identity or percent identical: As used herein, the terms "identity" or "percent identical" refers to sequence identity between two amino acid sequences or between two nucleic acid sequences. Percent identity can be determined by aligning two sequences and refers to the number of identical residues (i.e., amino acid or nucleotide) at positions shared by the compared sequences. Sequence alignment and comparison may be conducted using the algorithms standard in the art (e.g. Smith and Waterman, 1981, *Adv. Appl. Math.* 2:482-489; Needleman and Wunsch, 1970, *J. Mol. Biol.* 48:443-453; Pearson and Lipman, 1988, *Proc. Natl. Acad. Sci., USA,* 85:2444-2448) or by computerized versions of these algorithms (Wisconsin Genetics Software Package Release 7.0, Genetics Computer Group, 575 Science Drive, Madison, WI) publicly available as BLAST and FASTA. Also, ENTREZ, available through the National Institutes of Health, Bethesda MD, may be used for sequence comparison. In other cases, commercially available software, such as GenomeQuest, may be used to determine percent identity. When utilizing BLAST and Gapped BLAST programs, the default parameters of the respective programs (e.g., BLASTN; available at the Internet site for the National Center for Biotechnology Information) may be used. In one embodiment, the percent identity of two sequences may be determined using GCG with a gap weight of 1, such that each amino acid gap is weighted as if it were a single amino acid mismatch between the two sequences. Or, the ALIGN program (version 2.0), which is part of the GCG (Accelrys, San Diego, CA) sequence alignment software package may be used.

As used herein, the term at least 90% identical thereto includes sequences that range from 90 to 100% identity to the indicated sequences and includes all ranges in between. Thus, the term at least 90% identical thereto includes sequences that are 91, 91.5, 92, 92.5, 93, 93.5, 94, 94.5, 95, 95.5, 96, 96.5, 97, 97.5, 98, 98.5, 99, 99.5 percent identical to the indicated sequence. Similarly, the term "at least 70% identical includes sequences that range from 70 to 100% identical, with all ranges in between. The determination of percent identity is determined using the algorithms described herein.

Insertion or addition: As used herein, the term "insertion" or "addition" refers to a change in an amino acid or nucleotide sequence resulting in the addition of one or more amino acid residues or nucleotides, respectively, as compared to the naturally occurring molecule.

In vitro: As used herein, the term "in vitro" refers to events that occur in an artificial environment, e.g., in a test tube or reaction vessel, in cell culture, etc., rather than within a multi-cellular organism.

In vivo: As used herein, the term "in vivo" refers to events that occur within a multi-cellular organism such as a human or non-human animal.

Isolated: As used herein, the term "isolated" refers to a substance and/or entity that has been (1) separated from at least some of the components with which it was associated when initially produced (whether in nature and/or in an experimental setting), and/or (2) produced, prepared, and/or manufactured by the hand of man. Isolated substances and/or entities may be separated from at least about 10%, about 20%, about 30%, about 40%, about 50%, about 60%, about 70%, about 80%, about 90%, about 95%, about 98%, about 99%, substantially 100%, or 100% of the other components with which they were initially associated. In some embodiments, isolated agents are more than about 80%, about 85%, about 90%, about 91%, about 92%, about 93%, about 94%, about 95%, about 96%, about 97%, about 98%, about 99%, substantially 100%, or 100% pure. As used herein, a substance is "pure" if it is substantially free of other components. As used herein, the term "isolated cell" refers to a cell not contained in a multi-cellular organism.

Labeled: The terms "labeled" and "labeled with a detectable agent or moiety" are used herein interchangeably to specify that an entity (e.g., a nucleic acid probe, antibody, etc.) can be measured by detection of the label (e.g., visualized, detection of radioactivity and the like) for example following binding to another entity (e.g., a nucleic acid, polypeptide, etc.). The detectable agent or moiety may be selected such that it generates a signal which can be measured and whose intensity is related to (e.g., proportional to) the amount of bound entity. A wide variety of systems for labeling and/or detecting proteins and peptides are known in the art. Labeled proteins and peptides can be prepared by incorporation of, or conjugation to, a label that is detectable by spectroscopic, photochemical, biochemical, immunochemical, electrical, optical, chemical or other means. A label or labeling moiety may be directly detectable (i.e., it does not require any further reaction or manipulation to be detectable, e.g., a fluorophore is directly detectable) or it may be indirectly detectable (i.e., it is made detectable through reaction or binding with another entity that is detectable, e.g., a hapten is detectable by immunostaining after reaction with an appropriate antibody comprising a reporter such as a fluorophore). Suitable detectable agents include, but are not limited to, radionucleotides, fluorophores, chemiluminescent agents, microparticles, enzymes, colorimetric labels, magnetic labels, haptens, molecular beacons, aptamer beacons, and the like.

Micro RNA: As used herein micro RNA is microRNAs (miRNAs) are short (20-24 nucleotide) non-coding RNAs that are involved in post-transcriptional regulation of gene expression. microRNA can affect both the stability and translation of mRNAs. For example, microRNAs can bind to complementary sequences in the 3'UTR of target mRNAs and cause gene silencing. miRNAs are transcribed by RNA polymerase II as part of capped and polyadenylated primary transcripts (pri-miRNAs) that can be either protein-coding or non-coding. The primary transcript can be cleaved by the Drosha ribonuclease III enzyme to produce an approximately 70-nucleotide stem-loop precursor miRNA (pre-miRNA), which can further be cleaved by the cytoplasmic Dicer ribonuclease to generate the mature miRNA and antisense miRNA star (miRNA*) products. The mature miRNA can be incorporated into a RNA-induced silencing complex (RISC), which can recognize target mRNAs through imperfect base pairing with the miRNA and most commonly results in translational inhibition or destabilization of the target mRNA.

Multiplex PCR: As used herein, the term "multiplex PCR" refers to concurrent amplification of two or more regions which are each primed using a distinct primers pair.

Multiplex ASPE: As used herein, the term "multiplex ASPE" refers to an assay combining multiplex PCR and allele specific primer extension (ASPE) for detecting polymorphisms. Typically, multiplex PCR is used to first amplify regions of DNA that will serve as target sequences for ASPE primers. See the definition of allele specific primer extension.

Mutation and/or variant: As used herein, the terms mutation and variant are used interchangeably to describe a nucleic acid or protein sequence change. The term "mutant" as used herein refers to a mutated, or potentially non-functional form of a gene.

Nucleic acid: As used herein, a "nucleic acid" is a polynucleotide such as deoxyribonucleic acid (DNA) or ribonucleic acid (RNA). The term is used to include single-stranded nucleic acids, double-stranded nucleic acids, and RNA and DNA made from nucleotide or nucleoside analogues.

Obtain or Obtaining: As used herein, the term "obtain" or "obtaining" includes procuring either directly or receiving indirectly (i.e. from a third party).

Polypeptide or protein: As used herein, the term "polypeptide" and/or "protein" refers to a polymer of amino acids, and not to a specific length. Thus, peptides, oligopeptides and proteins are included within the definition of polypeptide and/or protein. "Polypeptide" and "protein" are used interchangeably herein to describe protein molecules that may comprise either partial or full-length proteins. The term "peptide" is used to denote a less than full-length protein or a very short protein unless the context indicates otherwise.

As is known in the art, "proteins", "peptides," "polypeptides" and "oligopeptides" are chains of amino acids (typically L-amino acids) whose alpha carbons are linked through peptide bonds formed by a condensation reaction between the carboxyl group of the alpha carbon of one amino acid and the amino group of the alpha carbon of another amino acid. Typically, the amino acids making up a protein are numbered in order, starting at the amino terminal residue and increasing in the direction toward the carboxy terminal residue of the protein. Abbreviations for amino acid residues are the standard 3-letter and/or 1-letter codes used in the art to refer to one of the 20 common L-amino acids.

As used herein, a polypeptide or protein "domain" comprises a region along a polypeptide or protein that comprises an independent unit. Domains may be defined in terms of structure, sequence and/or biological activity. In one embodiment, a polypeptide domain may comprise a region of a protein that folds in a manner that is substantially independent from the rest of the protein. Domains may be identified using domain databases such as, but not limited to PFAM, PRODOM, PROSITE, BLOCKS, PRINTS, SBASE, ISREC PROFILES, SAMRT, and PROCLASS.

Primer: As used herein, the term "primer" refers to a short single-stranded oligonucleotide capable of hybridizing to a complementary sequence in a nucleic acid sample. Typically, a primer serves as an initiation point for template dependent DNA synthesis. Deoxyribonucleotides can be added to a primer by a DNA polymerase. In some embodiments, such deoxyribonucleotides addition to a primer is also known as primer extension. The term primer, as used herein, includes all forms of primers that may be synthesized including peptide nucleic acid primers, locked nucleic acid primers, phosphorothioate modified primers, labeled primers, and the like. A "primer pair" or "primer set" for a PCR reaction typically refers to a set of primers typically including a "forward primer" and a "reverse primer." As used herein, a "forward primer" refers to a primer that anneals to the anti-sense strand of dsDNA. A "reverse primer" anneals to the sense-strand of dsDNA.

Polymorphism: As used herein, the term "polymorphism" refers to the coexistence of more than one form of a gene or portion thereof.

Portion and Fragment: As used herein, the terms "portion" and "fragment" are used interchangeably to refer to parts of a polypeptide, nucleic acid, or other molecular construct.

Sample. As used herein, the term "sample" refers to a material obtained from an individual or subject or patient. The sample can be derived from any biological source, including all body fluids (such as, for example, whole blood, plasma, serum, saliva, ocular lens fluid, sweat, urine, milk, etc.), tissue or extracts, cells, cell-free nucleic acid, formalin fixed paraffin embedded (FFPE) tissue, etc.

Sense strand vs. anti-sense strand. As used herein, the term "sense strand" refers to the strand of double-stranded DNA (dsDNA) that includes at least a portion of a coding sequence of a functional protein. As used herein, the term "anti-sense strand" refers to the strand of dsDNA that is the reverse complement of the sense strand.

Significant difference: As used herein, the term "significant difference" is well within the knowledge of a skilled artisan and will be determined empirically with reference to each particular biomarker. For example, a significant difference in the expression of a biomarker in a subject with the disease or syndrome of interest as compared to a healthy subject is any difference in protein amounts which is statistically significant.

Similar or homologue: As used herein, the term "similar" or "homologue" when referring to amino acid or nucleotide sequences means a polypeptide having a degree of homology or identity with the wild-type amino acid sequence. Homology comparisons can be conducted by eye, or more usually, with the aid of readily available sequence comparison programs. These commercially available computer programs can calculate percent homology between two or more sequences (e.g. Wilbur, W. J. and Lipman, D. J., 1983, Proc. Natl. Acad. Sci. USA, 80:726-730). For example, homologous sequences may be taken to include an amino acid sequences which in alternate embodiments are at least 70% identical, 75% identical, 80% identical, 85% identical, 90% identical, 95% identical, 97% identical, or 98% identical to each other.

Specific: As used herein, the term "specific," when used in connection with an oligonucleotide primer, refers to an oligonucleotide or primer, which under appropriate hybridization or washing conditions, is capable of hybridizing to the target of interest and not substantially hybridizing to nucleic acids which are not of interest. Higher levels of sequence identity are preferred and include at least 60%, 65%, 70%, 75%, 80%, 85%, 90%, 95%, 98%, 99%, or 100% sequence identity. In some embodiments, a specific oligonucleotide or primer contains at least 4, 6, 8, 10, 12, 14, 16, 18, 20, 22, 24, 26, 28, 30, 35, 40, 45, 50, 55, 60, 65, 70, or more bases of sequence identity with a portion of the nucleic acid to be hybridized or amplified when the oligonucleotide and the nucleic acid are aligned.

As is known in the art, conditions for hybridizing nucleic acid sequences to each other can be described as ranging from low to high stringency. Generally, highly stringent hybridization conditions refer to washing hybrids in low salt buffer at high temperatures. Hybridization may be to filter bound DNA using hybridization solutions standard in the art such as 0.5 M $NaHPO_4$, 7% sodium dodecyl sulfate (SDS), at 65° C., and washing in 0.25 M $NaHPO_4$, 3.5% SDS followed by washing 0.1×SSC/0.1% SDS at a temperature ranging from room temperature to 68° C. depending on the length of the probe (see e.g. Ausubel, F. M. et al., *Short Protocols in Molecular Biology*, 4$^{th}$ Ed., Chapter 2, John Wiley & Sons, N.Y). For example, a high stringency wash comprises washing in 6×SSC/0.05% sodium pyrophosphate at 37° C. for a 14 base oligonucleotide probe, or at 48° C. for a 17 base oligonucleotide probe, or at 55° C. for a 20 base oligonucleotide probe, or at 60° C. for a 25 base oligonucleotide probe, or at 65° C. for a nucleotide probe about 250 nucleotides in length. Nucleic acid probes may be labeled with radionucleotides by end-labeling with, for example, [$\gamma$-$^{32}$P]ATP, or incorporation of radiolabeled nucleotides such as [$\alpha$-$^{32}$P]dCTP by random primer labeling. Alternatively, probes may be labeled by incorporation of biotinylated or fluorescein labeled nucleotides, and the probe detected using streptavidin or anti-fluorescein antibodies.

siRNA: As used herein, siRNA (small inhibitory RNA) is essentially a double-stranded RNA molecule composed of about 20 complementary nucleotides. siRNA is created by the breakdown of larger double-stranded (ds) RNA molecules. siRNA can suppress gene expression by inherently splitting its corresponding mRNA in two by way of the interaction of the siRNA with the mRNA, leading to degradation of the mRNA. siRNAs can also interact with DNA to facilitate chromatin silencing and the expansion of heterochromatin.

Subject: As used herein, the term "subject" refers to a human or any non-human animal. A subject can be a patient, which refers to a human presenting to a medical provider for diagnosis or treatment of a disease. A human includes pre and post-natal forms. Also, as used herein, the terms "individual," "subject" or "patient" includes all warm-blooded animals. In one embodiment the subject is a human. In one embodiment, the individual is a subject with an enhanced risk of developing HNSCC.

Substantially: As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Substantially complementary: As used herein, the term "substantially complementary" refers to two sequences that can hybridize under stringent hybridization conditions. The skilled artisan will understand that substantially complementary sequences need not hybridize along their entire length. In some embodiments, "stringent hybridization conditions" refer to hybridization conditions at least as stringent as the following: hybridization in 50% formamide, 5×SSC, 50 mM $NaH_2PO_4$, pH 6.8, 0.5% SDS, 0.1 mg/mL sonicated salmon sperm DNA, and 5× Denhart's solution at 42° C. overnight; washing with 2×SSC, 0.1% SDS at 45° C.; and washing with 0.2×SSC, 0.1% SDS at 45° C. In some embodiments, stringent hybridization conditions should not allow for hybridization of two nucleic acids which differ over a stretch of 20 contiguous nucleotides by more than two bases.

Substitution: As used herein, the term "substitution" refers to the replacement of one or more amino acids or nucleotides by different amino acids or nucleotides, respectively, as compared to the naturally occurring molecule.

Suffering from: An individual who is "suffering from" a disease, disorder, and/or condition has been diagnosed with or displays one or more symptoms of the disease, disorder, and/or condition.

Susceptible to: An individual who is "susceptible to" a disease, disorder, and/or condition has not been diagnosed with the disease, disorder, and/or condition. In some embodiments, an individual who is susceptible to a disease, disorder, and/or condition may not exhibit symptoms of the disease, disorder, and/or condition. In some embodiments, an individual who is susceptible to a disease, disorder, and/or condition will develop the disease, disorder, and/or condition. In some embodiments, an individual who is susceptible to a disease, disorder, and/or condition will not develop the disease, disorder, and/or condition.

Solid support: The term "solid support" or "support" means a structure that provides a substrate onto which biomolecules may be bound. For example, a solid support may be an assay well (i.e., such as a microtiter plate), or the solid support may be a location on an array, or a mobile support, such as a bead.

Upstream and downstream: As used herein, the term "upstream" refers to a residue that is N-terminal to a second residue where the molecule is a protein, or 5' to a second residue where the molecule is a nucleic acid. Also as used herein, the term "downstream" refers to a residue that is C-terminal to a second residue where the molecule is a protein, or 3' to a second residue where the molecule is a nucleic acid. Protein, polypeptide and peptide sequences disclosed herein are all listed from N-terminal amino acid to C-terminal acid and nucleic acid sequences disclosed herein are all listed from the 5' end of the molecule to the 3' end of the molecule.

Overview

The disclosure herein provides novel mutations identified in a certain genes that are associated with a disease and/or syndrome of interest and that can be used for more accurate diagnosis of disorders relating to the gene and/or syndrome of interest.

In some embodiments, the sample contains nucleic acid. In some embodiments, the testing step comprises nucleic acid sequencing. In some embodiments, the testing step comprises hybridization. In some embodiments, the hybridization is performed using one or more oligonucleotide probes specific for a region in the biomarker of interest. In some embodiments, for detection of mutations, hybridization is performed under conditions sufficiently stringent to disallow a single nucleotide mismatch. In some embodiments, the hybridization is performed with a microarray. In some embodiments, the testing step comprises restriction enzyme digestion. In some embodiments, the testing step comprises PCR amplification. In some embodiments, the testing step comprises reverse transcriptase PCR (rtPCR). In some embodiments, the PCR amplification is digital PCR amplification. In some embodiments, the testing step comprises primer extension. In some embodiments, the primer extension is single-base primer extension. In some embodiments, the testing step comprises performing a multiplex allele-specific primer extension (ASPE).

In some embodiments, the sample contains protein. In some embodiments, the testing step comprises amino acid sequencing. In some embodiments, the testing step comprises performing an immunoassay using one or more antibodies that specifically recognize the biomarker of interest. In some embodiments, the testing step comprises protease digestion (e.g., trypsin digestion). In some embodiments, the testing step further comprises performing 2D-gel electrophoresis.

In some embodiments, the testing step comprises determining the presence of the one or more biomarkers using mass spectrometry. In some embodiments, the mass spectrometric format is selected from among Matrix-Assisted Laser Desorption/Ionization, Time-of-Flight (MALDI-TOF), Electrospray (ES), IR-MALDI, Ion Cyclotron Resonance (ICR), Fourier Transform, and combinations thereof.

In some embodiments, the sample is obtained from cells, tissue (e.g., FFPE tissue), whole blood, mouthwash, plasma, serum, urine, stool, saliva, cord blood, chorionic villus sample, chorionic villus sample culture, amniotic fluid, amniotic fluid culture, transcervical lavage fluid, or combinations thereof. In certain cases the sample may be either a liquid or tissue biopsy. In some embodiments, the sample comprises cell-free nucleic acid (e.g., DNA) that may be present in a biological sample such as blood, plasma, serum or amniotic fluid.

In some embodiments, the testing step comprises determining the identity of the nucleotide and/or amino acid at a pre-determined position in the biomarker. In some embodiments, the presence of the mutation is determined by comparing the identity of the nucleotide and/or amino acid at the pre-determined position to a control.

In embodiments, the method may comprise performing the assay (e.g., nucleic acid sequencing) in a plurality of individuals to determine the statistical significance of the association.

In another aspect, the disclosure provides reagents for detecting the biomarker of interest such as, but not limited to a nucleic acid probe that specifically binds to the biomarker (e.g., a mutation in a DNA sequence, a mRNA, a protein), or an array containing one or more probes that specifically bind to the biomarker. In some embodiments, the disclosure provides an antibody that specifically binds to the biomarker. In some embodiments, the disclosure provides a kit for comprising one or more of such reagents. In some embodiments, the one or more reagents are provided in a form of microarray. In some embodiments, the kit further comprises reagents for primer extension. In some embodiments, the kit further comprises a control indicative of a healthy individual. In some embodiments, the kit further comprises an instructions on how to determine if an individual has the syndrome or disease of interest based on the biomarker of interest.

In some cases, the amount of the one or more biomarkers may, in certain embodiments, be detected by: (a) detecting the amount of a polypeptide or protein which is regulated by said one or more biomarker; (b) detecting the amount of a polypeptide or protein which regulates said biomarker; or (c) detecting the amount of a metabolite of the biomarker.

In still another aspect, the disclosure herein provides a computer readable medium encoding information corresponding detection of the biomarker.

Methods and Compositions for Diagnosing HNSCC

Embodiments of the present disclosure comprise compositions and methods for diagnosing presence or increased risk of developing HNSCC. The methods and compositions of the present disclosure may be used to obtain or provide genetic information from a subject in order to objectively diagnose the presence or increased risk for that subject, or other subjects to develop HNSCC. The methods and compositions may be embodied in a variety of ways.

In one embodiment, disclosed is a method to detect biomarkers associated with Head and Neck Squamous Cell Carcinoma (HNSCC) in an individual comprising the steps of: obtaining a sample from the individual; and measuring the amount of expression of at least one of the genes in Table 4 and/or Table 6 in the sample. In one embodiment, disclosed is a method to detect biomarkers associated with HNSCC in an individual comprising the steps of: obtaining a sample from the individual; and measuring the amount of expression of at least one of the following genes: CAB39L, ADAM12, SH3BGRL2, NRG2, COL13A1, GRIN2D, LOXL2 KRT4, EMP1 and HSD17B6 in the sample. In an embodiment, disclosed is a method to detect biomarkers associated with HNSCC in an individual comprising the steps of: obtaining a sample from the individual; and measuring the amount of expression of at least one the Human Papilloma Virus (HPV) E6 or E7 genes. Or various combinations of the genes may be evaluated. The measured expression of any of these genes may, in certain embodiments, be compared to a control value. In various embodiments, a difference between gene expression in the individual and the control value indicates that the individual may have (i.e., is diagnostic of the presence of), or is susceptible to developing (i.e., is at increased risk for) HNSCC. Control values may be from a sample (or samples) of normal (non-cancerous tissue) or derived from a normal (non-cancerous) population. Additionally and/or alternatively, the method may include measurement of at least one normalization (e.g., housekeeping) gene. In an embodiment, the normalization gene may be KHDRBS1. In other embodiments, RPL30 or other normalization genes may be used.

Additionally and/or alternatively, disclosed is a method to detect susceptibility to Head and Neck Squamous Cell Carcinoma (HNSCC) in an individual comprising: obtaining a sample from the individual; measuring the amount of an expression product from a gene comprising at least one of the genes in Table 4 and/or Table 6 in the sample; and comparing the expression of the at least one gene of Table 4 and/or Table 6 in the sample with a control value for expression. In various embodiments, a difference between gene expression in the individual and the control value indicates that the individual may have (i.e., is diagnostic of the presence of), or is susceptible to developing (i.e., is at increased risk for) HNSCC. Control values may be from a sample (or samples) of normal (non-cancerous tissue) or derived from a normal (non-cancerous) population. Additionally and/or alternatively, the method may include measurement of at least one normalization (e.g., housekeeping) gene. In an embodiment, the normalization gene may be KHDRBS1. In other embodiments, RPL30 or other normalization genes may be used.

Additionally and/or alternatively, disclosed is a method to detect susceptibility to HNSCC in an individual comprising: obtaining a sample from the individual; measuring the amount of at least one expression product from at least one gene comprising at least one of CAB39L, ADAM12, SH3BGRL2, NRG2, COL13A1, GRIN2D, LOXL2, KRT4, EMP1 or HSD17B6 in the sample; and comparing the expression of the at least one of CAB39L, ADAM12, SH3BGRL2, NRG2, COL13A1, GRIN2D, LOXL2, KRT4, EMP1 or HSD17B6 in the sample with a control value for expression of each of the CAB39L, ADAM12, SH3BGRL2, NRG2, COL13A1, GRIN2D, LOXL2, KRT4, EMP1 or HSD17B6. Additionally and/or alternatively, disclosed is a method to detect susceptibility to HNSCC in an individual comprising: obtaining a sample from the individual; measuring the amount of at least one expression product from a gene comprising at least one of HPV E6 and/or HPV E7 in the sample; and comparing the expression of the at least one of HPV E6 and/or HPV E7 expression product in the sample with a control value for expression of each of HPV E6 and/or HPV E7. In various embodiments, a difference between gene expression in the individual and the control value indicates that the individual may have (i.e., is diagnostic of the presence of), or is susceptible to developing (i.e., is at increased risk for) HNSCC. Control values may be from a sample (or samples) of normal (non-cancerous tissue) or derived from a normal (non-cancerous) population. Additionally and/or alternatively, the method may include measurement of at least one normalization (e.g., housekeeping) gene. In an embodiment, the normalization gene may be KHDRBS1. In other embodiments, RPL30 or other normalization genes may be used.

In certain embodiments, the measuring comprises measuring RNA (e.g., mRNA). Or, the measuring may comprise an immunoassay.

In some cases, increasing the number of biomarkers improves the statistical power of the method. For example, in certain embodiments, the method may comprise measuring the expression of at least two, three, four, five or more of the biomarkers. In some cases, at least four of the biomarkers are measured.

A variety of samples may be assayed. In certain embodiments, the sample comprises serum, plasma, saliva or tissue (e.g., FFPE tissue).

The disclosed methods also include methods of identifying a marker associated with Head and Neck Squamous Cell Carcinoma (HNSCC) in an individual comprising: identifying at least one marker having increased or decreased expression in HNSCC, but not in HNSCC disease as compared to normal controls. As disclosed herein, such methods may include statistical evaluation of markers that show differential expression in HNSCC as compared to normal tissues. Or, the methods may include biomarkers that discriminate HNSCC as compared to normal based on other biological criterion (e.g., mutated genes, copy number differences and translocations, DNA methylation, and/or microRNAs). Or other biological aspects of the biomarker may be evaluated.

As disclosed herein, a variety of methods may be used to measure the biomarkers of interest. In one embodiment, the measuring comprising measurement of mRNA. In one embodiment, the measuring comprises measuring peptide or polypeptide biomarkers. For example, in one embodiment, the measuring comprises an immunoassay. Or, the measuring may comprise flow cytometry. Or, as discussed in detail herein, nucleic acid methods may be used.

In yet other embodiments, disclosed are methods of treating HNSCC. The method of treating may comprise: obtaining a sample from the individual; measuring the amount of an expression product from a gene comprising at least one of the genes in Table 4 and/or Table 6 in the sample; comparing the expression of the at least one gene of Table 4 and/or Table 6 in the sample with a control value for expression; and treating the individual for HNSCC when a difference between gene expression in the individual and the control value indicates that the individual may have (i.e., is diagnostic of the presence of), or is susceptible to developing (i.e., is at increased risk for) HNSCC. Control values may be from a sample (or samples) of normal (non-cancerous tissue) or derived from a normal (non-cancerous) population. Additionally and/or alternatively, the method may include measurement of at least one normalization (e.g., housekeeping) gene. In an embodiment, the normalization gene may be KHDRBS1. In other embodiments, RPL30 or other normalization genes may be used.

For example, in certain embodiments, the method of treating may comprise: obtaining a sample from the individual; measuring the amount of at least one expression product from at least one gene comprising at least one of CAB39L, ADAM12, SH3BGRL2, NRG2, COL13A1, GRIN2D, LOXL2, KRT4, EMP1 or HSD17B6 in the sample; comparing the expression of the at least one of CAB39L, ADAM12, SH3BGRL2, NRG2, COL13A1, GRIN2D, LOXL2, KRT4, EMP1 or HSD17B6 in the sample with a control value for expression of each of the CAB39L, ADAM12, SH3BGRL2, NRG2, COL13A1, GRIN2D, LOXL2, KRT4, EMP1 or HSD17B6; and treating the individual for HNSCC when a difference between gene expression in the individual and the control value indicates that the individual may have (i.e., is diagnostic of the presence of), or is susceptible to developing (i.e., is at increased risk for) HNSCC.

The method of treating may further comprise measuring the amount of at least one expression product from a gene comprising at least one of HPV E6 and/or HPV E7 in the sample; comparing the expression of the at least one of HPV E6 and/or HPV E7 expression product in the sample with a control value for expression of each of HPV E6 and/or HPV E7; and treating the individual for HNSCC when a difference between gene expression in the individual and the control value indicates that the individual may have (i.e., is diagnostic of the presence of), or is susceptible to developing (i.e., is at increased risk for) HNSCC.

In various embodiments of the methods of treating control values may be from a sample (or samples) of normal (non-cancerous tissue) or derived from a normal (non-cancerous) population. Additionally and/or alternatively, the method may include measurement of at least one normalization (e.g., housekeeping) gene. In an embodiment, the normalization gene may be KHDRBS1. In other embodiments, RPL30 or other normalization genes may be used.

As noted above, yet other embodiments comprise a composition to detect biomarkers associated with HNSCC in an individual. In certain embodiments, the composition comprises reagents that quantify the levels of at least one of the disclosed biomarkers in a biological sample. For example, as described in detail herein the composition may comprise reagents to measure mRNA. Or the composition may comprise reagents to measure a peptide or polypeptide biomarkers. In one embodiment, the composition comprises reagents to perform an immunoassay. Or, the composition may comprise reagents to perform flow cytometry. Or, as discussed in detail herein, the composition may comprise reagents to determine the presence of a particular sequence and/or expression level of a nucleic acid. As described in detail herein, the reagents may be labeled with a detectable moiety.

Thus, other aspects of the disclosure comprise a composition to detect biomarkers associated with HNSCC in an individual comprising a reagent that quantifies the levels of expression of at least one of the genes of Table 4 and/or Table 6. Additionally and/or alternatively, aspects of the disclosure comprise a composition to detect biomarkers associated with HNSCC in an individual comprising a reagent that quantifies the levels of expression of at least one of CAB39L, ADAM12, SH3BGRL2, NRG2, COL13A1, GRIN2D, LOXL2, KRT4, EMP1 or HSD17B6. Additionally and/or alternatively, aspects of the disclosure comprise a composition to detect biomarkers associated with HNSCC in an individual comprising a reagent that quantifies the levels of expression of at least one of HPV E6 and/or HPV E7. Additionally and/or alternatively, the composition may include a reagent to detect at least one normalization (e.g., housekeeping) gene. In an embodiment, the normalization gene may be KHDRBS1. In other embodiments, RPL30 or other normalization genes may be used. For example, in some embodiments the reagent detects mRNA. Or, the reagent may detect protein.

Thus, the composition may, in certain embodiments, comprise primers (e.g. primer pairs) and/or probes for any one of these genes, where the primers and/or probes are labeled with a detectable moiety as described herein. Additionally and/or alternatively, the primers and/or probes may also comprise an array wherein the primers and/or probes are immobilized on a surface. In other embodiments, the reagents may comprise reagents to measure peptides and/or proteins expressed from the disclosed genes. For example, the composition may comprise reagents to perform an immunoassay. These reagents may, in some embodiments, comprise an array as described in detail herein. As described in detail herein, the reagents may be labeled with a detectable moiety.

Other embodiments comprise systems for performing the methods and/or using the compositions disclosed herein. For example, other aspects of the disclosure comprise kits containing the compositions of the disclosure, or for performing the methods of the disclosure. For example, other embodiments include systems, such as kits, that contain at least some of the compositions disclosed herein and/or reagents for performing the methods disclosed herein. Such systems or kits may include computer-readable media comprising instructions and/or other information for performing the methods and/or using the compositions of the disclosure.

A variety of sample types may be used for any of the methods, compositions or systems disclosed herein. In certain embodiments, the sample comprises serum, plasma, saliva or tissue (e.g., FFPE tissue). Or other sample types may be used.

Peptide, Polypeptide and Protein Assays

In certain embodiments, the biomarker of interest is detected at the protein level (or peptide or polypeptide level), that is, a gene product is analyzed. For example, a protein or fragment thereof can be analyzed by amino acid sequencing methods, or immunoassays using one or more antibodies that specifically recognize one or more epitopes present on the biomarker of interest, or in some cases specific to a mutation of interest. Proteins can also be analyzed by protease digestion (e.g., trypsin digestion) and, in some embodiments, the digested protein products can be further analyzed by 2D-gel electrophoresis.

Antibody-Based Detection Methods

Specific antibodies that recognize the biomarker of interest can be employed in any of a variety of methods known in the art. Antibodies against particular epitopes, polypeptides, and/or proteins can be generated using any of a variety of known methods in the art. For example, the epitope, polypeptide, or protein against which an antibody is desired can be produced and injected into an animal, typically a mammal (such as a donkey, mouse, rabbit, horse, chicken, etc.), and antibodies produced by the animal can be collected from the animal. Monoclonal antibodies can also be produced by generating hybridomas that express an antibody of interest with an immortal cell line.

In some embodiments, antibodies are labeled with a detectable moiety as described herein.

Antibody detection methods are well known in the art including, but are not limited to, enzyme-linked immunoadsorbent assays (ELISAs) and Western blots. Some such methods are amenable to being performed in an array format.

For example, in some embodiments, the biomarker of interest is detected using a first antibody (or antibody fragment) that specifically recognizes the biomarker. The antibody may be labeled with a detectable moiety (e.g., a chemiluminescent molecule), an enzyme, or a second binding agent (e.g., streptavidin). Or, the first antibody may be detected using a second antibody, as is known in the art.

In certain embodiments, the method may further comprise adding a capture support, the capture support comprising at least one capture support binding agent that recognizes and binds to the biomarker so as to immobilize the biomarker on the capture support. The method may, in certain embodiments, further comprise adding a second binding agent that can specifically recognize and bind to at least some of the plurality binding agent molecules and/or the biomarker on the capture support. In an embodiment, the binding agent that can specifically recognize and bind to at least some of the plurality binding agent molecules and/or the biomarker on the capture support is a soluble binding agent (e.g., a secondary antibody). The second binding agent may be labeled (e.g., with an enzyme) such that binding of the biomarker of interest is measured by adding a substrate for the enzyme and quantifying the amount of product formed.

In an embodiment, the capture solid support may be an assay well (i.e., such as a microtiter plate). Or, the capture solid support may be a location on an array, or a mobile support, such as a bead. Or the capture support may be a filter.

In some cases, the biomarker may be allowed to complex with a first binding agent (e.g., primary antibody specific for the biomarker and labeled with detectable moiety) and a second binding agent (e.g., a secondary antibody that recognizes the primary antibody or a second primary antibody), where the second binding agent is complexed to a third binding agent (e.g., biotin) that can then interact with a capture support (e.g., magnetic bead) having a reagent (e.g., streptavidin) that recognizes the third binding agent linked to the capture support. The complex (labeled primary antibody: biomarker: second primary antibody-biotin: streptavidin-bead may then be captured using a magnet (e.g., a magnetic probe) to measure the amount of the complex.

A variety of binding agents may be used in the methods of the disclosure. For example, the binding agent attached to the capture support, or the second antibody, may be either an antibody or an antibody fragment that recognizes the biomarker. Or, the binding agent may comprise a protein that binds a non-protein target (i.e., such as a protein that specifically binds to a small molecule biomarker, or a receptor that binds to a protein).

In certain embodiments, the solid supports may be treated with a passivating agent. For example, in certain embodiments the biomarker of interest may be captured on a passivated surface (i.e., a surface that has been treated to reduce non-specific binding). One such passivating agent is BSA. Additionally and/or alternatively, where the binding agent used is an antibody, the solid supports may be coated with protein A, protein G, protein A/G, protein L, or another agent that binds with high affinity to the binding agent (e.g., antibody). These proteins bind the Fc domain of antibodies and thus can orient the binding of antibodies that recognize the protein or proteins of interest.

Nucleic Acid Assays

In certain embodiments, the biomarkers disclosed herein are detected at the nucleic acid level. In one embodiment, the disclosure comprises methods for diagnosing the presence or an increased risk of developing the syndrome or disease of interest (e.g., HNSCC) in a subject.

The method may comprise the steps of obtaining a nucleic acid from a tissue or body fluid sample from a subject and conducting an assay to identify whether there is overexpression of a gene of interest. For example, over-expression of certain gene products may be quantified using reverse transcriptase PCR (RT-PCR). Or, droplet digital PCR (ddPCR) may be used.

Or, the method may comprise the steps of obtaining a nucleic acid from a tissue or body fluid sample from a subject and conducting an assay to identify whether there is a variant sequence (i.e., a mutation) in the subject's nucleic acid. In certain embodiments, the method may comprise comparing the variant to known variants associated with the syndrome or disease of interest and determining whether the variant is a variant that has been previously identified as being associated with the syndrome or disease of interest. Or, the method may comprise identifying the variant as a new, previously uncharacterized variant. If the variant is a new variant, the method may further comprise performing an analysis to determine whether the mutation is expected to be deleterious to expression of the gene and/or the function of the protein encoded by the gene. The method may further comprise using the variant profile (i.e., the compilation of mutations identified in the subject) to diagnose the presence of the syndrome or disease of interest or an increased risk of developing the syndrome or disease of interest.

Nucleic acid analyses can be performed on genomic DNA, messenger RNAs, and/or cDNA. Also, in various embodiments, the nucleic acid comprises a gene, an RNA, an exon, an intron, a gene regulatory element, an expressed RNA, an siRNA, or an epigenetic element. Also, regulatory elements, including splice sites, transcription factor binding, A-I editing sites, microRNA binding sites, and functional RNA structure sites may be evaluated for mutations (i.e., variants). Thus, for each of the methods and compositions of the disclosure, the variant may comprise a nucleic acid sequence that encompasses at least one of the following: (1) A-to-I editing sites; (2) splice sites; (3) conserved functional RNA structures; (4) validated transcription factor binding sites (TFBS); (5) microRNA (miRNA) binding sites; (6) polyadenylation sites; (7) known regulatory elements; (8) miRNA genes; (9) small nucleolar RNA genes encoded in the ROIs; and/or (10) ultra-conserved elements across placental mammals.

In many embodiments, nucleic acids are extracted from a biological sample. In some embodiments, nucleic acids are analyzed without having been amplified. In some embodiments, nucleic acids are amplified using techniques known in the art (such as generating cDNA that is amplified using the polymerase chain reaction (PCR)) and amplified nucleic acids are used in subsequent analyses. Multiplex PCR, in which several amplicons (e.g., from different genomic regions) are amplified at once using multiple sets of primer pairs, may be employed. For example, nucleic acid can be analyzed by sequencing, hybridization, PCR amplification, restriction enzyme digestion, primer extension such as single-base primer extension or multiplex allele-specific primer extension (ASPE), or DNA sequencing. In some embodiments, nucleic acids are amplified in a manner such that the amplification product for a wild-type allele differs in size from that of a mutant allele. Thus, presence or absence of a particular mutant allele can be determined by detecting size differences in the amplification products, e.g., on an electrophoretic gel. For example, deletions or insertions of gene regions may be particularly amenable to using size-based approaches.

Certain exemplary nucleic acid analysis methods are described in detail below.

Analysis of mRNA

In certain embodiments, mRNA is analyzed using real-time and/or reverse-transcriptase PCR using methods known in the art and/or commercial reagents and/or kits. "Real-time PCR" or rPCR is a method for detecting and measuring products generated during each cycle of a PCR, which are proportionate to the amount of template nucleic acid prior to the start of PCR. The information obtained, such as an amplification curve, can be used to determine the presence of a target nucleic acid and/or quantitate the initial amounts of a target nucleic acid sequence. The term "real-time PCR" is used to denote a subset of PCR techniques that allow for detection of PCR product throughout the PCR reaction, or in real-time.

In some examples, rPCR is real time reverse transcriptase (RT) PCR (rRT-PCR). Or droplet digital PCR may be used. Reverse transcriptase PCR is used when the starting material is RNA and/or mRNA. RNA is first transcribed into complementary DNA (cDNA) by reverse transcriptase. In rRT-PCR, the cDNA is then used as the template for the qPCR reaction. rRT-PCR can be performed in a one-step method, which combines reverse transcription and PCR in a single tube and buffer, using a reverse transcriptase along with a DNA polymerase. In one-step rRT-PCR, both RNA and DNA targets are amplified using sequence-specific targets. The term "quantitative PCR" encompasses all PCR-based techniques that allow for quantitative or semi-quantitative determination of the initially present target nucleic acid sequences.

The principles of real-time PCR (rPCR) are generally described, for example, in Held et al. "Real Time Quantitative PCR" *Genome Research* 6:986-994 (1996). Generally, rPCR measures a signal at each amplification cycle. Some rPCR techniques rely on fluorophores that emit a signal at the completion of every multiplication cycle. Examples of such fluorophores are fluorescence dyes that emit fluorescence at a defined wavelength upon binding to double-stranded DNA, such as SYBR green. An increase in double-stranded DNA during each amplification cycle thus leads to an increase in fluorescence intensity due to accumulation of PCR product. Another example of fluorophores used for detection in rPCR are sequence-specific fluorescent reporter probes, described elsewhere in this document. The examples of such probes are TAQMAN® probes. The use of sequence-specific reporter probe provides for detection of a target sequence with high specificity, and enables quantification even in the presence of non-specific DNA amplification. Fluorescent probes can also be used in multiplex assays—for detection of several genes in the same reaction—based on specific probes with different-colored labels. For example, a multiplex assay can use several sequence-specific probes, labeled with a variety of fluorophores, including, but not limited to, FAM, JA270, CY5.5, and HEX, in the same PCR reaction mixture.

rPCR relies on detection of a measurable parameter, such as fluorescence, during the course of the PCR reaction. The amount of the measurable parameter is proportional to the amount of the PCR product, which allows one to observe the increase of the PCR product "in real time." Some rPCR methods allow for quantification of the input DNA template based on the observable progress of the PCR reaction. The analysis and processing of the data is discussed below. A "growth curve" or "amplification curve" in the context of a nucleic acid amplification assay is a graph of a function, where an independent variable is the number of amplification cycles and a dependent variable is an amplification-dependent measurable parameter measured at each cycle of amplification, such as fluorescence emitted by a fluorophore. As discussed above, the amount of amplified target nucleic acid can be detected using a fluorophore-labeled probe. Typically, the amplification-dependent measurable parameter is the amount of fluorescence emitted by the probe upon hybridization, or upon the hydrolysis of the probe by the nuclease activity of the nucleic acid polymerase. The increase in fluorescence emission is measured in real time and is directly related to the increase in target nucleic acid amplification. In some examples, the change in fluorescence ($dR_n$) is calculated using the equation $dR_n = R_{n+} - R_{n-}$, with $R_{n+}$ being the fluorescence emission of the product at each time point and $R_{n-}$ being the fluorescence emission of the baseline. The $dR_n$ values are plotted against cycle number, resulting in amplification plots. In a typical polymerase chain reaction, a growth curve contains a segment of exponential growth followed by a plateau, resulting in a sigmoidal-shaped amplification plot when using a linear scale. A growth curve is characterized by a "cross point" value or "$C_p$" value, which can be also termed "threshold value" or "cycle threshold" ($C_t$), which is a number of cycles where a predetermined magnitude of the measurable parameter is achieved. For example, when a fluorophore-labeled probe is employed, the threshold value ($C_t$) is the PCR cycle number at which the fluorescence emission ($dR_n$) exceeds a chosen threshold, which is typically 10 times the standard deviation of the baseline (this threshold level can, however, be changed if desired). A lower $C_t$ value represents more rapid completion of amplification, while the higher $C_t$ value represents slower completion of amplification. Where efficiency of amplification is similar, the lower $C_t$ value is reflective of a higher starting amount of the target nucleic acid, while the higher $C_t$ value is reflective of a lower starting amount of the target nucleic acid. Where a control nucleic acid of known concentration is used to generate a "standard curve," or a set of "control" $C_t$ values at various known concentrations of a control nucleic acid, it becomes possible to determine the absolute amount of the target nucleic acid in the sample by comparing $C_t$ values of the target and control nucleic acids.

Allele-Specific Amplification

In some embodiments, for example, where the biomarker for the disease and/or syndrome of interest is a mutation, a biomarker is detected using an allele-specific amplification assay. This approach is variously referred to as PCR amplification of specific allele (PASA) (Sarkar, et al., 1990 *Anal. Biochem.* 186:64-68), allele-specific amplification (ASA) (Okayama, et al., 1989 *J. Lab. Clin. Med.* 114:105-113), allele-specific PCR (ASPCR) (Wu, et al. 1989 *Proc. Natl. Acad. Sci. USA.* 86:2757-2760), and amplification-refractory mutation system (ARMS) (Newton, et al., 1989 *Nucleic Acids Res.* 17:2503-2516). The entire contents of each of these references is incorporated herein. This method is applicable for single base substitutions as well as micro deletions/insertions.

For example, for PCR-based amplification methods, amplification primers may be designed such that they can distinguish between different alleles (e.g., between a wild-type allele and a mutant allele). Thus, the presence or absence of amplification product can be used to determine whether a gene mutation is present in a given nucleic acid sample. In some embodiments, allele specific primers can be designed such that the presence of amplification product is indicative of the gene mutation. In some embodiments, allele specific primers can be designed such that the absence of amplification product is indicative of the gene mutation.

In some embodiments, two complementary reactions are used. One reaction employs a primer specific for the wild type allele ("wild-type-specific reaction") and the other reaction employs a primer for the mutant allele ("mutant-specific reaction"). The two reactions may employ a common second primer. PCR primers specific for a particular allele (e.g., the wild-type allele or mutant allele) generally perfectly match one allelic variant of the target, but are mismatched to other allelic variant (e.g., the mutant allele or wild-type allele). The mismatch may be located at/near the 3' end of the primer, leading to preferential amplification of the perfectly matched allele. Whether an amplification product can be detected from one or in both reactions indicates the absence or presence of the mutant allele. Detection of an amplification product only from the wild-type-specific reaction indicates presence of the wild-type allele only (e.g., homozygosity of the wild-type allele). Detection of an amplification product in the mutant-specific reaction only indicates presence of the mutant allele only (e.g. homozygosity of the mutant allele). Detection of amplification products from both reactions indicate (e.g., a heterozygote). As used herein, this approach will be referred to as "allele specific amplification (ASA)."

Allele-specific amplification can also be used to detect duplications, insertions, or inversions by using a primer that hybridizes partially across the junction. The extent of junction overlap can be varied to allow specific amplification.

Amplification products can be examined by methods known in the art, including by visualizing (e.g., with one or more dyes) bands of nucleic acids that have been migrated (e.g., by electrophoresis) through a gel to separate nucleic acids by size.

Allele-Specific Primer Extension

In some embodiments, an allele-specific primer extension (ASPE) approach is used to detect a gene mutations. ASPE employs allele-specific primers that can distinguish between alleles (e.g., between a mutant allele and a wild-type allele) in an extension reaction such that an extension product is obtained only in the presence of a particular allele (e.g., mutant allele or wild-type allele). Extension products may be detectable or made detectable, e.g., by employing a labeled deoxynucleotide in the extension reaction. Any of a variety of labels are compatible for use in these methods, including, but not limited to, radioactive labels, fluorescent labels, chemiluminescent labels, enzymatic labels, etc. In some embodiments, a nucleotide is labeled with an entity that can then be bound (directly or indirectly) by a detectable label, e.g., a biotin molecule that can be bound by streptavidin-conjugated fluorescent dyes. In some embodiments, reactions are done in multiplex, e.g., using many allele-specific primers in the same extension reaction.

In some embodiments, extension products are hybridized to a solid or semi-solid support, such as beads, matrix, gel, among others. For example, the extension products may be tagged with a particular nucleic acid sequence (e.g., included as part of the allele-specific primer) and the solid support may be attached to an "anti-tag" (e.g., a nucleic acid sequence complementary to the tag in the extension product). Extension products can be captured and detected on the solid support. For example, beads may be sorted and detected.

Single Nucleotide Primer Extension

In some embodiments, a single nucleotide primer extension (SNuPE) assay is used, in which the primer is designed to be extended by only one nucleotide. In such methods, the identity of the nucleotide just downstream of the 3' end of the primer is known and differs in the mutant allele as compared to the wild-type allele. SNuPE can be performed using an extension reaction in which the only one particular kind of deoxynucleotide is labeled (e.g., labeled dATP, labeled dCTP, labeled dGTP, or labeled dTTP). Thus, the presence of a detectable extension product can be used as an indication of the identity of the nucleotide at the position of interest (e.g., the position just downstream of the 3' end of the primer), and thus as an indication of the presence or absence of a mutation at that position. SNuPE can be performed as described in U.S. Pat. Nos. 5,888,819; 5,846,710; 6,280,947; 6,482,595; 6,503,718; 6,919,174; Piggee, C. et al. *Journal of Chromatography A* 781 (1997), p. 367-375 ("Capillary Electrophoresis for the Detection of Known Point Mutations by Single-Nucleotide Primer Extension and Laser-Induced Fluorescence Detection"); Hoogendoorn, B. et al., *Human Genetics* (1999) 104:89-93, ("Genotyping Single Nucleotide Polymorphism by Primer Extension and High Performance Liquid Chromatography"), the entire contents of each of which are herein incorporated by reference.

In some embodiments, primer extension can be combined with mass spectrometry for accurate and fast detection of the presence or absence of a mutation. See, U.S. Pat. No. 5,885,775 to Haff et al. (analysis of single nucleotide polymorphism analysis by mass spectrometry); U.S. Pat. No. 7,501,251 to Koster (DNA diagnosis based on mass spectrometry); the teachings of both of which are incorporated herein by reference. Suitable mass spectrometric format includes, but is not limited to, Matrix-Assisted Laser Desorption/Ionization, Time-of-Flight (MALDI-TOF), Electrospray (ES), IR-MALDI, Ion Cyclotron Resonance (ICR), Fourier Transform, and combinations thereof.

Oligonucleotide Ligation Assay

In some embodiments, an oligonucleotide ligation assay ("OLA" or "OL") is used. OLA employs two oligonucleotides that are designed to be capable of hybridizing to abutting sequences of a single strand of a target molecules. Typically, one of the oligonucleotides is biotinylated, and the other is detectably labeled, e.g., with a streptavidin-conjugated fluorescent moiety. If the precise complementary sequence is found in a target molecule, the oligonucleotides will hybridize such that their termini abut, and create a ligation substrate that can be captured and detected. See e.g., Nickerson et al. (1990) Proc. Natl. Acad. Sci. U.S.A. 87:8923-8927, Landegren, U. et al. (1988) Science 241: 1077-1080 and U.S. Pat. No. 4,998,617, the entire contents of which are herein incorporated by reference in their entirety.

Hybridization Approach

In some embodiments, nucleic acids are analyzed by hybridization using one or more oligonucleotide probes specific for the biomarker of interest and under conditions sufficiently stringent to disallow a single nucleotide mismatch. In certain embodiments, suitable nucleic acid probes can distinguish between a normal gene and a mutant gene. Thus, for example, one of ordinary skill in the art could use probes of the invention to determine whether an individual is homozygous or heterozygous for a particular allele.

Nucleic acid hybridization techniques are well known in the art. Those skilled in the art understand how to estimate and adjust the stringency of hybridization conditions such that sequences having at least a desired level of complementary will stably hybridize, while those having lower complementary will not. For examples of hybridization conditions and parameters, see, e.g., Sambrook, et al., 1989, Molecular Cloning: A Laboratory Manual, Second Edition, Cold Spring Harbor Press, Plainview, N.Y.; Ausubel, F. M. et al. 1994, Current Protocols in Molecular Biology. John Wiley & Sons, Secaucus, N.J.

In some embodiments, probe molecules that hybridize to the mutant or wild type sequences can be used for detecting such sequences in the amplified product by solution phase or, more preferably, solid phase hybridization. Solid phase hybridization can be achieved, for example, by attaching probes to a microchip.

Nucleic acid probes may comprise ribonucleic acids and/or deoxyribonucleic acids. In some embodiments, provided nucleic acid probes are oligonucleotides (i.e., "oligonucleotide probes"). Generally, oligonucleotide probes are long enough to bind specifically to a homologous region of the gene of interest, but short enough such that a difference of one nucleotide between the probe and the nucleic acid sample being tested disrupts hybridization. Typically, the sizes of oligonucleotide probes vary from approximately 10 to 100 nucleotides. In some embodiments, oligonucleotide probes vary from 15 to 90, 15 to 80, 15 to 70, 15 to 60, 15 to 50, 15 to 40, 15 to 35, 15 to 30, 18 to 30, or 18 to 26 nucleotides in length. As appreciated by those of ordinary skill in the art, the optimal length of an oligonucleotide probe may depend on the particular methods and/or conditions in which the oligonucleotide probe may be employed.

In some embodiments, nucleic acid probes are useful as primers, e.g., for nucleic acid amplification and/or extension reactions. For example, in certain embodiments, the gene sequence being evaluated for a variant comprises the exon sequences. In certain embodiments, the exon sequence and additional flanking sequence (e.g., about 5, 10, 15, 20, 25, 30, 35, 40, 45, 50, 55 or more nucleotides of UTR and/or intron sequence) is analyzed in the assay. Or, intron sequences or other non-coding regions may be evaluated for potentially deleterious mutations. Or, portions of these sequences may be used. Such variant gene sequences may include sequences having at least one of the mutations as described herein.

Other embodiments of the disclosure provide isolated gene sequences containing mutations that relate to the syndrome and/or disease of interest. Such gene sequences may be used to objectively diagnose the presence or increased risk for a subject to develop HNSCC. In certain embodiments, the isolated nucleic acid may contain a non-variant sequence or a variant sequence of any one or combination thereof. For example, in certain embodiments, the gene sequence comprises the exon sequences. In certain embodiments, the exon sequence and additional flanking sequence (e.g., about 5, 10, 15, 20, 25, 30, 35, 40, 45, 50, 55 or more nucleotides of UTR and/or intron sequence) is analyzed in the assay. Or, intron sequences or other non-coding regions may be used. Or, portions of these sequences may be used. In certain embodiments, the gene sequence comprises an exon sequence from at least one of the biomarker genes disclosed herein.

In some embodiments, nucleic acid probes are labeled with a detectable moiety as described herein.

Arrays

A variety of the methods mentioned herein may be adapted for use as arrays that allow sets of biomarkers to be analyzed and/or detected in a single experiment. For example, multiple mutations that comprise biomarkers can be analyzed at the same time. In particular, methods that involve use of nucleic acid reagents (e.g., probes, primers, oligonucleotides, etc.) are particularly amenable for adaptation to an array-based platform (e.g., microarray). In some embodiments, an array containing one or more probes specific for detecting mutations in the biomarker of interest.

In an embodiment, a panel of a plurality of the disclosed biomarkers are used. In an embodiment, the disclosure comprises a composition to detect biomarkers associated with Head and Neck Squamous Cell Carcinoma (HNSCC) in an individual comprising a reagent that quantifies the levels of expression of at least one of the genes in Table 4 and/or Table 6, and/or at least one of CAB39L, ADAM12, SH3BGRL2, NRG2, COL13A1, GRIN2D, LOXL2, KRT4, EMP1 or HSD17B6, and/or at least one of the HPV E6 and E7 genes. Additionally and/or alternatively, the composition may include at least one normalization (e.g., housekeeping) gene. In an embodiment, the normalization gene may be KHDRBS1 and/or RPL30 or other normalization genes. The composition may, in certain embodiments, comprise primers and/or probes for any one of these genes, where the primers and/or probes are labeled with a detectable moiety as described herein.

DNA Sequencing

In certain embodiments, diagnosis of the biomarker of interest is carried out by detecting variation in the sequence, genomic location or arrangement, and/or genomic copy number of a nucleic acid or a panel of nucleic acids by nucleic acid sequencing.

In some embodiments, the method may comprise obtaining a nucleic acid from a tissue or body fluid sample from a subject and sequencing at least a portion of a nucleic acid in order to obtain a sample nucleic acid sequence for at least one gene. In certain embodiments, the method may comprise comparing the variant to known variants associated with HNSCC and determining whether the variant is a variant that has been previously identified as being associated with HNSCC. Or, the method may comprise identifying the variant as a new, previously uncharacterized variant. If the variant is a new variant, or in some cases for previously characterized (i.e., identified) variants, the method may further comprise performing an analysis to determine whether the mutation is expected to be deleterious to expression of the gene and/or the function of the protein encoded by the gene. The method may further comprise using the variant profile (i.e., a compilation of variants identified in the subject) to diagnose the presence of HNSCC or an increased risk of developing HNSCC.

For example, in certain embodiments, next generation (massively-parallel sequencing) may be used. Or, Sanger sequencing may be used. Or, a combination of next-generation (massively-parallel sequencing) and Sanger sequencing may be used. Additionally and/or alternatively, the sequencing comprises at least one of single-molecule sequencing-by-synthesis. Thus, in certain embodiments, a plurality of DNA samples are analyzed in a pool to identify samples that show a variation. Additionally or alternatively, in certain embodiments, a plurality of DNA samples are analyzed in a plurality of pools to identify an individual sample that shows the same variation in at least two pools.

One conventional method to perform sequencing is by chain termination and gel separation, as described by Sanger et al., 1977, Proc Natl Acad Sci USA, 74:5463-67. Another conventional sequencing method involves chemical degradation of nucleic acid fragments. See, Maxam et al., 1977, Proc. Natl. Acad. Sci., 74:560-564. Also, methods have been developed based upon sequencing by hybridization. See, e.g., Harris et al., U.S. Patent Application Publication No. 20090156412. Each of these references are incorporated by reference in there entireties herein.

In other embodiments, sequencing of the nucleic acid is accomplished by massively parallel sequencing (also known as "next generation sequencing") of single-molecules or groups of largely identical molecules derived from single molecules by amplification through a method such as PCR. Massively parallel sequencing is shown for example in Lapidus et al., U.S. Pat. No. 7,169,560, Quake et al. U.S. Pat. No. 6,818,395, Harris U.S. Pat. No. 7,282,337 and Braslavsky, et al., PNAS (USA), 100: 3960-3964 (2003), the contents of each of which are incorporated by reference herein.

In next generation sequencing, PCR or whole genome amplification can be performed on the nucleic acid in order to obtain a sufficient amount of nucleic acid for analysis. In some forms of next generation sequencing, no amplification is required because the method is capable of evaluating DNA sequences from unamplified DNA. Once determined, the sequence and/or genomic arrangement and/or genomic copy number of the nucleic acid from the test sample is compared to a standard reference derived from one or more individuals not known to suffer from HNSCC at the time their sample was taken. All differences between the sequence and/or genomic arrangement and/or genomic arrangement and/or copy number of the nucleic acid from the test sample and the standard reference are considered variants.

In next generation (massively parallel sequencing), all regions of interest are sequenced together, and the origin of each sequence read is determined by comparison (alignment) to a reference sequence. The regions of interest can be enriched together in one reaction, or they can be enriched separately and then combined before sequencing. In certain embodiments, and as described in more detail in the examples herein, the DNA sequences derived from coding exons of genes included in the assay are enriched by bulk hybridization of randomly fragmented genomic DNA to specific RNA probes. The same adapter sequences are attached to the ends of all fragments, allowing enrichment of all hybridization-captured fragments by PCR with one primer pair in one reaction. Regions that are less efficiently captured by hybridization are amplified by PCR with specific primers. In addition, PCR with specific primers is may be used to amplify exons for which similar sequences ("pseudo exons") exist elsewhere in the genome.

In certain embodiments where massively parallel sequencing is used, PCR products are concatenated to form long stretches of DNA, which are sheared into short fragments (e.g., by acoustic energy). This step ensures that the fragment ends are distributed throughout the regions of interest. Subsequently, a stretch of dA nucleotides is added to the 3' end of each fragment, which allows the fragments to bind to a planar surface coated with oligo(dT) primers (the "flow cell"). Each fragment may then be sequenced by extending the oligo(dT) primer with fluorescently-labeled nucleotides. During each sequencing cycle, only one type of nucleotide (A, G, T, or C) is added, and only one nucleotide is allowed to be incorporated through use of chain terminating nucleotides. For example, during the 1st sequencing cycle, a fluorescently labeled dCTP could be added. This nucleotide will only be incorporated into those growing complementary DNA strands that need a C as the next nucleotide. After each sequencing cycle, an image of the flow cell is taken to determine which fragment was extended. DNA strands that have incorporated a C will emit light, while DNA strands that have not incorporated a C will appear dark. Chain termination is reversed to make the growing DNA strands extendible again, and the process is repeated for a total of 120 cycles.

The images are converted into strings of bases, commonly referred to as "reads," which recapitulate the 3' terminal 25 to 60 bases of each fragment. The reads are then compared to the reference sequence for the DNA that was analyzed. Since any given string of 25 bases typically only occurs once in the human genome, most reads can be "aligned" to one specific place in the human genome. Finally, a consensus sequence of each genomic region may be built from the available reads and compared to the exact sequence of the reference at that position. Any differences between the consensus sequence and the reference are called as sequence variants.

Detectable Moieties

In certain embodiments, certain molecules (e.g., nucleic acid probes, antibodies, etc.) used in accordance with and/or provided by the invention comprise one or more detectable entities or moieties, i.e., such molecules are "labeled" with such entities or moieties.

Any of a wide variety of detectable agents can be used in the practice of the disclosure. Suitable detectable agents include, but are not limited to: various ligands, radionucleotides; fluorescent dyes; chemiluminescent agents (such as, for example, acridinum esters, stabilized dioxetanes, and the like); bioluminescent agents; spectrally resolvable inorganic fluorescent semiconductors nanocrystals (i.e., quantum dots); microparticles; metal nanoparticles (e.g., gold, silver, copper, platinum, etc.); nanoclusters; paramagnetic metal ions; enzymes; colorimetric labels (such as, for example, dyes, colloidal gold, and the like); biotin; dioxigenin; haptens; and proteins for which antisera or monoclonal antibodies are available.

In some embodiments, the detectable moiety is biotin. Biotin can be bound to avidins (such as streptavidin), which are typically conjugated (directly or indirectly) to other moieties (e.g., fluorescent moieties) that are detectable themselves.

Below are described some non-limiting examples of some detectable moieties that may be used.

Fluorescent Dyes

In certain embodiments, a detectable moiety is a fluorescent dye. Numerous known fluorescent dyes of a wide variety of chemical structures and physical characteristics are suitable for use in the practice of the disclosure. A fluorescent detectable moiety can be stimulated by a laser with the emitted light captured by a detector. The detector can be a charge-coupled device (CCD) or a confocal microscope, which records its intensity.

Suitable fluorescent dyes include, but are not limited to, fluorescein and fluorescein dyes (e.g., fluorescein isothiocyanine or FITC, naphthofluorescein, 4',5'-dichloro-2',7'-dimethoxyfluorescein, 6-carboxyfluorescein or FAM, etc.), hexachloro-fluorescein (HEX), carbocyanine, merocyanine, styryl dyes, oxonol dyes, phycoerythrin, erythrosin, eosin, rhodamine dyes (e.g., carboxytetramethylrhodamine or TAMRA, carboxyrhodamine 6G, carboxy-X-rhodamine (ROX), lissamine rhodamine B, rhodamine 6G, rhodamine Green, rhodamine Red, tetramethylrhodamine (TMR), etc.), coumarin and coumarin dyes (e.g., methoxycoumarin, dialkylaminocoumarin, hydroxycoumarin, aminomethylcoumarin (AMCA), etc.), Q-DOTS, Oregon Green Dyes (e.g., Oregon Green 488, Oregon Green 500, Oregon Green 514, etc.), Texas Red, Texas Red-X, SPECTRUM RED, SPECTRUM GREEN, cyanine dyes (e.g., CY-3, CY-5, CY-3.5, CY-5.5, etc.), ALEXA FLUOR dyes (e.g., ALEXA FLUOR 350, ALEXA FLUOR 488, ALEXA FLUOR 532, ALEXA FLUOR 546, ALEXA FLUOR 568, ALEXA FLUOR 594, ALEXA FLUOR 633, ALEXA FLUOR 660, ALEXA FLUOR 680, etc.), BODIPY dyes (e.g., BODIPY FL, BODIPY R6G, BODIPY TMR, BODIPY TR, BODIPY 530/550, BODIPY 558/568, BODIPY 564/570, BODIPY 576/589, BODIPY 581/591, BODIPY 630/650, BODIPY 650/665, etc.), IRDyes (e.g., IRD40, IRD 700, IRD 800, etc.), and the like. For more examples of suitable fluorescent dyes and methods for coupling fluorescent dyes to other chemical entities such as proteins and peptides, see, for example, "The Handbook of Fluorescent Probes and Research Products", 9th Ed., Molecular Probes, Inc., Eugene, OR Favorable properties of fluorescent labeling agents include high molar absorption coefficient, high fluorescence quantum yield, and photostability. In some embodiments, labeling fluorophores exhibit absorption and emission wavelengths in the visible (i.e., between 400 and 750 nm) rather than in the ultraviolet range of the spectrum (i.e., lower than 400 nm).

A detectable moiety may include more than one chemical entity such as in fluorescent resonance energy transfer (FRET). Resonance transfer results an overall enhancement of the emission intensity. For instance, see Ju et. al. (1995) Proc. Nat'l Acad. Sci. (USA) 92:4347, the entire contents of which are herein incorporated by reference. To achieve resonance energy transfer, the first fluorescent molecule (the "donor" fluor) absorbs light and transfers it through the resonance of excited electrons to the second fluorescent molecule (the "acceptor" fluor). In one approach, both the donor and acceptor dyes can be linked together and attached to the oligo primer. Methods to link donor and acceptor dyes to a nucleic acid have been described, for example, in U.S. Pat. No. 5,945,526 to Lee et al., the entire contents of which are herein incorporated by reference. Donor/acceptor pairs of dyes that can be used include, for example, fluorescein/tetramethylrohdamine, IAEDANS/fluroescein, EDANS/DABCYL, fluorescein/fluorescein, BODIPY FL/BODIPY FL, and Fluorescein/QSY 7 dye. See, e.g., U.S. Pat. No. 5,945,526 to Lee et al. Many of these dyes also are commercially available, for instance, from Molecular Probes Inc. (Eugene, Oreg.). Suitable donor fluorophores include 6-carboxyfluorescein (FAM), tetrachloro-6-carboxyfluorescein (TET), 2'-chloro-7'-phenyl-1,4-dichloro-6-carboxyfluorescein (VIC), and the like.

Enzymes

In certain embodiments, a detectable moiety is an enzyme. Examples of suitable enzymes include, but are not limited to, those used in an ELISA, e.g., horseradish peroxidase, beta-galactosidase, luciferase, alkaline phosphatase, etc. Other examples include beta-glucuronidase, beta-D-glucosidase, urease, glucose oxidase, etc. An enzyme may be conjugated to a molecule using a linker group such as a carbodiimide, a diisocyanate, a glutaraldehyde, and the like.

Radioactive Isotopes

In certain embodiments, a detectable moiety is a radioactive isotope. For example, a molecule may be isotopically-labeled (i.e., may contain one or more atoms that have been replaced by an atom having an atomic mass or mass number different from the atomic mass or mass number usually found in nature) or an isotope may be attached to the molecule. Non-limiting examples of isotopes that can be incorporated into molecules include isotopes of hydrogen, carbon, fluorine, phosphorous, copper, gallium, yttrium, technetium, indium, iodine, rhenium, thallium, bismuth, astatine, samarium, and lutetium (i.e., 3H, 13C, 14C, 18F, 19F, 32P, 35S, 64Cu, 67Cu, 67Ga, 90Y, 99mTc, 111In, 125I, 123I, 129I, 131I, 135I, 186Re, 187Re, 201Tl, 212Bi, 213Bi, 211At, 153Sm, 177Lu).

Dendrimers

In some embodiments, signal amplification is achieved using labeled dendrimers as the detectable moiety (see, e.g., *Physiol Genomics* 3:93-99, 2000), the entire contents of which are herein incorporated by reference in their entirety. Fluorescently labeled dendrimers are available from Genisphere (Montvale, N.J.). These may be chemically conjugated to the oligonucleotide primers by methods known in the art.

Systems

In certain embodiments, the disclosure provides systems for performing the methods disclosed herein and/or using the compositions described herein. In certain embodiments, the system may comprise a kit. Or, the system may comprise computerized instructions and/or reagents for performing the methods disclosed herein.

Kits

In certain embodiments, the disclosure provides kits for use in accordance with methods and compositions disclosed herein. Generally, kits comprise one or more reagents detect the biomarker of interest. Suitable reagents may include nucleic acid probes and/or antibodies or fragments thereof. In some embodiments, suitable reagents are provided in a form of an array such as a microarray or a mutation panel. Kits may further comprise reagents that serve as positive controls for the biomarkers (i.e., genes) of interest.

In an embodiment, a panel of a plurality of the disclosed biomarkers are used. In an embodiment, the disclosure comprises a kit to detect biomarkers associated with Head and Neck Squamous Cell Carcinoma (HNSCC) in an individual comprising a reagent that quantifies the levels of expression of at least one of the genes in Table 4 and/or Table 6, and/or at least one of CAB39L, ADAM12, SH3BGRL2, NRG2, COL13A1, GRIN2D, LOXL2, KRT4, EMP1 or HSD17B6, and/or at least one of the HPV E6 and E7 genes. Additionally and/or alternatively, the kit may include at least one normalization (e.g., housekeeping) gene and/or reagents to detect such a housekeeping gene. In an embodiment, the normalization gene may be KHDRBS1 and/or RPL30 or other normalization genes. The kit may, in some embodiments, include positive controls for any of the disclosed biomarkers and/or normalization genes.

In some embodiments, the provided kits further comprise reagents for carrying out various detection methods described herein (e.g., RT-PCR, sequencing, hybridization, primer extension, multiplex ASPE, immunoassays, etc.). For example, kits may optionally contain buffers, enzymes, and/or reagents for use in methods described herein, e.g., for amplifying nucleic acids via RT-PCR, primer-directed amplification, for performing ELISA experiments, etc. The kit may, in certain embodiments, comprise primers and/or probes for any one of these genes, where the primers and/or probes are labeled with a detectable moiety as described herein.

In some embodiments, provided kits further comprise a control indicative of a healthy individual, e.g., a nucleic acid and/or protein sample from an individual who does not have the disease and/or syndrome of interest. Or the kit may comprise a positive control comprising a known amount of one (or more) of the biomarker genes being measured. Kits may also contain instructions on how to determine if an individual has the disease and/or syndrome of interest, or is at risk of developing the disease and/or syndrome of interest.

In some embodiments, provided is a computer readable medium encoding information corresponding to the biomarker of interest. Such computer readable medium may be included in a kit of the invention.

Methods to Identify HNSCC Markers

Data Mining

In certain embodiments of the disclosure, biomarkers are identified using a data mining approach. For example, in some cases public databases, e.g., PubMed, The Cancer Genome Atlas (TCGA) may be searched for genes that have been shown to be linked to (directly or indirectly) to a certain disease and/or differentially expressed in cancer as compared to normal tissue. Such genes may then be evaluated as biomarkers.

Molecular

In certain embodiments, the disclosure comprises methods to identify biomarkers for a syndrome or disease of interest (i.e., variants in nucleic acid sequence that are associated with HNSCC in a statistically significant manner). For example, the genes of interest and potential normalization genes may be identified by evaluating gene expression in tissue samples isolated from patients that have head and neck cancer using Random Forest Analysis (see e.g., L. Breiman, "Random Forests" Machine Learning, 2001, 45:5-32) and as discussed in detail herein. In this approach, random forests are a combination of tree predictors such that each tree depends on the values of a random vector sampled independently and with the same distribution for all trees in the forest.

Or, the genes and/or genomic regions assayed for new markers may be selected based upon their importance in biochemical pathways that show genetic linkage and/or biological causation to the syndrome and/or disease of interest. Or, the genes and/or genomic regions assayed for markers may be selected based on genetic linkage to DNA regions that are genetically linked to the inheritance of HNSCC in families. Or, the genes and/or genomic regions assayed for markers may be evaluated systematically to cover certain regions of chromosomes not yet evaluated.

In other embodiments, the genes or genomic regions evaluated for new markers may be part of a biochemical pathway that may be linked to the development of the syndrome and/or disease of interest (e.g., HNSCC). The variants and/or variant combinations may be assessed for their clinical significance based on one or more of the following methods. If a variant or a variant combination is reported or known to occur more often in nucleic acid from subjects with, than in subjects without, the syndrome and/or disease of interest it is considered to be at least potentially predisposing to the syndrome and/or disease of interest. If a variant or a variant combination is reported or known to be transmitted exclusively or preferentially to individuals having the syndrome and/or disease of interest, it is considered to be at least potentially predisposing to the syndrome and/or disease of interest. Conversely, if a variant is found in both populations at a similar frequency, it is less likely to be associated with the development of the syndrome and/or disease of interest.

If a variant or a variant combination is reported or known to have an overall deleterious effect on the function of a protein or a biological system in an experimental model system appropriate for measuring the function of this protein or this biological system, and if this variant or variant combination affects a gene or genes known to be associated with the syndrome and/or disease of interest, it is considered to be at least potentially predisposing to the syndrome and/or disease of interest. For example, if a variant or a variant combination is predicted to have an overall deleterious effect on a protein or gene expression (i.e., resulting in a nonsense mutation, a frameshift mutation, or a splice site mutation, or even a missense mutation), based on the predicted effect on the sequence and/or the structure of a protein or a nucleic acid, and if this variant or variant combination affects a gene or genes known to be associated with the syndrome and/or disease of interest, it is considered to be at least potentially predisposing to the syndrome and/or disease of interest.

Also, in certain embodiments, the overall number of variants may be important. If, in the test sample, a variant or several variants are detected that are, individually or in combination, assessed as at least probably associated with the syndrome and/or disease of interest, then the individual in whose genetic material this variant or these variants were detected can be diagnosed as being affected with or at high risk of developing the syndrome and/or disease of interest.

For example, the disclosure herein provides methods for diagnosing the presence or an increased risk of developing HNSCC in a subject. Such methods may include obtaining a nucleic acid from a sample of tissue or body fluid. The method may comprise determining expression of at least one gene in both normal and cancer tissue to identify potential biomarkers of interest. The method may further include sequencing the nucleic acid or determining the genomic arrangement or copy number of the nucleic acid to detect whether there is a variant or variants in the nucleic acid sequence or genomic arrangement or copy number. The method may further include the steps of assessing the clinical significance of a variant or variants. Such analysis may include an evaluation of the extent of association of the variant sequence in affected populations (i.e., subjects having the disease). Such analysis may also include an analysis of the extent of the effect the mutation may have on gene expression and/or protein function. The method may also include diagnosing the presence or an increased risk of developing HNSCC based on the assessment.

EXAMPLES

The following examples serve to illustrate certain aspects of the disclosure. These examples are in no way intended to be limiting.

Example 1—Literature-Based Identification of Potential HNSCC Markers

A preliminary literature search was performed to identify markers related to HNSCC. Table 1 shows the types of markers and the number of markers found and Table 2 shows the potential biomarkers identified.

TABLE 1

| HNSCC Markers | Number |
| --- | --- |
| Mutated Genes | 9 |
| Copy Number and Translocations | 14 |
| Methylation | 71 |
| Gene Expression | 29 |
| microRNAs | 46 |
| Normalization Genes | 15 |
| Total | 184 |

TABLE 2

| Mutated Genes | Copy Number Alterations and Translocations | Gene Expression | Methylated Genes | microRNAs | Normalization Markers |
| --- | --- | --- | --- | --- | --- |
| CDKN2A | CCND1 | AURKA | ADRA1D | let-7i | ALAS1 |
| FAT1 | CDKN2A | BMI1 | ALDH1A2 | miR-100 | GAPDH |
| HRAS | E2F1 | CCNB1 | ALDH3A1 | miR-106b | PPIA |
| KMT2D | EGFR | CEP55 | CCNA1 | miR-10a | TBP |
| NFE2L2 | FAT1 | CENPA | CDH1 | miR-1250 | RPS18 |
| NSD1 | FGFR1 | DNMT3B | CDH11 | miR-125a | RPL30 |
| NOTCH1 | FGFR3-TACC3 | DNMT1 | CDKN2A | miR-125b | RPL37A |
| PI3KCA | FHIT | FOXM1B | CDKN2A/p16 | miR-134 | RPLP0 |
| TP53 | MYC | HELLS | CDKN2B/p15 | miR-135 | RPS17 |
| | NFE2L2 | ITGB1 | CTNNAL1 | miR-137 | B2M |
| | PIK3CA | INV | DAPK1 | miR-140 | |
| | SOX2 | MAPK8 | DCC | miR-142-3 | |
| | TP63 | NEK2 | EDNRB | miR-143 | |
| | TRAF3 | AHSA1 | ERCCI | miR-147 | |
| | | ALDOA | ESR1 | miR-148a | |
| | | POLQ | ESR2 | miR-155 | |
| | | DUSP1 | FANCC | miR-16 | |
| | | IL1b | FBX039 | miR-17-5p | |
| | | IL8 | FHIT | miR-191 | |
| | | OAZ1 | GABRA4 | miR-193a | |
| | | SAT | GALR1 | miR-19b | |
| | | IL1RN | GALR2 | miR-200a | |
| | | MAL | GATA4 | miR-20a | |
| | | MMP1 | GFRA1 | miR-21 | |

TABLE 2-continued

| Mutated Genes | Copy Number Alterations and Translocations | Gene Expression | Methylated Genes | microRNAs | Normalization Markers |
|---|---|---|---|---|---|
| | | E6 (HPV) | GNG7 | miR-210 | |
| | | E7 (HPV) | GRB7 | miR-220a | |
| | | cMET | GRIA4 | miR-222 | |
| | | HIF-1 | HIC1 | miR-223 | |
| | | PD-L1 | HOTAIR | miR-24 | |
| | | | HOXA7 | miR-25 | |
| | | | HOXA9 | miR-27a | |
| | | | HSD17B12 | miR-27b | |
| | | | IGSF4 | miR-31 | |
| | | | IL19 | miR-323-5p | |
| | | | IPF1 | miR-375 | |
| | | | IRX4 | miR-423 | |
| | | | JAK3 | miR-451 | |
| | | | KIF1A | miR-503 | |
| | | | LKB1 | miR-632 | |
| | | | LOC389458 | miR-646 | |
| | | | MED15 | miR-668 | |
| | | | MGMT | miR-877 | |
| | | | MINT31 | miR-9 | |
| | | | MLH1 | miR-92 | |
| | | | MME | miR-93 | |
| | | | NEF3 | miR-99 | |
| | | | NID2 | | |
| | | | OSR2 | | |
| | | | P16INK2A | | |
| | | | PAXI | | |
| | | | PLOD2 | | |
| | | | PTCH1 | | |
| | | | RARb2 | | |
| | | | RASSF1a | | |
| | | | RASSF4 | | |
| | | | RASSF5 | | |
| | | | RUNX1T1 | | |
| | | | RUNX3 | | |
| | | | SEMA3b | | |
| | | | SFRP4 | | |
| | | | SLC18A3 | | |
| | | | SLITRK3 | | |
| | | | SPARC | | |
| | | | SPDEF | | |
| | | | STAT5a | | |
| | | | SYBL1 | | |
| | | | TAP1 | | |
| | | | TCF21 | | |
| | | | TIMP3 | | |
| | | | TRG | | |
| | | | TUSC3 | | |

Based on this initial search, it was decided to pursue markers related to differential gene expression.

Example 2—Identification of Biomarkers Using the TCGA Database

Data from the Cancer Genome Atlas (TCGA) database was mined to identify markers showing differential expression in HNSCC. The TCGA database (RNASeqV2) includes data regarding 18,379 genes available for differential expression. The data includes information regarding: clinical information (e.g., age, smoking, stage, treatment and survival); copy number; methylation; gene expression; mutations, microRNA expression.

The HNSCC data was composed of 530 samples from 4 tumor sites: Oral cavity n=320; 60.4%), Oropharynx (n=82; 15.5%), Larynx (n=117; 22.1%) and Hypopharynx (n=10; 1.5%). An additional 44 samples are from adjacent normal tissue. Of the total 530 samples, 70 are Human papilloma virus (HPV) positive, 279 are HPV negative, and 181 have an unknown or not determined HPV status.

A random forest analysis was performed to identify genes that are strong predictors for the classification of HNSCC from normal samples. In this analysis, genes having 50% of the samples with reportable data, and a less than a 2-fold change (Wilcox test, adjusted p-value <0.001) in expression were discarded. For each round of the analysis, 75% of the samples were used as the training set and 25% of the samples were used for the test set. The data were optimized for kappa and 10-fold cross-validated (repeated 10 times and performance averaged). The top twenty strong predicting were identified and then the entire process was repeated 4 times. The resulting gene lists from each run are shown in Table 3, and the combined 36 unique genes are shown in Table 4. The data in Table 3 are show in order of highest rank (20) to lowest (1).

TABLE 3

| | Gene Symbol\|Gene ID | | | |
|---|---|---|---|---|
| Rank | Run 1 | Run 2 | Run 3 | Run 4 |
| 20 | GRIN2D\|2906 | CAB39L\|81617 | CAB39L\|81617 | CAB39L\|81617 |
| 19 | SH3BGRL2\|83699 | SH3BGRL2\|83699 | HSD17B6\|8630 | NRG2\|9542 |
| 18 | COL13A1\|1305 | NRG2\|9542 | NRG2\|9542 | LOXL2\|4017 |
| 17 | ADAM12\|8038 | HSD17B6\|8630 | SH3BGRL2\|83699 | SH3BGRL2\|83699 |
| 16 | GPD1L\|23171 | GPRIN1\|114787 | MGC12982\|84793 | GRIN2D\|2906 |
| 15 | GCOM1\|145781 | GPD1L\|23171 | TMEM132C\|92293 | DLG2\|1740 |
| 14 | MMP11\|4320 | KRT4\|3851 | MMP11\|4320 | IL11\|3589 |
| 13 | IL11\|3589 | DLG2\|1740 | GRIN2D\|2906 | TMEM132C\|92293 |
| 12 | HSD17B6\|8630 | MMP11\|4320 | ESM1\|11082 | GPRIN1\|114787 |
| 11 | EMP1\|2012 | COBL\|23242 | GPD1L\|23171 | MGC12982\|84793 |
| 10 | DLG2\|1740 | ADAM12\|8038 | RRAGD\|58528 | HSD17B6\|8630 |
| 9 | CAB39L\|81617 | RRAGD\|58528 | SHROOM3\|57619 | ATP6V0A4\|50617 |
| 8 | FAM107A\|11170 | MAL\|4118 | IL11\|3589 | FAM107A\|11170 |
| 7 | MUC21\|394263 | MUC21\|394263 | KRT4\|3851 | MMP11\|4320 |
| 6 | BARX2\|8538 | SHROOM3\|57619 | AQP7\|364 | ADAM12\|8038 |
| 5 | GPRIN1\|114787 | MYBL2\|4605 | ADAM12\|8038 | ESM1\|11082 |
| 4 | CRISP3\|10321 | FAM3D\|131177 | MMP9\|4318 | GPD1L\|23171 |
| 3 | MAL\|4118 | GRIN2D\|2906 | CAMK2N2\|94032 | COL13A1\|1305 |
| 2 | NRG2\|9542 | NDRG2\|57447 | ADH1B\|125 | GPD1\|2819 |
| 1 | FAM3D\|131177 | MMP9\|4318 | DLG2\|1740 | FAM3D\|131177 |

TABLE 4

| GENE SYMBOL/ID | NORMAL | HNSCC | FOLD CHANGE | % OVERLAP | RANDOM FOREST | GENE NAME |
|---|---|---|---|---|---|---|
| ADAM12\|8038 | 5.329 | 9.518 | 18 | 19% | 4 | Disintegrin and metalloproteinase domain-containing protein 12 |
| ADH1B\|125 | 8.661 | 2.338 | −80 | 0% | 1 | Alcohol dehydrogenase 1B |
| AQP7\|364 | 5.172 | 1.127 | −17 | 25% | 1 | Aquaporin-7 |
| ATP6V0A4\|50617 | 9.113 | 4.480 | −25 | 29% | 1 | V-type proton ATPase 116 kDa subunit a isoform 4 |
| BARX2\|8538 | 11.653 | 9.012 | −6 | 28% | 1 | BARX homeobox 2 |
| CAB39L\|81617 | 9.143 | 6.890 | −5 | 0% | 4 | Calcium-binding protein 39-like |
| CAMK2N2\|94032 | 2.695 | 5.147 | 5 | 14% | 1 | Calcium/calmodulin dependent protein kinase II inhibitor 2 |
| COBL\|23242 | 9.969 | 6.709 | −10 | 11% | 1 | Cordon-bleu protein (Cobl) is an actin nucleator protein |
| COL13A1\|1305 | 3.484 | 6.261 | 7 | 18% | 2 | Collagen alpha-1(XIII) chain |
| CRISP3\|10321 | 11.634 | 3.153 | −357 | 27% | 1 | Cysteine-rich secretory protein 3 |
| DLG2\|1740 | 6.919 | 2.300 | −25 | 9% | 4 | Disks large homolog 2, also known as channel-associated protein of synapse-110 (chapsyn-110) or postsynaptic density protein 93 (PSD-93) |
| EMP1\|2012 | 15.697 | 12.454 | −9 | 54% | 1 | Epithelial membrane protein 1 |
| ESM1\|11082 | 2.978 | 6.793 | 14 | 55% | 2 | Endothelial cell-specific molecule 1 |
| FAM107A\|11170 | 9.232 | 5.276 | −16 | 14% | 2 | Family with sequence similarity 107 member A |
| FAM3D\|131177 | 11.451 | 5.967 | −45 | 10% | 3 | Family with sequence similarity 3, member D |
| GCOM1\|145781 | 9.721 | 6.429 | −10 | 17% | 1 | GRINL1A combined protein 15 |
| GPD1L\|23171 | 10.880 | 8.242 | −6 | 2% | 4 | Glycerol-3-phosphate dehydrogenase 1 like |
| GPD1\|2819 | 8.199 | 3.196 | −32 | 24% | 1 | Glycerol-3-phosphate dehydrogenase |
| GPRIN1\|114787 | 6.546 | 8.814 | 5 | 15% | 3 | G protein-regulated inducer of neurite outgrowth 1 |
| GRIN2D\|2906 | 3.704 | 7.194 | 11 | 11% | 4 | Glutamate [NMDA] receptor subunit epsilon-4 |
| HSD17B6\|8630 | 2.986 | 5.327 | 5 | 19% | 4 | Hydroxysteroid 17-beta dehydrogenase 6 |

TABLE 4-continued

| GENE SYMBOL/ID | NORMAL | HNSCC | FOLD CHANGE | % OVERLAP | RANDOM FOREST | GENE NAME |
|---|---|---|---|---|---|---|
| IL11\|3589 | 2.555 | 6.840 | 19 | 8% | 3 | Interleukin 11 |
| KRT4\|3851 | 18.407 | 8.986 | −685 | 39% | 2 | Keratin, type I cytoskeletal 4 |
| LOXL2\|4017 | 7.152 | 10.419 | 10 | 17% | 1 | Lysyl oxidase homolog 2 |
| MAL\|4118 | 14.416 | 6.143 | −309 | 31% | 2 | Myelin and lymphocyte protein |
| MGC12982\|84793 | 3.705 | 5.915 | 5 | 10% | 2 | FOXD2 adjacent opposite strand RNA 1 |
| MMP11\|4320 | 5.678 | 10.780 | 34 | 10% | 4 | Matrix metalloproteinase-11 |
| MMP9\|4318 | 7.043 | 11.191 | 18 | 22% | 2 | Matrix metalloproteinase-9 |
| MUC21\|394263 | 14.432 | 4.532 | −956 | 32% | 2 | Mucin 21 |
| MYBL2\|4605 | 9.028 | 10.857 | 4 | 8% | 1 | Myb-related protein B |
| NDRG2\|57447 | 12.939 | 10.228 | −7 | 14% | 1 | NMYC downstream-regulated gene 2 |
| NRG2\|9542 | 5.748 | 1.505 | −19 | 8% | 4 | Neuregulin 2 |
| RRAGD\|58528 | 10.608 | 8.000 | −6 | 19% | 2 | Ras-related GTP-binding protein D |
| SH3BGRL2\|83699 | 11.438 | 7.440 | −16 | 0% | 4 | SH3 domain binding glutamate rich protein like 2 |
| SHROOM3\|57619 | 10.413 | 8.497 | −4 | 39% | 2 | Shroom-related protein 3 |
| TMEM132C\|92293 | 5.465 | 1.184 | −19 | 45% | 2 | Transmembrane Protein 132C |

The top 4 genes from each of the 4 analyses were then selected to provide an initial candidate list of 8 unique genes listed in Table 5.

TABLE 5

| GENE NAME | GENE PRODUCT |
|---|---|
| CAB39L | Calcium binding protein |
| ADAM12 | Metalloprotease involved in shedding of the EGFR ligand HBEGF |
| SH3BGRL2 | SH3 domain binding glutamate rich protein like 2 |
| NRG2 | Neuregulin 2 (ligand for HER3 receptor) |
| COL13A1 | Collagen type XIII alpha 1 chain |
| GRIN2D | Glutamate receptor subunit 2D |
| LOXL2 | Lysyl oxidase homolog 2 |
| HSD17B6 | Hydroxysteroid 17-beta dehydrogenase 6 |

Figure 1:
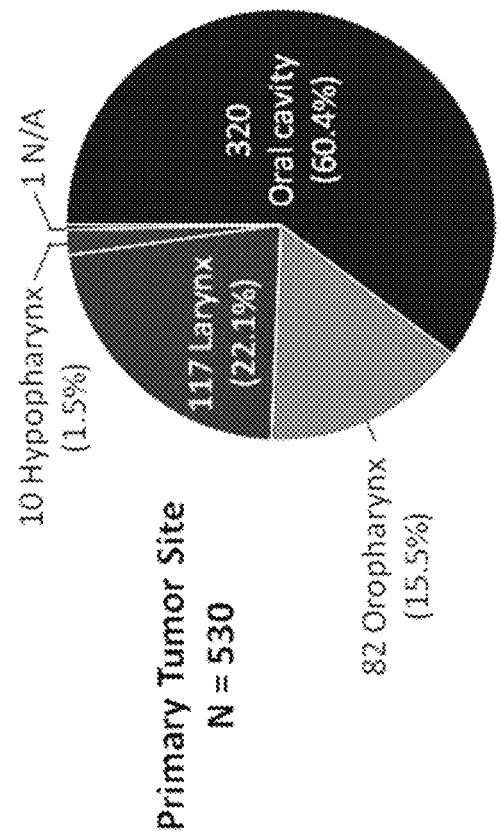
FIG. 1 shows the results of experiments that used a TCGA dataset and random forest analysis to identify differentially expressed genes in HNSCC in accordance with an embodiment of the disclosure.

The results of the statistical analysis for several of the individual genes (i.e., accuracy, kappa, sensitivity and specificity) are also shown in FIG. 1, listed in order of specificity.

Example 3—Gene Panels

Figure 2:
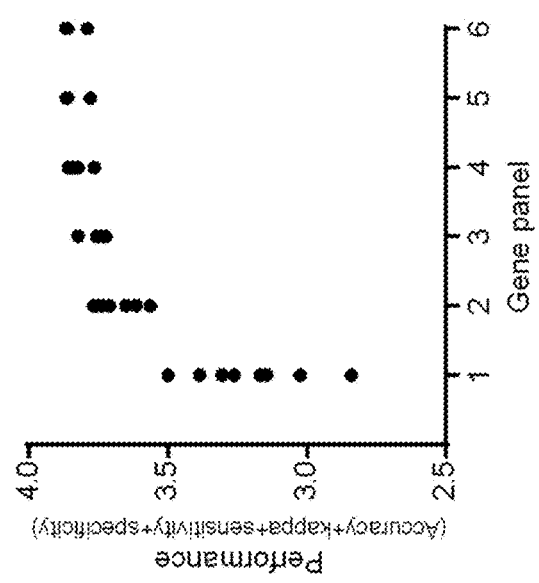
FIG. 2 shows that the evaluation of gene panels comprising a plurality of markers may improve assay performance in accordance with various embodiments of the disclosure.

An analysis was performed to determine whether the use of gene panels would be expected to improve assay performance. As shown in FIG. 2, the use of a 4 or 5 gene panel should markedly improve gene performance. The panels were constructed by adding the most informative marker (CAB39L) to the next most informative marker (ADAM12) to form a 2 marker panel, and then adding the next most informative marker (NRG2) to form a 3 marker panel. Each of six of the other markers was then added and the predicted performance evaluated (FIG. 2, top table). The results indicated that the four marker panel of CAB39L, ADAM12, NRG2 and GRIN2D provided the highest levels of accuracy, kappa value, sensitivity, and specificity. Results for a 5 gene panel are shown in the lower table (FIG. 2). It was found (e.g., FIG. 2 graph) that there was minimal improvement upon addition of more than 4-5 genes. Still such panels may be useful if one of the markers identified as being one of the top 4-5 markers has technical challenges.

Example 4—Gene Expression by Tumor Site

Figure 3:
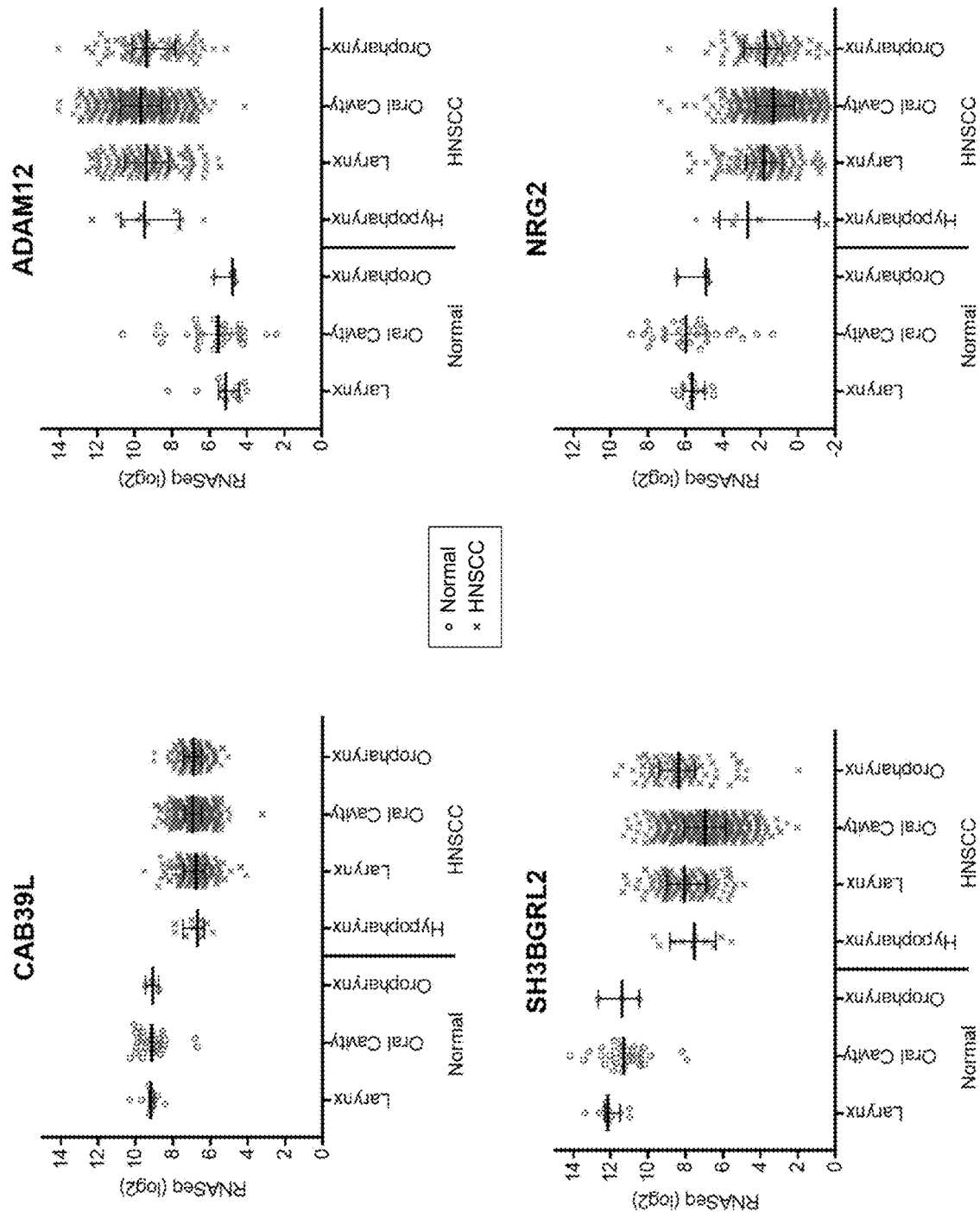
FIG. 3 shows gene expression by site for four markers (SH3BGRL2, CAB39L, NRG2 and ADAM12) of the disclosure in both normal and HNSCC tissue.

Most HNSCC is found in either the oral cavity (mouth) or the oropharynx (throat). An analysis was performed to determine if the same gene panel developed using the entire HNSCC dataset can also be used to differentiate HNSCC of the oral cavity or the oropharynx from normal tissue. The results are shown in FIGS. 3 and 4 for eight of the markers, CAB39L, ADAM12, SH3BGRL2, NRG2 (FIG. 3); and COL13A1, GRIN2D, LOXL2 and HSD17B6 (FIG. 4); using the TCGA dataset having the oral cavity and oropharynx as the majority of TCGA samples where HNSCC oral cavity (320) and normal oropharynx (82)=402 of the total 530 samples (402/530=76%) and normal oral cavity (30) and Oropharynx (3)=33 or 44 total samples (33/44=75%).

It was found that for both sites, and also the larynx, the markers have very different levels of expression in normal vs. cancer tissue. In FIGS. 3 and 4, the left-most 3 data sets on the x axis (larynx, oral cavity and oropharynx) are normal tissue expression levels, and the right-most 4 data sets on the x axis (hypopharynx, larynx, oral cavity and oropharynx) are cancer tissue expression levels; data for the hypopharynx are combined. It can be seen that there were similar distributions across normal and HNSCC sites (i.e., levels in normal were similar regardless of the tissue and levels in HNSCC were similar regardless of the tissue). For example, it can be seen that CAB39L is expressed at significantly lower levels in HNSCC for larynx, oral cavity and oropharynx than in normal tissue, respectively, whereas ADAM12 is expressed at significantly higher levels in HNSCC than in normal tissue. A statistical compilation of the data showing results with the markers for all HNSCC samples as compared to samples from the oral cavity and oropharynx is shown in FIG. 5. There was minimal change in accuracy, sensitivity and specificity comparing all samples to oral cavity and oropharynx. For all 8 markers, the sample set decreases by about 25%; there is minimal change in median gene expression levels; and there are significant differences in distributions (HNSCC vs. normal). In both sets, the Mann-Whitney p value was less than 0.0001.

Example 5—Analysis of Differential Expression of the TCGA Gene Set for Median-Fold Expression Vs. Percent Overlap in Expression FIG. 6A top graph shows the number of times a marker from the 36 genes of Table 4 initially selected by Random Forest Analysis was identified from the four Random Forest analysis repeats compared to the median rank (ability to differentiate) of the marker. It can be seen that there is a trend of increasing median rank with an increase in the number of times a marker was repeatedly identified from Random Forest analysis. The four tables below the graph list the makers and median rank grouped by the number of times a marker was repeatedly identified from Random Forest analysis. Together the graph and table provides a measurement that may allow for the prioritization of the 36 genes of Table 4 identified from Random Forest analysis; first by the number of times repeated and then by the median rank.

FIG. 6B, left graph, shows an analysis of the differential expression of certain of the selected HNSCC markers of the disclosure as compared to the entire TCGA HNSCC gene set. The x-axis shows the median-fold change in expression as either an increase in gene expression (data points to the right of 0) or a decrease in gene expression (data points to the left of 0). The y axis shows the percentage overlap in gene expression in HNSCC vs. normal tissue. It can be seen that the disclosed markers (N=36) of Table 4 show either a large increase or decrease in gene expression, with a very low percentage overlap as compared to other genes in the database. The entire TCGA HNSCC gene set is RNASeq data using genes with greater than 80% of the samples represented (i.e., 16,161 out of 18,379 (88%) of the gene were reportable for HNSCC and normal samples). The x-axis shows the median fold change (=HNSCC/Normal). It was found that 8,352 (52%) genes increased and 7,809 (48%) genes decreased in HNSCC compared to normal, with 1,387 genes (8.6%) increased >2-fold and 1,701 (10.5%) decreased >2-fold. For gene expression increases in HNSCC, the cut-offs are the $5^{th}$ percentile of HNSCC and the $95^{th}$ percentile of normal (e.g., FIG. 6B, inset for GRIN2D).

The dotted line across the graph in FIG. 6B shows that nine of the markers that were repeated four times from Random Forest analysis had less than a 20% overlap in expression (range from 0 to 19%) (i.e., these markers are below the dotted line). In addition, the dotted line across the graph in FIG. 6B shows that 23 of the 36 unique markers of Table 4, or 23/36=64%, have less than a 20% overlap in expression as they cluster below the dotted line. Table 6 lists 45 additional genes with <20% overlap in expression not identified by Random Forest analysis. Genes with <20% overlap in expression, such as GLT25D1 identified in FIG. 6B may be considered as additional biomarkers to aid in the classification of HNSCC from normal samples.

TABLE 6

| GENE ID | MEDIAN EXPRESSION | | FOLD CHANGE | % OVERLAP | GENE NAME |
|---|---|---|---|---|---|
| | NORMAL | HNSCC | | | |
| GLT25D1\|79709 | 10.544 | 12.029 | 3 | 0% | Collagen beta(1-O)galactosyltransferase 1 |
| ARHGEF10L\|55160 | 11.027 | 9.326 | −3 | 9% | Rho guanine nucleotide exchange factor 12 |
| PAIP2B\|400961 | 9.139 | 7.322 | −4 | 11% | Poly(A)-binding protein interacting protein 2B |
| C20orf20\|55257 | 8.139 | 9.375 | 2 | 11% | MRG domain binding protein |
| UBL3\|5412 | 10.886 | 9.334 | −3 | 12% | Ubiquitin-like protein 3 |
| CDCA5\|113130 | 8.235 | 10.115 | 4 | 12% | Sororin |
| CDH24\|64403 | 6.547 | 8.120 | 3 | 13% | Cadherin 24 |
| RFC4\|5984 | 7.697 | 9.271 | 3 | 13% | Replication factor C subunit 4 |
| CENPO\|79172 | 6.467 | 7.742 | 2 | 14% | Centromere protein O |
| C1orf135\|79000 | 5.457 | 7.120 | 3 | 14% | Aurora kinase A and ninein interacting protein |
| SUCLG2\|8801 | 10.225 | 9.123 | −2 | 14% | Succinate-CoA ligase GDP-forming beta subunit |
| ETFDH\|2110 | 9.793 | 8.398 | −3 | 14% | Electron transfer flavoprotein dehydrogenase |
| CA9\|768 | 2.720 | 8.917 | 73 | 15% | Carbonic anhydrase 9 |
| C16orf59\|80178 | 5.608 | 7.419 | 4 | 15% | Tubulin epsilon and delta complex 2 |
| KIF2C\|11004 | 8.238 | 9.996 | 3 | 15% | Kinesin family member 2C |
| EME1\|146956 | 4.893 | 6.749 | 4 | 15% | Essential meiotic structure-specific endonuclease 1 |
| FMO2\|2327 | 11.440 | 6.084 | −41 | 15% | Flavin containing monooxygenase 2 |
| TGFB1\|7040 | 10.028 | 11.565 | 3 | 16% | Transforming growth factor beta 1 |
| FOXM1\|2305 | 9.260 | 10.972 | 3 | 16% | Forkhead box M1 |
| CGNL1\|84952 | 10.117 | 6.485 | −12 | 17% | Cingulin like 1 |
| BMP8A\|353500 | 4.361 | 6.935 | 6 | 17% | Bone morphogenetic protein 8a |
| ALDH9A1\|223 | 11.965 | 10.696 | −2 | 17% | Aldehyde dehydrogenase 9 family member A1 |
| ASPA\|443 | 4.172 | 0.804 | −10 | 17% | Aspartoacylase |
| LAMC2\|3918 | 10.855 | 14.522 | 13 | 17% | Laminin subunit gamma 2 |
| CEP55\|55165 | 8.385 | 9.975 | 3 | 18% | Centrosomal protein 55 |
| AURKA\|6790 | 7.658 | 9.451 | 3 | 18% | Aurora kinase A |
| E2F1\|1869 | 7.017 | 8.661 | 3 | 18% | E2F transcription factor 1 |
| TPX2\|22974 | 9.740 | 11.276 | 3 | 18% | TPX2, microtubule nucleation factor |
| SLC27A6\|28965 | 7.097 | 1.560 | −46 | 18% | Solute carrier family 27 member 6 |
| LEPRE1\|64175 | 7.956 | 9.806 | 4 | 18% | Prolyl 3-hydroxylase 1 |
| RORC\|6097 | 8.848 | 5.241 | −12 | 18% | RAR related orphan receptor C |

TABLE 6-continued

| GENE ID | MEDIAN EXPRESSION NORMAL | MEDIAN EXPRESSION HNSCC | FOLD CHANGE | % OVERLAP | GENE NAME |
|---|---|---|---|---|---|
| MFAP2\|4237 | 7.267 | 10.430 | 9 | 18% | Microfibril associated protein 2 |
| NFIX\|4784 | 12.267 | 10.367 | −4 | 19% | Nuclear factor I X |
| PKMYT1\|9088 | 7.884 | 9.705 | 4 | 19% | Protein kinase, membrane associated tyrosine/threonine 1 |
| VAV2\|7410 | 8.904 | 10.588 | 3 | 19% | Vav guanine nucleotide exchange factor 2 |
| CENPA\|1058 | 6.188 | 7.972 | 3 | 19% | Centromere protein A |
| NETO2\|81831 | 7.647 | 9.616 | 4 | 19% | Neuropilin and tolloid like 2 |
| UBE2C\|11065 | 8.350 | 10.050 | 3 | 19% | Ubiquitin conjugating enzyme E2 C |
| C11orf84\|144097 | 7.680 | 9.029 | 3 | 20% | Spindlin interactor and repressor of chromatin binding |
| FAM63A\|55793 | 9.550 | 8.068 | −3 | 20% | MINDY lysine 48 deubiquitinase 1 |
| WISP1\|8840 | 3.827 | 7.180 | 10 | 20% | Cellular communication network factor 4 |
| BMP1\|649 | 9.031 | 10.846 | 4 | 20% | Bone morphogenetic protein 1 |
| PLIN1\|5346 | 6.879 | 1.220 | −51 | 20% | Perilipin 1 |
| KAT2B\|8850 | 10.368 | 8.285 | −4 | 20% | Lysine acetyltransferase 2B |
| CYP2J2\|1573 | 8.318 | 6.432 | −4 | 20% | Cytochrome P450 family 2 subfamily J member 2 |

The data in FIG. 6B can be compared to the data in FIG. 7 and FIG. 8. FIG. 7 shows a similar analysis of median-fold expression vs. percent overlap in expression from the TCGA HNSCC RNASeq data and this example shows tissue and saliva markers identified by a literature search highlighted on the graphs. The upper and lower panels show results for markers as identified in both tissue (upper panel) and saliva (lower panel). While certain of the literature markers in FIG. 7 show some evidence of differential expression, only a few of the markers show high levels of differential expression with low percentage overlap. Based on this analysis, the markers MAL, MMP1, CEP55, CENPA, AURKA and FOXM1 appear to be the most informative additional biomarkers and may be included in the disclosed methods and compositions.

FIG. 8 shows a similar analysis of analysis of median-fold expression vs. percent overlap in expression from the TCGA HNSCC RNASeq data and this example shows normalization markers used in tissue (upper panel) and saliva (lower panel) identified by a literature search. It can be seen that these markers show little change in expression and have significant overlap in normal vs. HNSCC. The ideal normalization marker should have minimum variation, and a similar expression level as the gene panel of interest.

Example 6—Identification of Potential Normalization or Housekeeping Genes

The TGCA database was analyzed to identify potential normalization genes using three criteria: (1) a minimum median fold change in expression between HNSCC and normal tissue; (2) a minimum InterQuartile Range (IQR) in both HNSCC and normal, where IQR is defined as gene expression in the 75$^{th}$ quartile/gene expression in the 25$^{th}$ quartile; and (3) a median expression level near the gene panel of interest to facilitate experimental comparison between potential candidate gene expression and the normalization gene.

The analysis is summarized in FIG. 9A. The left panel shows a plot of the median fold change of gene expression in HNSCC vs. normal (x-axis) vs. the average IQR (=[HNSCC I.Q.R.+Normal I.Q.R]/2) for both normal and cancer cells (Y axis). In this figure, positive numbers on the x-axis correspond to increased gene expression in cancer cells as compared to normal and negative numbers correspond decreased gene expression in cancer cells as compared to normal. Data from a total of 16,161 genes was analyzed (left panel). This corresponds to all the genes having data for both normal and HNSCC in the TCGA database and thus corresponds to 88% of the total number of genes (16,151/18,379) in the TCGA database. Again, it was found that 8,352 (52%) genes increased and 7,809 (48%) genes decreased in HNSCC compared to normal, and 1,387 genes (8.6%) increased >2-fold and 1,701 (10.5%) decreased >2-fold.

Potential normalization genes of most interest are those having a fold change (x-axis) of 0 and an average IQR of 1 (area circled on plot). The middle plot shows data for those genes having a median fold change of <2 and an average IQR of <2 (n=7,949 genes). The right panel shows data for gene expression for the 7,949 candidate normalization genes. Those genes with median expression were considered to be of most interest. Based on this analysis KHDRBS1 (KH domain-containing, RNA-binding, signal transduction-associated protein 1) was identified as a normalization gene of interest. Some other more common normalization genes are identified on the middle panel, such as RPLPO, RPL10, RPL30 and GAPDH. Data from the TCGA database for KHDRBS1 are shown in Table 6 below. FIG. 9B shows that KHDRBS1 exhibited similar characteristics (low fold change of expression and low IQR) across many cancer types.

The average level of expression 11.60 to 11.90 is higher than the proposed panel markers which range from 1.52 (NRG2 in HNSCC) to 11.44 (SH3BGRL2 in normal). Still this is within the range of the cancer specific markers and thus, should be a good normalization gene. It noted that the amplicon length of <100 bp is preferred for FFPE samples which may contain substantial degraded RNA.

TABLE 7

| Gene | Median RNASeq (log 2) | | | InterQuartile Range (IQR) | | Current primers Amplicon Length (bp) |
|---|---|---|---|---|---|---|
| | Normal | HNSCC | Fold Change | Normal | HNSCC | |
| KHDRBS1 | 11.60 | 11.90 | 1.2 | 1.15 | 1.26 | 72 |
| GAPDH | 16.30 | 16.50 | 1.1 | 1.78 | 1.77 | 117 |

These data may be compared with data for a well-known housekeeping (normalization gene) GAPDH (Table 7). The median expression of 16.3-16.50 is about 30 fold higher than the gene showing highest levels of expression (SH3BGRL2) for the candidate panel discussed above. Thus, GAPDH may be less useful as a marker for the disclosed HNSCC panel discussed above.

Example 7—Evaluation of Expression Assays

Experiments were performed to compare expression levels determined from the data in the TCGA database (RNASeq evaluation of gene expression) with expression levels measured using droplet digital PCR (ddPCR). The results are shown in FIG. 10 which presents data showing the reproducibility of ddPCR analysis of ADAM12 and SH3BGRL2 by ddPCR in tongue squamous cell carcinoma (SCC) and normal tissue (buccal mucosa) (top table of FIG. 10). A comparison of ddPCR data (bottom table) vs. TCGA RNASeq data (middle table) for the level of gene expression for ADAM12 and SH3BGRL2 in cancer as compared to in normal tissue is also shown. It can be seen that as measured by both approaches, there is a substantial increase in ADAM12 expression in cancer as compared to normal, and a substantial decrease in SH3BGRL2 expression in cancer as compared to normal. In these experiments, two aliquots from the same sample were analyzed. For buccal samples, one of the samples had expression levels that were too low to measure accurately. Although ddPCR values were generally lower than the TCGA RNASeq data, the trends were the same for both markers (see FIG. 10). Reproducibility was good down to 1 copy/µL.

FIG. 11 shows additional digital PCR data for three formalin fixed paraffin embedded patient samples (DA1081983; DR1041686; DA0063595) and one URNA control sample derived from cell cultured cancer tissue. URNA is universal human reference RNA, available from Agilent (Cat. No. 740000). It is comprised of 10 human cancer cell lines that acts as a consistent control for standard data set comparisons. Either duplicate or triplicate samplings were performed in accordance with an embodiment of the disclosure. Again, it was found that there is a substantial decrease in SH3BGRL2 expression in cancer as compared to normal. It can be seen that the copies per uL from the URNA control is much larger, likely due to the intact nature of the isolated RNA, as compared to the cross-linked and possibly fragmented RNA from FFPE samples.

FIG. 12 shows an RNA titration experiment using ddPCR and the marker SH3BGRL2 (labeled with FAM) and KHDRBS1 (labeled with HEX). In this experiment, RNA was isolated from FFPE samples (or URNA was used as a positive control) and diluted either 2 or 10 fold. cDNA was generated using standard techniques, and ddPCR was used to detect the presence of either the biomarker SH3BGRL2 (amplified sequences labeled with FAM) or the housekeeping gene KHDRBS1 (labeled with HEX). Results for three samples (#1, #3, or #5) are shown. It can be seen that except for the very dilute samples (i.e., approaching or below one copy per µL), there is good correlation between the ratio of the marker and housekeeping gene at the various concentrations, indicating there is a good range of sample concentrations that can be measured using this assay approach.

FIG. 13 shows the relative abundance of the biomarker SH3BGRL2 and the housekeeping RNA KHDRBS1 in FFPE samples as compared to the positive control, URNA (left panel); the ratio of the biomarker SH3BGRL2 to KHDRBS1 in cancer cells, compared to normal cells and URNA (middle panel); and the relative abundance of SH3BGRL2 to KHDRBS1 in cancer and normal cells, as measured using RNASeq (right panel). Again, a consistent pattern is seen for the biomarker regardless of how it is measured (although absolute values may vary).

FIG. 14 shows measurement of SH3BGRL2 measured as a singleplex assay (i.e., only SH3BGRL2-FAM generated by PCR, as compared to a duplex reaction where both SH3BGRL2 and KHDRBS1 were measured in either normal or cancer derived samples. The results are generally quite similar.

Example 8—Differential Expression in FFPE Tissue Samples by ddPCR

FIG. 15 shows the measurement of 5 biomarkers and housekeeping gene KHDRBS1 from 22 benign and 8 head and neck carcinoma FFPE samples. RNA was extracted from FFPE tissues using the Roche High Pure FFPET RNA Isolation Kit essentially according to the manufacture protocol. The 5 panels show the copies/µL from duplex ddPCR of 5 biomarkers (SH3BGRL2, KRT4, EMP1, LOXL2 and ADAM12) with the housekeeping gene KHDRBS1 from 22 benign and 8 head and neck carcinoma FFPE samples. KHDRBS1 showed a very similar distribution pattern and copies/µL across all samples and all assays. In contrast the biomarkers showed varying distributions with >3-$\log_{10}$ copies/µL. One HNSCC sample across all assays resulted in "No Call" for both the biomarker and KHDRBS1.

FIG. 16, the left graph shows the expression of five biomarkers normalized to KHDRBS1. Dividing the biomarker copies/uL by the housekeeping gene KHDRBS1 copies/uL from a duplex ddPCR reaction results in biomarker normalization, or ratio, for each sample. FIG. 16 right graph are the RNASeq expression data for the same biomarkers from the HNSCC TCGA dataset. The table shows the median fold-change in expression for each biomarker from the ddPCR experiments compared to the TCGA data. Both datasets show the same genes downregulated in cancer (SH3BGRL2, KRT4 and EMP1), and the same genes upregulated in cancer (LOXL2 and ADAM12). The ddPCR results are consistent with the TCGA dataset, however the magnitude of the change does vary.

FIG. 17, a ddPCR score was developed to separate the cancer from normal samples by determining the difference of (sum log of upregulated genes)−(sum log of downregulated genes), and after adding the biomarker the equation becomes (logLOXL2+logADAM12)−(log SH3BGRL2+log EMP1+log KRT4). The panel on the left shows the ddPCR score for the cancer samples plotted next to the ddPCR score for the normal samples. At a ddPCR cutoff score >0.24, there is an assay specificity of 95.4% and sensitivity of 85.7%. The plot on the right shows the Receiver Operator Characteristic (ROC) analysis, with an AUC of 0.961 and p=0.0003. The specificity from ddPCR is similar to the TCGA dataset (see FIG. 2), while the sensitivity from ddPCR <TCGA, possibly due to the differences in sample size and/or gene selection.

Example 9—HPV16 E6 and E7 Expression in FFPE HNSCC Tissue Samples

FIG. 18 shows the correlation between E6 and E7 HPV16 expression and p16 from FFPE HNSCC tissue samples. The top table show the HPV16 E6, E7 and housekeeping gene KHDRBS1 ddPCR copies/uL obtained from 4 p16-positive samples. The bottom table shows the results from 10 p16-negative samples, and the HPV16 E6, E7 and housekeeping gene KHDRBS1 ddPCR copies/uL. The plot on the right shows the normalized ddPCR ratio of biomarker divided by the housekeeping gene KHDRBS1 for the 4 p16-positive samples. Two of the samples with both HPV16 E6 and E7 reportable copies/uL greater than No Call showed normalized ddPCR expression of E7 greater than E6 by approximately 5-fold. In addition, all p16-negative samples were also negative (No Call) for E6 and E7 expression by ddPCR, across both preps and replicates. There is a very good overall concordance between p16 by IHC and E6 or E7 expression by ddPCR (Cohen's kappa=0.81).

Example 10—Isolation of RNA and Gene Expression in Saliva Samples

In some cases, saliva can be used as the biological sample. FIG. 19 shows the yield of RNA from saliva. Saliva samples were collected using the DNA Genotek CP-190 human RNA collection device. Following sample collection each sample was thoroughly mixed and incubated at 50 degrees C. for 2 hours, and samples stored at −20 degrees C. until processed. For each aliquot of saliva to be processed, $\frac{1}{10}^{th}$ sample volume of DNA Genotek neutralizer solution (catalog number RELONN-5) was added. RNA was purified using a Roche High Pure RNA Paraffin kit (catalog number 03 270 289 001). The table on the left shows 15 saliva RNA samples and the g of RNA/2 mLs of saliva calculated from a 250 µL saliva sample prep and the A260/A280 ratio from each saliva sample. The median g RNA isolated was 5.8 µg and the median A260/A280 ratio was 2.05. The scatter plot on the right shows the same data in a box-and-whiskers format, with whiskers at the maximum and minimum and a box around the $75^{th}$ and $25^{th}$-percentile and a line through the median.

FIG. 20 shows the measurement of 5 biomarkers and housekeeping (HK) gene RPL30 from the 15 saliva RNA samples from FIG. 19. The left panel show the copies/µL from duplex ddPCR of 5 biomarkers (LOXL2, SH3BGRL2, CRISP3, EMP1 and KRT4) with the housekeeping gene RPL30 from 15 saliva samples. Biomarker distribution ranged from 0.38 to 650 copies/µL. The right panel should the housekeeping gene in each of the duplex ddPCR. The housekeeping gene (RPL30) averaged 8 to 170 copies/µL with a % CV from 6 to 27% across the 5 duplex ddPCR reactions. One sample averaged 1.3 copies/µL, with a % CV of 57%.

FIG. 21 shows the normalized ddPCR from saliva compared to TCGA RNASeq. The left graph shows the expression of the biomarkers normalized to the housekeeping gene RPL30. Dividing the biomarker copies/µL by the housekeeping gene RPL30 copies/µL from a duplex ddPCR reaction results in biomarker normalization, or ratio, for each sample. One sample with an HK gene average of 1.3 copies/uL, and samples with biomarker of "No Call" or <1 copy/uL are excluded. Normalized ddPCR expression ranged from 0.018 to 9.7=540-fold. FIG. 21 right graph are the RNASeq expression data for the same biomarkers from the "normal" in the HNSCC dataset. The table shows the median fold-increase in expression relative to LOXL2 for each biomarker from the ddPCR experiments compared to the TCGA data. Median fold-increase in expression from saliva by ddPCR trend similar to TCGA (tissue) dataset, but the magnitude of the change varies.

Example 11—Embodiments

The disclosure includes, but is not limited to, the following embodiments.

A.1 A method to detect biomarkers associated with Head and Neck Squamous Cell Carcinoma (HNSCC) in an individual comprising the steps of:
obtaining a sample from the individual; and
measuring the amount of an expression product from a gene comprising at
least one of the genes in Table 4 and/or Table 6.

A.2 The method of any of the preceding paragraphs wherein the genes comprise at least one of CAB39L, ADAM12, SH3BGRL2, NRG2, COL13A1, GRIN2D, LOXL2, KRT4, EMP1 or HSD17B6.

A.3 The method of any of the preceding paragraphs, wherein the genes comprise at least four of CAB39L, ADAM12, SH3BGRL2, NRG2, COL13A1, GRIN2D, LOXL2, KRT4, EMP1 and HSD17B6.

A.4 The method of any of the preceding paragraphs, further comprising measuring the amount of expression products from at least one of the HPV E6 and/or HPV E7 genes.

A.5 The method of any of the preceding paragraphs, wherein the genes consist of at least four of CAB39L, ADAM12, SH3BGRL2, NRG2, COL13A1, GRIN2D, LOXL2, KRT4, EMP1 and HSD17B6 and expression products from at least one of the HPV E6 and/or HPV E7 genes.

A.6 The method of any of the preceding paragraphs, further comprising measuring the amount of a normalization gene, such as KHDRBS1, or RPL30, or another normalization gene.

A.7 The method of any of the preceding paragraphs, wherein the measuring comprises measuring mRNA.

A.8 The method of any of the preceding paragraphs, wherein the measuring comprises an immunoassay.

A.9 The method of any of the preceding paragraphs, comprising measuring the expression of at least four of the genes.

A. 10 The method of any of the preceding paragraphs, wherein the sample comprises serum, tissue, FFPE, saliva or plasma.

A. 11 The method of any of the preceding paragraphs, comprising comparing the level of expression to a control value from a normal population.

A. 12 The method of any of the preceding paragraphs, wherein a difference between gene expression in the individual and the control value indicates that the individual may have (i.e., is diagnostic of), or is susceptible to developing (i.e., is at increased risk for) HNSCC.

B.1 A method of identifying a marker associated with Head and Neck Squamous Cell Carcinoma (HNSCC) in an individual comprising: identifying at least one marker having increased or decreased expression in HNSCC, but not in HNSCC disease as compared to normal controls.

B.2 The method of B. 1, wherein the genes comprise at least one of one of the genes of Table 4 and/or Table 6, and/or at least one of CAB39L, ADAM12, SH3BGRL2, NRG2, COL13A1, GRIN2D, LOXL2, KRT4, EMP1 or HSD17B6.

B.3 The method of any of B.1-B.2, wherein the genes comprise at least four of CAB39L, ADAM12, SH3BGRL2, NRG2, COL13A1, GRIN2D, LOXL2, KRT4, EMP1 and HSD17B6.

B.4 The method of any of B.1-B.3, further comprising measuring the amount of expression products from at least one of the HPV E6 and/or HPV E7 genes.

B.5 The method of any of B.1-B.4, wherein the genes consist of at least four of CAB39L, ADAM12, SH3BGRL2, NRG2, COL13A1, GRIN2D, LOXL2, KRT4, EMP1 and HSD17B6 and expression products from at least one of the HPV E6 and/or HPV E7 genes.

B.6 The method of any of B.1-B.5, further comprising measuring the amount of a normalization gene, such as KHDRBS1, or RPL30, or another normalization gene.

B.7 The method of any of B.1-B.6, wherein the measuring comprises measuring mRNA.

B.8 The method of any of B.1-B.7, wherein the measuring comprises an immunoassay.

B.9 The method of any of B.1-B.8, comprising measuring the expression of at least four of the genes.

B.10 The method of any of B.1-B.9, wherein the sample comprises serum, tissue, FFPE, saliva or plasma.

B.11 The method of any of B.1-B. 10, wherein a difference between gene expression in the individual and the control value indicates that the individual may have (i.e., is diagnostic of), or is susceptible to developing (i.e., is at increased risk for) HNSCC.

C.1 A method to detect susceptibility to Head and Neck Squamous CellCarcinoma (HNSCC) in an individual comprising:
obtaining a sample from the individual; and
measuring the amount of at least one expression product from at least one gene from Table 4 and/or Table 6; and
comparing the expression of the at least one gene from Table 4 and/or Table 6 in the sample with a control value for the expression product of the gene.

C.2 The method of C.1, wherein the genes comprise at least one of CAB39L, ADAM12, SH3BGRL2, NRG2, COL13A1, GRIN2D, LOXL2, KRT4, EMP1 or HSD17B6.

C.3 The method of any of C.1-C.2, wherein the genes comprise of at least four of CAB39L, ADAM12, SH3BGRL2, NRG2, COL13A1, GRIN2D, LOXL2, KRT4, EMP1 and HSD17B6.

C.4 The method of any of C.1-C.3, further comprising measuring the amount of expression products from at least one of the HPV E6 and/or HPV E7 genes.

C.5 The method of any of C.1-C.4, wherein the genes consist of at least four of CAB39L, ADAM12, SH3BGRL2, NRG2, COL13A1, GRIN2D, LOXL2, KRT4, EMP1 and HSD17B6 and expression products from at least one of the HPV E6 and/or HPV E7 genes.

C.6 The method of any of C.1-C.5, further comprising measuring the amount of a normalization gene, such as KHDRBS1, or RPL30, or another normalization gene.

C.7 The method of any of C.1-C.6, wherein the measuring comprises measuring mRNA.

C.8 The method of any of C.1-C.7, wherein the measuring comprises an immunoassay.

C.9 The method of any of C.1-C.8, comprising measuring the expression of at least four of the genes.

C.10 The method of any of C.1-C.9, wherein the sample comprises serum, tissue, FFPE, saliva or plasma.

C.11 The method of any of C. 1-C. 10, wherein a difference between gene expression in the individual and the control value indicates that the individual may have, or is susceptible to developing (i.e., is at increased risk for) HNSCC.

D.1 A composition to detect biomarkers associated with Head and Neck Squamous Cell Carcinoma (HNSCC) in an individual comprising a reagent that quantifies the levels of expression of at least one gene of Table 4 and/or Table 6.

D.2 The composition of any D. 1, wherein the at least one gene comprises at least one of CAB39L, ADAM12, SH3BGRL2, NRG2, COL13A1, GRIN2D, LOXL2, KRT4, EMP1 or HSD17B6.

D.3 The composition of D. 1-D.2, wherein the at least one gene comprises at least four of CAB39L, ADAM12, SH3BGRL2, NRG2, COL13A1, GRIN2D, LOXL2, KRT4, EMP1 or HSD17B6.

D.4 The composition of any of D.1-D.3, further comprising at least one reagent that quantifies the levels of expression of at least one of HPV E6 and/or E7.

D.5 The composition of any of D.1-D.4, wherein the at least one gene consists of at least four of CAB39L, ADAM12, SH3BGRL2, NRG2, COL13A1, GRIN2D, LOXL2, KRT4, EMP1 or HSD17B6 and at least one of HPV E6 or E7.

D.6 The composition of any of D.1-D.5, further comprising at least one reagent to measure at least one normalization gene, such as KHDRBS1, or RPL30, or another normalization gene.

D.7 The composition of any of D.1-D.6, wherein the reagent detects mRNA.

D.8 The composition of any of D. 1-D.7, wherein the reagent detects protein.

D.9 The composition of any of D.1-D.8, wherein the reagent comprises at least one primer and/or probe for any one of these genes, where the at least one primer and/or probe is labeled with a detectable moiety.

D.10 The composition of any of D.1-D.9, wherein a difference between gene expression in the individual and the control value indicates that the individual may have (i.e., is diagnostic of), or is susceptible to developing (i.e., is at increased risk for) HNSCC.

E.1 A kit that comprises the composition of any of the preceding paragraphs.

E.2 The kit of E.1 further comprising instructions for measuring the at least one gene and/or determining if the value differs from a control value.

E.3 The kit of any of E.1-E.2, comprising at least one of a positive control for at least one normalization gene, such as KHDRBS1, or RPL30, or another normalization gene.

E.4 The kit of any of E.1-E.3, further comprising at least one of a positive control for any one of the genes of Table 4 and/or Table 6.

E.5 The kit of any of E.1-E.4, wherein the at least one gene comprises at least one of CAB39L, ADAM12, SH3BGRL2, NRG2, COL13A1, GRIN2D, LOXL2, KRT4, EMP1 or HSD17B6.

E.6 The kit of any of E.1-E.5, wherein the at least one gene comprises at least four of CAB39L, ADAM12, SH3BGRL2, NRG2, COL13A1, GRIN2D, LOXL2, KRT4, EMP1 or HSD17B6.

E.7 The kit of any of E.1-E.6, wherein the at least one gene comprises at least one of HPV E6 and/or E7.

E.8 The kit of any of E.1-E.7, wherein the at least one gene consists of at least four of CAB39L, ADAM12, SH3BGRL2, NRG2, COL13A1, GRIN2D, LOXL2, KRT4, EMP1 or HSD17B6 and at least one of HPV E6 or E7.

E.9 The kit of any of E.1-E.8, wherein the reagent comprises at least one primer and/or probe for any one of these genes, where the at least one primer and/or probe is labeled with a detectable moiety.

E.10 The kit of any of E.1-E.9, wherein a difference between gene expression in the individual and the control value indicates that the individual may have, or is susceptible to developing (i.e., is at increased risk for) HNSCC.

F.1 A method of treating HNSCC comprising:
obtaining a sample from the individual;
measuring or having measured the amount of an expression product from a gene comprising at least one of the genes in Table 4 and/or Table 6 in the sample;
comparing or having compared the expression of the at least one gene of Table 4 and/or Table 6 in the sample with a control value for expression; and
treating the individual for HNSCC when a difference between gene expression in the individual and the control value indicates that the individual may have (i.e., is diagnostic of the presence of), or is susceptible to developing (i.e., is at increased risk for) HNSCC.

F.2 The method of F.1, wherein the genes comprise at least one of CAB39L, ADAM12, SH3BGRL2, NRG2, COL13A1, GRIN2D, LOXL2, KRT4, EMP1 or HSD17B6.

F.3 The method of F.1-F.2, wherein the genes comprises at least four of CAB39L, ADAM12, SH3BGRL2, NRG2, COL13A1, GRIN2D, LOXL2, KRT4, EMP1 and HSD17B6.

F.4 The method of any of F. 1-F.3, further comprising measuring the amount of expression products from at least one of the HPV E6 and/or HPV E7 genes.

F.5 The method of any of F.1-F.4, wherein the genes consist of at least four of CAB39L, ADAM12, SH3BGRL2, NRG2, COL13A1, GRIN2D, LOXL2, KRT4, EMP1 and HSD17B6 and expression products from at least one of the HPV E6 and/or HPV E7 genes.

F.6 The method of any of F. 1-F.5, further comprising measuring the amount of a normalization gene, such as KHDRBS1, or RPL30, or another normalization gene.

F.7 The method of any of F.1-F.6, wherein the measuring comprises measuring mRNA.

F.8 The method of any of F.1-F.7, wherein the measuring comprises an immunoassay.

F.9 The method of any of F.1-F.8, comprising measuring the expression of at least four of the genes.

F.10 The method of any of F.1-F.9, wherein the sample comprises serum, tissue, FFPE, saliva or plasma.

F.11 The method of any of F. 1-F. 10, comprising comparing the level of expression to a control value from a normal population.

References and citations to other documents, such as patents, patent applications, patent publications, journals, books, papers, web contents, have been made throughout this disclosure. All such documents are hereby incorporated herein by reference in their entirety for all purposes. Various modifications and equivalents of those described herein, will become apparent to those skilled in the art from the full contents of this document, including references to the scientific and patent literature cited herein. The subject matter herein contains information, exemplification and guidance that can be adapted to the practice of this disclosure in its various embodiments and equivalents thereof.

That which is claimed is:

1. A method to detect biomarkers associated with Head and Neck Squamous Cell Carcinoma (HNSCC) in an individual comprising the steps of:
   obtaining a sample from the individual; and
   using a laboratory assay, measuring in the sample amount of an expression product from each of genes comprising SH3BGRL2, KRT4, EMP1, LOXL2, and ADAM12,
   wherein downregulation of expression of each of SH3BGRL2, KRT4 and EMP1 and upregulation of expression each of LOXL2 and ADAM12 is associated with the HNSCC in the individual.

2. The method of claim 1, wherein the genes further comprise at least one of CAB39L, NRG2, COL13A1, GRIN2D, or HSD17B6,
   wherein downregulation of expression of CAB39L, downregulation of expression of NRG2, upregulation of expression of COL13A1, upregulation of expression of GRIN2D, and upregulation of expression of HSD17B6 is associated with the HNSCC in the individual.

3. The method of claim 1, further comprising measuring amount of expression products from at least one of HPV E6 and HPV E7 genes, wherein detectable expression of HPV E6 or HPV E7 is associated with the HNSCC in the individual.

4. The method of claim 1, further comprising measuring amount of a normalization gene.

5. The method of claim 1, wherein the measuring comprises measuring mRNA.

6. The method of claim 1, wherein the measuring comprises performing an immunoassay.

7. The method of claim 1, wherein the sample comprises serum, tissue, FFPE, saliva or plasma.

8. The method of claim 5, further comprising measuring an amount of an expression product for at least one of the HPV E6 and HPV E7 genes and a corresponding control value for expression of HPV E6 and/or HPV E7, wherein detectable expression of HPV E6 or HPV E7 is associated with the HNSCC in the individual.

9. The method of claim 5, further comprising measuring amount of a normalization gene.

10. The method of claim 2, wherein the measuring comprises measurement of mRNA.

11. The method of claim 1, wherein the measuring comprises measurement of protein.

12. The method of claim 1, wherein the sample is a tissue sample.

13. The method of claim 4, wherein the normalization gene is KHDRBS1 or RPL30.

14. The method of claim 9, wherein the normalization gene is KHDRBS1 or RPL30.

15. The method of claim 11, wherein the measuring comprises performing an immunoassay.

16. The method of claim 1, wherein the measuring comprises performing polymerase chain reaction (PCR).

17. The method of claim 10, wherein the measuring comprises performing polymerase chain reaction (PCR).

18. The method of claim 1, wherein the measuring comprises using an array of expression products.

19. The method of claim 2, wherein the measuring comprises using an array of expression products.

20. The method of claim 16, wherein the PCR is droplet digital PCR (ddPCR).

21. The method of claim 1, wherein the laboratory assay is a nucleic acid assay.

22. The method of claim 21, wherein the nucleic acid assay is droplet digital PCR (ddPCR).

23. The method of claim 1, wherein the laboratory assay is a peptide, polypeptide, or protein assay.

24. The method of claim 1, wherein the expression product is one or both of RNA or protein.

\* \* \* \* \*